(12) United States Patent
Sakatani et al.

(10) Patent No.: US 6,695,483 B2
(45) Date of Patent: Feb. 24, 2004

(54) SENSOR AND ROLLING BEARING APPARATUS WITH SENSOR

(75) Inventors: Ikunori Sakatani, Kanagawa (JP); Takeshi Takizawa, Kanagawa (JP); Shigeru Endo, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/996,593

(22) Filed: Nov. 30, 2001

(65) Prior Publication Data

US 2003/0091253 A1 May 15, 2003

(30) Foreign Application Priority Data

| Dec. 1, 2000 | (JP) | ................................ P.2000-366530 |
|---|---|---|
| Mar. 30, 2001 | (JP) | ................................ P.2001-099989 |
| Jun. 18, 2001 | (JP) | ................................ P.2001-183578 |
| Jul. 13, 2001 | (JP) | ................................ P.2001-213285 |
| Jul. 17, 2001 | (JP) | ................................ P.2001-217160 |
| Jul. 30, 2001 | (JP) | ................................ P.2001-230356 |
| Aug. 2, 2001 | (JP) | ................................ P.2001-235172 |
| Aug. 9, 2001 | (JP) | ................................ P.2001-242719 |

(51) Int. Cl.$^7$ ................................................. F16C 19/00
(52) U.S. Cl. ................................................. 384/448
(58) Field of Search ................................. 384/448, 537, 384/624; 374/173, 174

(56) References Cited

U.S. PATENT DOCUMENTS

| 4,914,387 A | * | 4/1990 | Santos ........................ 384/448 |
|---|---|---|---|
| 5,691,707 A | | 11/1997 | Smith et al. |
| 5,796,349 A | | 8/1998 | Klein |
| 5,805,080 A | * | 9/1998 | Lemoine et al. ............ 384/448 |

FOREIGN PATENT DOCUMENTS

| EP | 0 553 716 A1 | 8/1993 |
|---|---|---|
| EP | 0 887 647 A1 | 12/1998 |
| GB | 2 295 207 | 5/1996 |
| WO | WO 97/17599 A1 | 5/1997 |
| WO | WO 98/11356 A1 | 3/1998 |

* cited by examiner

*Primary Examiner*—Lenard A. Footland
(74) *Attorney, Agent, or Firm*—Sughrue Mion, PLLC

(57) ABSTRACT

A rolling bearing apparatus with sensor includes a sensor unit retaining a plurality of types of sensors for detecting the status of a rolling bearing, in a single holder. The plurality of types of sensors are at least two types of sensors of a rotation speed sensor, a temperature sensor, and an acceleration sensor.

1 Claim, 36 Drawing Sheets

FIG.35
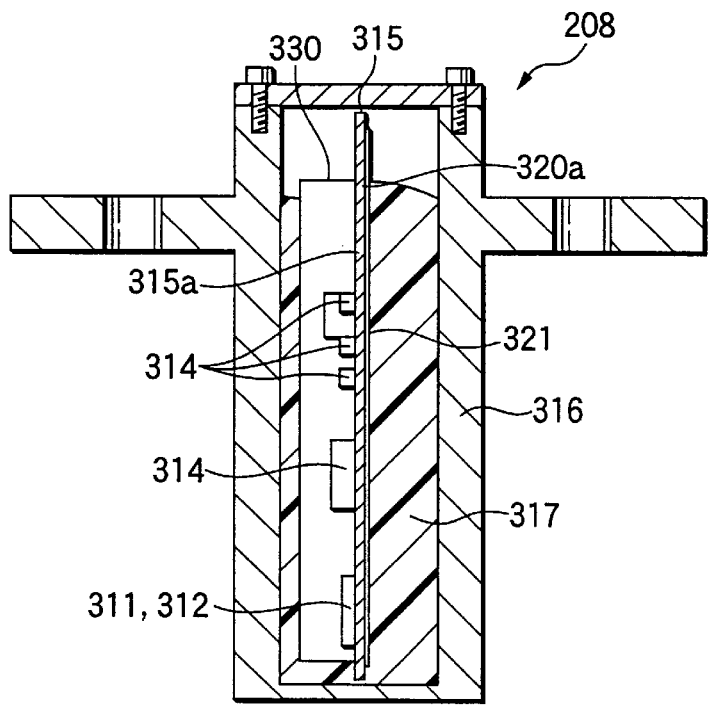
FIG.36A  FIG.36B  FIG.36C
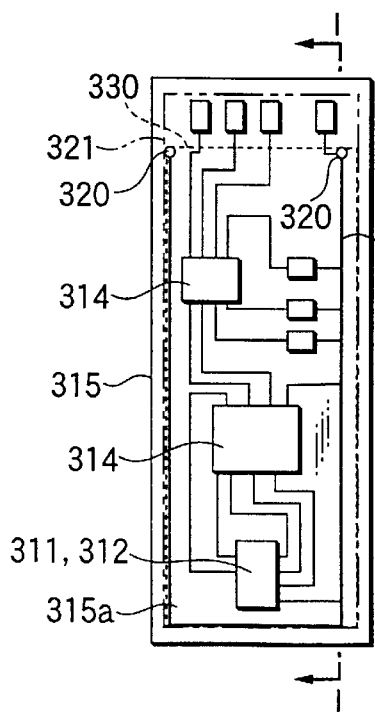 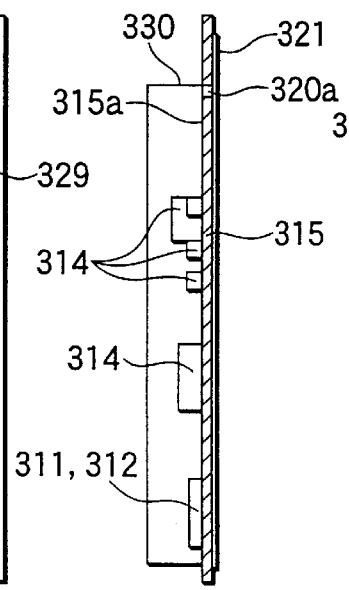 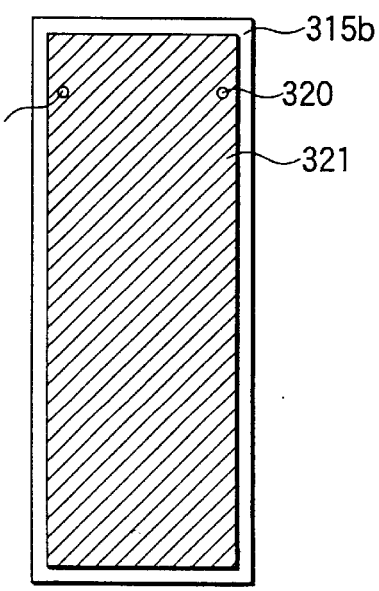

POSITIVE IN DETECTING OF N POLE

MOVING DIRECTION OF MAGNET(55B)

MOVING DIRECTION OF MAGNET(55C)

POSITIVE IN B PHASE WHEN A PHASE SHIFTS FROM NEGATIVE TO POSITIVE

NEGATIVE IN B PHASE WHEN A PHASE SHIFTS FROM NEGATIVE TO POSITIVE

SENSOR AND ROLLING BEARING APPARATUS WITH SENSOR

BACKGROUND OF THE INVENTION

1. Field of the Invention

The present invention relates to a sensor, a rolling bearing with a sensor and a rotating support apparatus with sensor which are utilized for causing a housing or a suspension system—which remains stationary even at time of use—to rotatably support wheels of a railroad vehicle, those of an automobile, or a rotating shaft of a rolling mill for metal working, as well as being utilized for detecting the status of the rolling bearing or that of the rotating support apparatus. The rolling bearing and the rotating support apparatus are effective for checking an abnormality in the rolling bearing, by means of detecting, e.g., the rotation speed of wheels or rotating shaft and the status of the rolling bearing (i.e., the temperature or vibration of the rolling bearing).

2. Description of the Related Art

A rolling bearing unit is used, for instance, for causing a housing fastened to a railroad vehicle to rotatably support railroad wheels. In order to determine the traveling speed of the railroad vehicle or to effect skidding control for preventing occurrence of unbalanced wear in the wheels, the rotational speed of the wheels must be detected. Moreover, in order to prevent occurrence of seizing up of the rolling bearing unit, which would otherwise be caused as a result of an abnormality having arisen in the rolling bearing unit, the temperature of the rolling bearing unit must be detected. To these ends, supporting of the wheels rotatable with respect to the housing, detection of rotation speed of the wheels, and detection of temperature of the rolling bearing unit have recently been effected through use of a rotating support apparatus with sensor, the apparatus being constituted by means of incorporating a rotation speed sensor and a temperature sensor into the rolling bearing unit.

FIGS. 59 and 60 show the structure of a related-art sensor-equipped rotating support apparatus for use with a railroad vehicle. An axle shaft 1 acts as a rotating shaft which rotates at the time of use while having an unillustrated wheel fixedly supported thereon. In order to achieve low weight, the axle shaft 1 is formed into the form of a hollow cylinder. The axle shaft 1 is rotatably supported by a double row tapered roller bearing 3 (which serves as a rolling bearing) at the interior diameter of a journal box 2 (which serves as a housing and does not rotate even at the time of use). The double row tapered roller bearing 3 comprises an outer ring 4 and a pair of inner rings 5, which are arranged concentrically with each other, and a plurality of tapered rollers 6, 6. Of these elements, the entirety of the outer ring 4 is forced into a substantially cylindrical shape, and outer ring raceways 7 are formed in two rows along the inner circumferential surface of the outer ring 4. Each outer ring raceway 7 has a tapered concave geometry and is inclined such that the interior diameter of the outer ring raceway 7 becomes greater toward the edge of the outer ring 4 with reference to the axial direction thereof.

Each of the pair of inner rings 5 is formed into a substantially cylindrical shape, and a tapered convex inner ring raceway 8 is formed along the outer circumferential surface of each inner ring 5. The inner rings 5 are arranged at the interior diameter of the outer ring 4 and concentrically with the outer ring 4 while the smaller-diameter-side end faces of the respective inner rings 5 are mutually opposed. Moreover, a plurality of the tapered rollers 6, 6 are rotatably retained by a retainer 9 provided between each outer ring raceway 7 and the corresponding inner ring raceway 8.

The outer ring 4 of the double row tapered roller bearing 3 is fittingly retained by the interior of the journal box 2. In the illustrated example, the outer ring 4 is sandwiched from either side with reference to the axial direction of the outer ring 4 between a step 10 formed at a position on the interior surface of the journal box 2 close to one edge thereof (i.e., the left-side edge of the journal box 2 shown in FIG. 59) and an unillustrated presser ring fittingly fixed to the interior of the other edge portion of the journal box 2 (i.e., the right-side edge portion of the journal box 2 shown in FIG. 59). The inner rings 5 are fitted around in a position on the outer circumferential surface of the axle shaft 1 close to one end thereof (i.e., the left end of the axle shaft 1 shown in FIG. 59) with a spacer 11 being interposed therebetween. An annular member 12 called an oil thrower is fitted around a portion of the end section of the axle shaft 1 projecting beyond; i.e., to the outside of, the inner ring 5 with reference to the axial direction thereof. The inner end face of the inside inner ring 5 butts against a stepped surface formed in an intermediate section of the axle shaft 1. Accordingly, a pair of the inner rings 5 are not displaced toward the center of the axle shaft 1 (i.e., a position close to the right side in FIG. 59) as compared with the status of the inner rings 5 shown in FIG. 59. By means of a nut 14 screw-engaged with an external thread 13 formed in the outer end section of the axle shaft 1, the annular member 12 is pressed against the outer end face of the outside inner ring 5. A locking ring 16 is fastened to the outer end face of the nut 14 by means of bolts 15, 15. Projections formed along the inner periphery of the locking ring 16 are engaged with a groove formed in the outer circumferential surface of the outer end section of the axle shaft 1, thereby preventing loosening of the nut 14.

A seal case 17 is formed from a metal plate, such as a mild steel plate, so as to assume a substantially cylindrical shape overall and a crank-shaped profile in cross section. The seal case 17 is fastened fittingly to the interior of each side of the outer ring 4. A seal ring 18 is provided between an inner circumferential surface of each seal case 17 and an outer circumferential surface of the corresponding annular member 12, thereby sealing an opening on either end of a space having the tapered rollers 6, 6 provided therein. This construction prevents leakage to the outside of grease for lubrication purpose sealed in the space and entry of extraneous matter, such as rainwater or dust, into the space from the outside.

An encoder 19 is formed from magnetic metal, such as a steel product, so as to assume an overall disk shape and an L-shaped profile in cross section. The encoder 19 is fixedly coupled concentrically with the axle shaft 1 by means of a plurality of bolts 20, 20. Projections and depressions are alternately formed at uniform intervals in the circumferential direction of and in the outer brim of an outwardly-flanged disk section 21, thereby alternately varying the magnetic characteristic of the outer brim at uniform intervals in the circumferential direction.

A cover 22 is fixed to one end of the journal box 2, to thereby seal an opening at that end. The cover 22 is formed from synthetic resin or metal material and into an overall cylindrical shape having one end closed. The cover 22 comprises a cylindrical portion 23; a bottom plate portion 24 closing an opening at one end of the cylindrical portion 23 (i.e., the left-side opening of the cylindrical portion 23); and an outwardly-flanged mount section 25 provided along an outer circumferential surface close to the other end of the cylindrical portion 23 (i.e., the right-side end of the cylindrical portion 23 shown in FIG. 59). The mount section 25 is secured to one end face of the journal box 2 by means of unillustrated bolts while the other end of the cylindrical section 23 is fitted to the interior of one end of the journal box 2 and the mount section 25 butts against one end face of the journal box 2, whereby the cover 22 closes an opening at one end of the journal box 2.

A sensor mount hole 26 is formed at a position on the cylindrical portion 23 opposing the outer brim of the disk section 21 of the encoder 19 with reference to the diametrical direction thereof, so as to penetrate from the outer circumferential surface of the cylindrical section 23 to the inner circumferential surface thereof in the diametrical direction of the cylindrical section 23. A rotation speed sensor 27 is inserted into the sensor mount hole 26. A detecting section provided at the end face of the rotation sensor 27 (i.e., the lower end face of the sensor 27 shown in FIG. 59) is positioned so as to oppose a detected section provided along the outer brim of the disk section 21, with a minute clearance therebetween.

Another sensor mount hole 28 is formed at a position on the intermediate section of the journal box 2 situated around the outer ring 4. A temperature sensor 29 is inserted into the sensor mount hole 28.

In the case of the sensor-equipped rotating support apparatus having the foregoing construction, when at the time of operation the encoder 19 rotates along with the axle shaft 1 having wheels fixedly supported thereon, the projections and depressions constituting the detected section of the encoder 19 alternately pass by the neighborhood of the detecting section provided at the end face of the rotation speed sensor 27. Consequently, the density of magnetic flux flowing through the rotation speed sensor 27 varies, thereby changing output from the rotation speed sensor 27. In this way, a frequency at which output from the rotation speed sensor 27 changes is proportional to the rotation speed of the wheels. Accordingly, so long as output from the rotation speed sensor 27 is delivered to an unillustrated controller, the rotation speed of the wheels can be detected, thereby enabling appropriate skidding control of a railroad vehicle.

If an extraordinary rise has arisen in the rotational resistance of the double row tapered roller bearing 3, for any reason such as skewing of each of the tapered rollers 6, 6, and the temperature of the double row tapered roller bearing 3 has risen, the temperature sensor 29 detects the rise in temperature. In this way, a temperature signal detected by the temperature sensor 29 is also delivered to the unillustrated controller, and the controller issues an alarm, such as illumination of an alarm lamp provided at a driver's seat. In the event such an alarm has been issued, the driver takes measures, such as effecting an emergency stop.

In the case of a rotating support apparatus of conventional structure which has the foregoing construction and operates in the manner set forth, the rotation speed sensor 27 and the temperature sensor 29 are independently and fixedly supported on the cover 22 and the journal box 2, respectively. Hence, acquiring signals from the sensors 27 and 29 requires performance of a cumbersome task, as does mounting of the sensors 27 and 29. More specifically, the rotational sensor 27 is secured to the cover 22 by means of a plurality of bolts 31a, 31a penetrating through a mount flange 30a. A harness 32a serving as a conductor for acquiring a signal output from the rotation sensor 27 acquires a signal. The temperature sensor 29 is secured to the journal box 2 by means of a plurality of bolts 31b, 31b penetrating through another mount flange 30b, and a signal is acquired by way of a harness 32b.

Because of such a construction, the space to be occupied by the sensors 27, 29 increases, and a mounting operation becomes troublesome. Further, routing of the harnesses 32a, 32b also becomes cumbersome. Another consideration is addition, to the rotating support apparatus for a railroad vehicle, of an acceleration sensor for detecting vibrations, along with the rotation sensor 27 and the temperature sensor 29. Further, there is a tendency toward an increase in the number of sensors to be incorporated into the rotating support apparatus. If the number of sensors increases, the problems set forth will become more noticeable.

In the case of the above-described related-art construction, a signal output from the rotation speed sensor 27 and a signal output from the temperature sensor 29 are processed independently of each other, and no consideration has been given of processing these signals in a linked manner. More specifically, a detection signal originating from the rotation speed sensor 27 is utilized solely for detecting a rotation speed of wheels, whereas occurrence of an abnormality in the double row tapered roller bearing 3 has been determined by use of only a detection signal originating from the temperature sensor 29. For this reason, the reliability of detection of an abnormality cannot be ensured sufficiently. The reason for this is that, in the case of a rolling bearing unit, such as the double row tapered roller bearing 3, incorporated into a rotating support section of a railroad vehicle, wheels do not constantly rotate at a given speed, and hence heating due to seizure loss of the rolling bearing unit is not effected constantly. In other words, even a normal rolling bearing unit is susceptible to constant temperature variations, for reasons of variations in rotation speed. Therefore, difficulty is encountered in determining occurrence of an abnormality in the rolling bearing unit on the basis of only temperature variations.

When occurrence of an abnormality in the rolling bearing unit is determined from only the detection signal output from the temperature sensor 29, a temperature threshold value to be used for determining occurrence of an abnormality must be specified by means of taking, as a reference, a time of high-speed running during which a temperature rises. Consequently, there may arise a possibility that an abnormality arising during low-speed running cannot be detected. In view of the situations, a preferably-conceivable measure to enhance the reliability of detection of an abnormality in a rolling bearing unit is to make a determination in consideration of factors other than a temperature.

Occurrence of such a problem is not limited to a rotating support section for supporting railroad wheels; such a problem also occurs in a rotating shaft of industry machinery of various types, such as a rolling mill, or in a rotating support section of another type of machinery.

Further, in an environment in which a bearing apparatus of an industrial machinery or automobile is used, external noise stemming from a high-frequency power source or electric motor affects a circuit constituting the sensor, thereby deteriorating the accuracy or resolution of a signal output from the sensor. When the sensor is used while being attached to hardware connected to the ground of an AC power supply via a housing of the hardware, if the housing is incompletely grounded, a voltage originating from the AC power supply is also applied to the case of the sensor fastened to the housing. In association with application of the voltage, a feeble electric current flows into the sensor, and as a result noise stemming from the frequency of the electric current is superimposed on a signal output from the sensor.

In this case, the influence of external noise can be diminished to a certain extent by means of a filter or arithmetic operation.

Additionally, the temperature sensor of the related art to be incorporated into an axle bearing for detecting an abnormality, such as seizing up employs, e.g., an NTC thermistor (negative temperature coefficient thermistor) having a negative temperature coefficient. The NTC thermistor has a negative temperature characteristic (i.e., a characteristic of a resistance value diminishing with an increase in temperature), and hence, as shown in FIG. 62, a resistance value decreases logarithmically with increasing temperature. Hence, when a temperature detected by the NTC thermistor is converted into an output voltage Vt by means of a circuit such as that shown in FIG. 61, there is produced an output voltage Vt such as that shown in FIG. 63. The output voltage Vt does not change linearly with respect to temperature. When an output voltage is converted into a temperature, the output voltage Vt is subjected to analog-to-digital conversion. A resultant value is converted into a temperature through software by means of a microcomputer. Alternatively, there is a necessity of changing the output voltage Vt so as to assume a linear characteristic by means of a linearizing circuit, thereby resulting in complication of circuit configuration and an increase in cost.

Moreover, as shown in FIG. 64, a sensor unit 246 includes a circuit board 243 having a detecting section 241 and a circuit component 242 for processing a signal detected by the detecting section 241. The circuit board 243 is inserted into a case 244, and a clearance between the circuit board 243 and the case 244 is filled with hard resin (filler) 245 and the resin is cured (molded). A flange 247 is formed on an outer surface 244a of the case 244 and can be fastened to a bearing or bearing apparatus with bolts.

However, when the circuit board 243 is fastened to the inside of the case 244 through mere molding, difficulty is encountered in orientating, in a certain direction, the circuit board 243 having mounted thereon the detecting section 241 and the circuit component 242. Hence, even when a single object is measured through use of sensors 246 manufactured in the same manner, resultant measurement results disperse. Consequently, the finally-produced sensors 246 must be calibrated (or corrected) one by one.

In the case of a bearing apparatus equipped with such a sensor 246, there is a necessity of calibrating the sensor 246 as well as calibrating mounting of the sensor 246 on the bearing apparatus. Consequently, when the operating status of the bearing apparatus is evaluated on the basis of the result of measurement performed by the sensor 246, difficulty is encountered in determining whether the measurement result is ascribable to the sensor or to the bearing apparatus.

When respective linear expansion coefficients of the case 244, the resin and the circuit board 243 are different from each other, a difference arises in the amount of thermal expansion in accordance with the change of temperature. Hence, when the sensor 246 is used in the environment where temperature changes arise repeatedly, a flaking arises between the case 244 and the resin 245 or between the resin 245 and the circuit board 243. Further, a stress is exerted on the detecting section 241 and the circuit component 242, which are mounted on the circuit board 243, thus posing a risk of impairing the life of these components.

Molding process involves heating for hardening the resin 245 or consumption of a long period of time until the resin is completely hardened; for example, a process of leaving a mold to harden for a whole day and night. In the case of resin of reactive type involving addition of a hardener, a time required for hardening is shortened. However, heat is generated, which may impart damage to the detecting section 241 and the circuit component 242 mounted on the circuit board 243.

SUMMARY OF THE INVENTION

The present invention has been conceived in view of the above-described problem, and an object of the invention is to realize a compact and lightweight rotating support apparatus, to facilitate assembly of the same, to diminish the number of parts, and to reduce the number of cables.

In addition, an object of the invention is to improve an accuracy of abnormality detection of a rolling bearing.

Further, an object of the invention is to provide a sensor involving little dispersion in an output result of a signal to be detected, as well as a bearing apparatus using the sensor.

Moreover, an object of the invention is to improve the linearity of a voltage output from a circuit which converts a temperature change into a voltage by use of a thermistor, without involvement of complication of circuit configuration and an increase in cost.

Additionally, an object of the invention is to provide a sensor which effectively shields external noise affecting a signal output from the sensor, and a bearing apparatus which has the sensor and can accurately monitor the status of a bearing.

To attain these objects, the present invention is characterized by the following features.

(1) A rolling bearing apparatus with sensor including:
 a sensor unit retaining a plurality of types of sensors in a single holder, the sensors detecting the status of a rolling bearing,
 wherein the plurality of types of sensors are at least two types of sensors of a rotation speed sensor, a temperature sensor and a vibration sensor.

(2) The rolling bearing apparatus according to (1), further comprising:
 inner and outer rings rotating relative to each other such that one of the inner and outer rings is a rotating ring and the other is a stationary ring;
 a plurality of rolling elements rotatably disposed between a raceway formed on an inner surface of the outer ring, and a raceway formed on an outer surface of the inner ring; and
 an encoder supported on the rotating ring or a portion rotating together with the rotating ring, and rotating together with the rotating ring,
 wherein the sensor unit is disposed close to the encoder in such a manner as to oppose the encoder, at the stationary ring or a portion supporting the stationary ring.

(3) The rolling bearing apparatus according to (2), further comprising:
 a nut disposed on an end of a shaft so as to position the inner ring in an axial direction of the shaft,
 a housing being the portion supporting the stationary ring; and
 a cover attached to the housing,
 wherein the encoder is disposed between the inner ring and the nut in the axial direction or on an outer surface of the nut, and
 wherein the sensor unit is attached to one of the housing and the cover.

(4) The rolling bearing apparatus according to (1), wherein the sensor holder is made of one of austenite stainless steel, aluminum, magnesium, copper, zinc, or an alloy of any of the same.

(5) The rolling bearing apparatus according to (1), wherein each of signal lines extending from the sensors is twisted with a ground line, and the twisted signal lines are shielded individually.

(6) The rolling bearing apparatus according to (1), wherein each of signal lines extending from the sensors is twisted with a ground line, and all of the twisted signal lines are collectively shielded.

(7) The rolling bearing apparatus according to (1), wherein the temperature sensor is disposed on a leading end of the sensor holder of the sensor unit.

(8) The rolling bearing apparatus according to (1), further comprising:
a reference voltage generation circuit located within the sensor holder for supplying a reference voltage to at least one of the temperature sensor and the vibration sensor.

(9) The rolling bearing apparatus according to (1), wherein the temperature sensor is constructed by one of an NTC thermistor, a PTC thermistor, a CTR thermistor, a resistance temperature sensor, and an integrated-circuit temperature sensor.

(10) The rolling bearing apparatus according to (1), wherein the vibration sensor is constructed by one of a piezoelectric element and a strain gauge.

(11) The rolling bearing apparatus according to (1), wherein outputs from at least one of the rotation speed sensor, the temperature sensor, and the vibration sensor are in the form of current.

(12) The rolling bearing apparatus according to (1), further comprising:
a surge absorber protecting a sensor circuit from a surge voltage, for eliminating a noise.

(13) The rolling bearing apparatus according to (1), further comprising:
a Zener diode protecting a sensor circuit from a surge voltage, for eliminating a noise.

(14) The rolling bearing apparatus according to (1), further comprising:
an EMI filter for eliminating a noise.

(15) The bearing apparatus with a rotation speed sensor, comprising: an encoder being constructed by alternately magnetizing a set of N pole, S pole and no pole or a set of S pole, N pole and no pole in a circumferential direction thereof, to thereby detect a rotating direction of the encoder by a single sensor.

(16) A bearing apparatus with sensor comprising:
a rotation speed sensor detecting a rotation speed of a bearing;
a temperature sensor detecting a temperature of the bearing;
a threshold value setting device for setting a threshold value of temperature for abnormality detection on the basis of the rotation speed obtained by the rotation speed sensor;
a comparator comparing a temperature signal output from the temperature sensor with the threshold valve of temperature; and
an abnormality determining device determining an abnormality of the bearing on the basis of an output of the comparator.

(17) A bearing apparatus with sensor comprising:
a rotation speed sensor detecting a rotation speed of a bearing;
a vibration sensor detecting a vibration of the bearing;
a threshold value setting device for setting a threshold value of vibration for abnormality detection on the basis of the rotation speed obtained by the rotation speed sensor;
a comparator comparing a vibration signal output from the vibration sensor with the threshold valve of acceleration; and
an abnormality determining device determining an abnormality of the bearing on the basis of an output of the comparator.

(18) The bearing apparatus with sensor according to (17), further comprising:
a variable filter through which the vibration signal output from the vibration sensor is passed, for changing a frequency to be eliminated or dampened, on the basis of the rotation speed detected by the rotation speed sensor,
wherein the comparator compares a signal output from the variable filter with the threshold value of acceleration.

(19) A bearing apparatus with sensor comprising:
a rotation speed sensor detecting a rotation speed of a bearing;
a vibration sensor detecting a vibration of the bearing;
a period analysis device performing a period analysis of a signal output from the vibration sensor; and
an abnormality determining device determining an abnormality of the bearing by analyzing a result of period analysis by use of a rotation speed signal output from the rotation speed sensor.

(20) A bearing apparatus with sensor comprising:
a rotation speed sensor detecting a rotation speed of a bearing;
a vibration sensor detecting a vibration of the bearing;
an envelope processing device performing an envelope processing of a signal output from the vibration sensor so that the signal is subjected to a frequency analysis; and
an abnormality determining device determining an abnormality of the bearing by analyzing a result of frequency analysis by use of a rotation speed signal output from the rotation speed sensor.

(21) A bearing apparatus with temperature sensor for measuring a temperature of a bearing, comprising:
a thermistor built in the rolling bearing or in a vicinity thereof,
at least one of fixed resistors connected in parallel with the thermistor.

(22) The bearing apparatus according to (21), wherein the temperature sensor has a negative temperature characteristic such that a sensor output drops in association with an increase in temperature, whereby the temperature sensor has a fail-safe function.

(23) The bearing apparatus according to (21), wherein the thermistor is one of an NTC thermistor, a PTC thermistor, a CTR thermistor, and a silicon thermistor.

(24) A bearing apparatus with a sensor for a bearing comprising:
a detecting section for detecting an object to be detected;
a circuit component for processing a detection signal output from the detecting section;
a circuit board on which the detecting section and the circuit component are mounted;
a fixing jig for fixing the circuit board; and
a sensor holder fixing the fixing jig.

(25) The bearing apparatus according to (24), wherein the fixing jig is fixed to the sensor holder by use of a jig fixing component.

(26) The bearing apparatus according to (24), wherein the fixing jig is fixed to the sensor holder by an adhesive after positioning the fixing jig therein.

(27) A bearing apparatus with a sensor for a bearing comprising:
- a detecting section for detecting an object to be detected;
- a circuit component for processing a detection signal output from the detecting section;
- a circuit board on which the detecting section and the circuit component are mounted; and
- a noise shield connected to a reference voltage of the circuit.

(28) The bearing apparatus according to (27), wherein the noise shield further comprises at least one of:
- a first noise shield connected to a reference voltage of circuit, and arranged in an annular manner on a surface of the circuit board having the detecting section and the circuit component so as to surround at least a part of the detecting section and the circuit component;
- a second noise shield connected to a reference voltage of the circuit and planar which is arranged in a planar manner on a surface opposite to the surface of the circuit board having the detecting section and the circuit component so as to oppose and cover at least a region surrounded by the first noise shield, from the side opposite to the region; and
- a case-like third noise shield connected to a reference voltage of the circuit and mounted on the surface of the circuit board having the detecting section and the circuit component so as to cover at least one of the detecting section and the circuit component.

BRIEF DESCRIPTION OF THE DRAWINGS

FIG. 35 is a cross-sectional view showing a sensor according to a seventeenth embodiment of the present invention;

FIG. 36A is a front view of the circuit board shown in FIG. 35;

FIG. 36B is a cross-sectional view taken along a line I–I shown in FIG. 36A;

FIG. 36C is a rear view of the circuit board shown in FIG. 35;

DETAILED DESCRIPTION OF THE PREFERRED EMBODIMENTS

Figure 1:
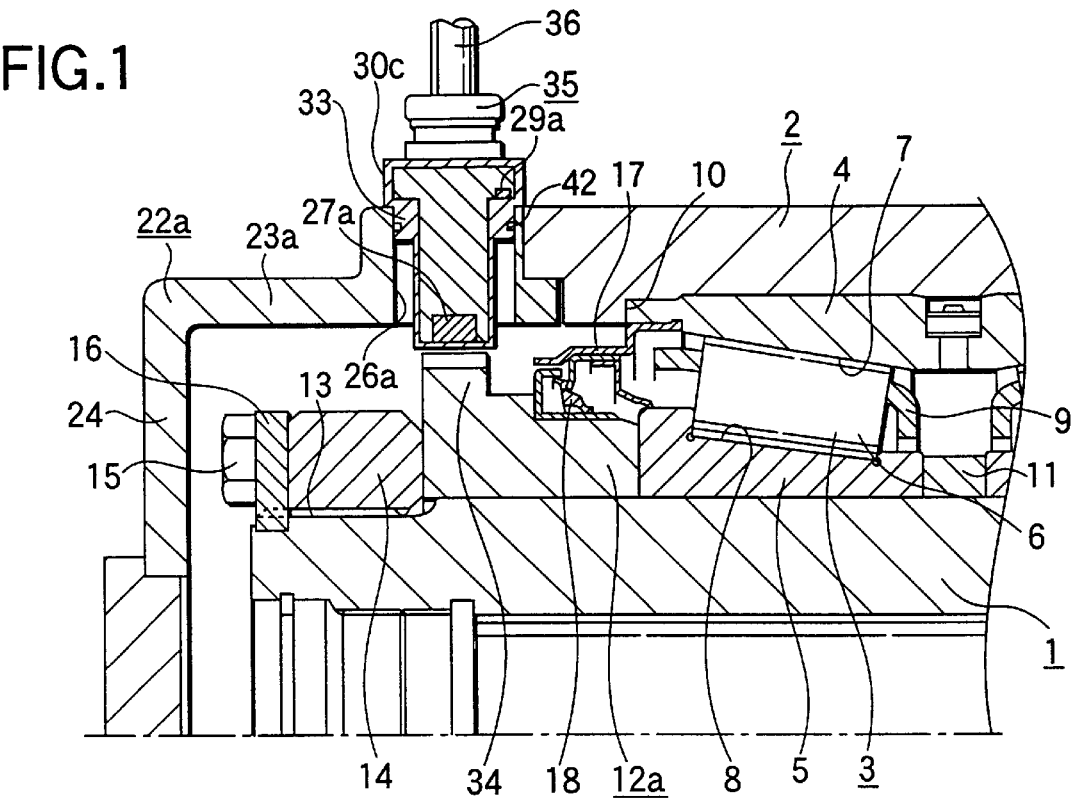
FIG. 1 is a cross-sectional view taken along a line A—A shown in FIG. 2, showing a first embodiment of a rotating support apparatus according to the present invention.
Figure 2:
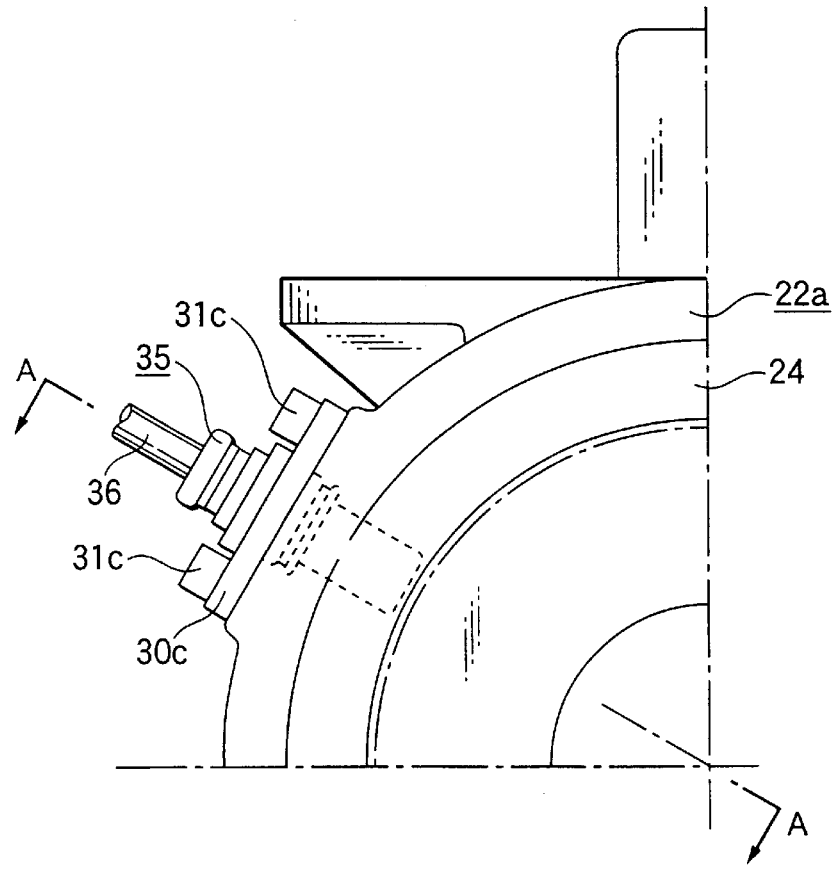
FIG. 2 is a view of the rotating support apparatus when viewed from the left in FIG. 1.
Figure 63:
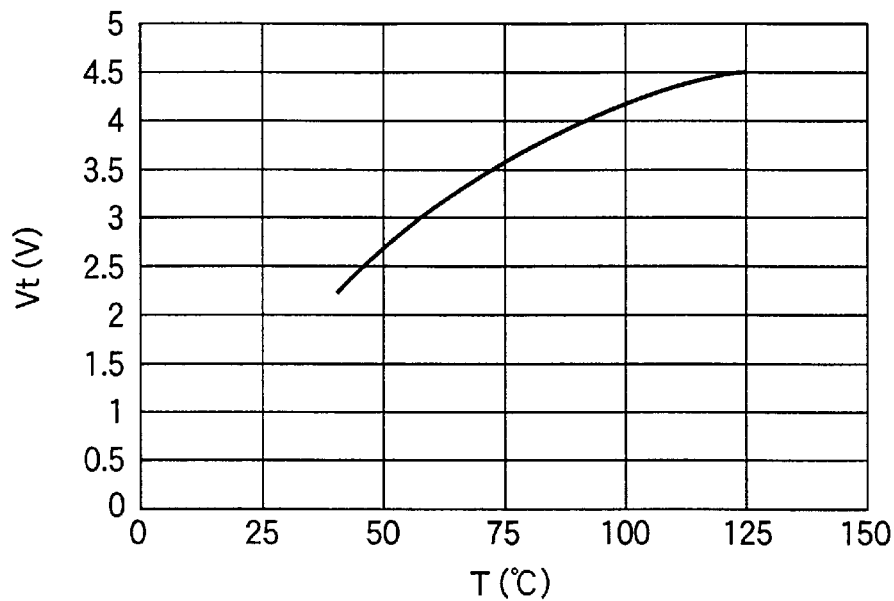
FIG. 63 is a chart showing a relationship between a voltage output from the temperature sensor shown in FIG. 61 and the temperature of a bearing.
Figure 64:
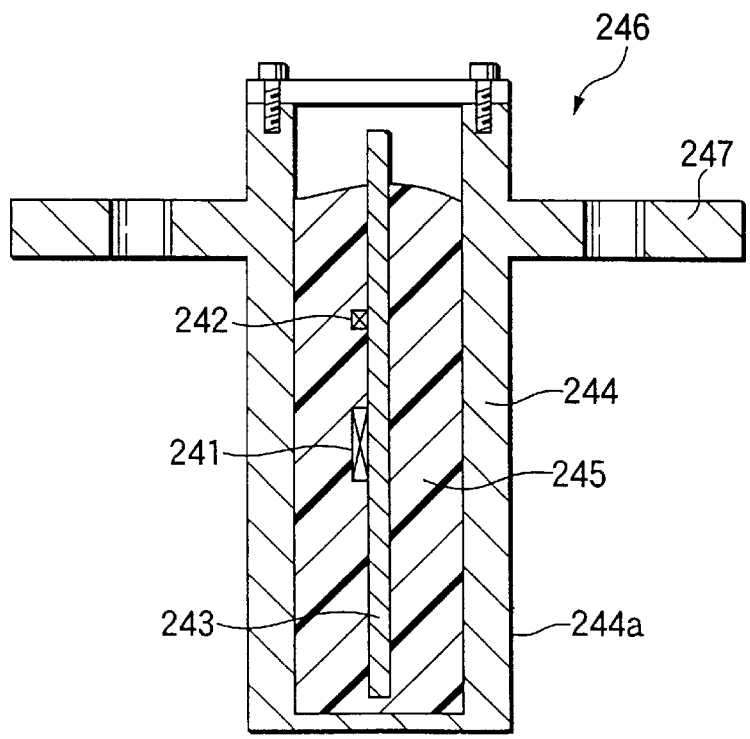
FIG. 64 is a sectional view showing a related-art sensor.

FIGS. 1 and 2 show a first embodiment of the present invention. The present invention has a feature that a rotation speed sensor 27a for detecting the rotation speed of an axle shaft 1, which serves as a rotating shaft, and a temperature sensor 29a for detecting the temperature of a rolling bearing rotatably supporting the axle shaft 1 are retained in a single sensor holder 33 (sensor envelope), thereby solving the drawbacks of the related-art construction. In other respects, the present invention is identical in structure and operation with the rotating support apparatus of related-art construction shown in FIGS. 63 and 64. Hence, like parts are assigned like reference numerals, and explanations of overlapping features are omitted or simplified. Hereinbelow, descriptions of primarily the features of the present invention will be provided.

In the present invention, an outward flange section 34 is formed along the entire outer circumferential surface of an outer end section of an annular member 12a called an oil thrower, which is situated axially inside the nut 14. Projections and depressions are alternately formed in an outer rim of the flange section 34 and at uniform intervals in the circumferential direction. The magnetic characteristic of the outer rim is changed alternately at uniform intervals in the circumferential direction. The flange section 34 is imparted with the function of an encoder for detecting a rotation speed.

Figure 59:
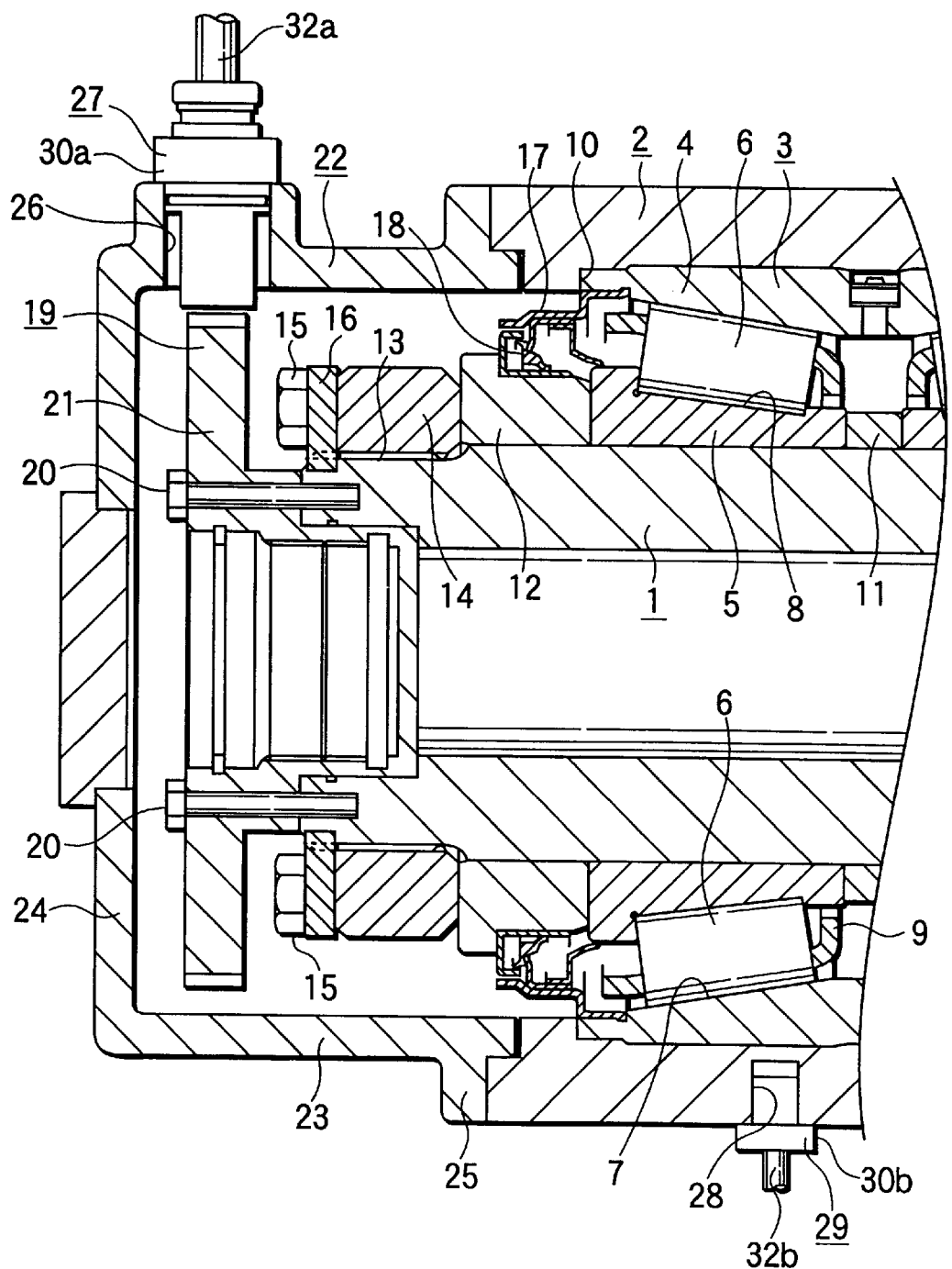
FIG. 59 is a cross-sectional view taken along line B-O-C shown in FIG. 60, showing one example structure of a related-art rotating support apparatus.
Figure 60:
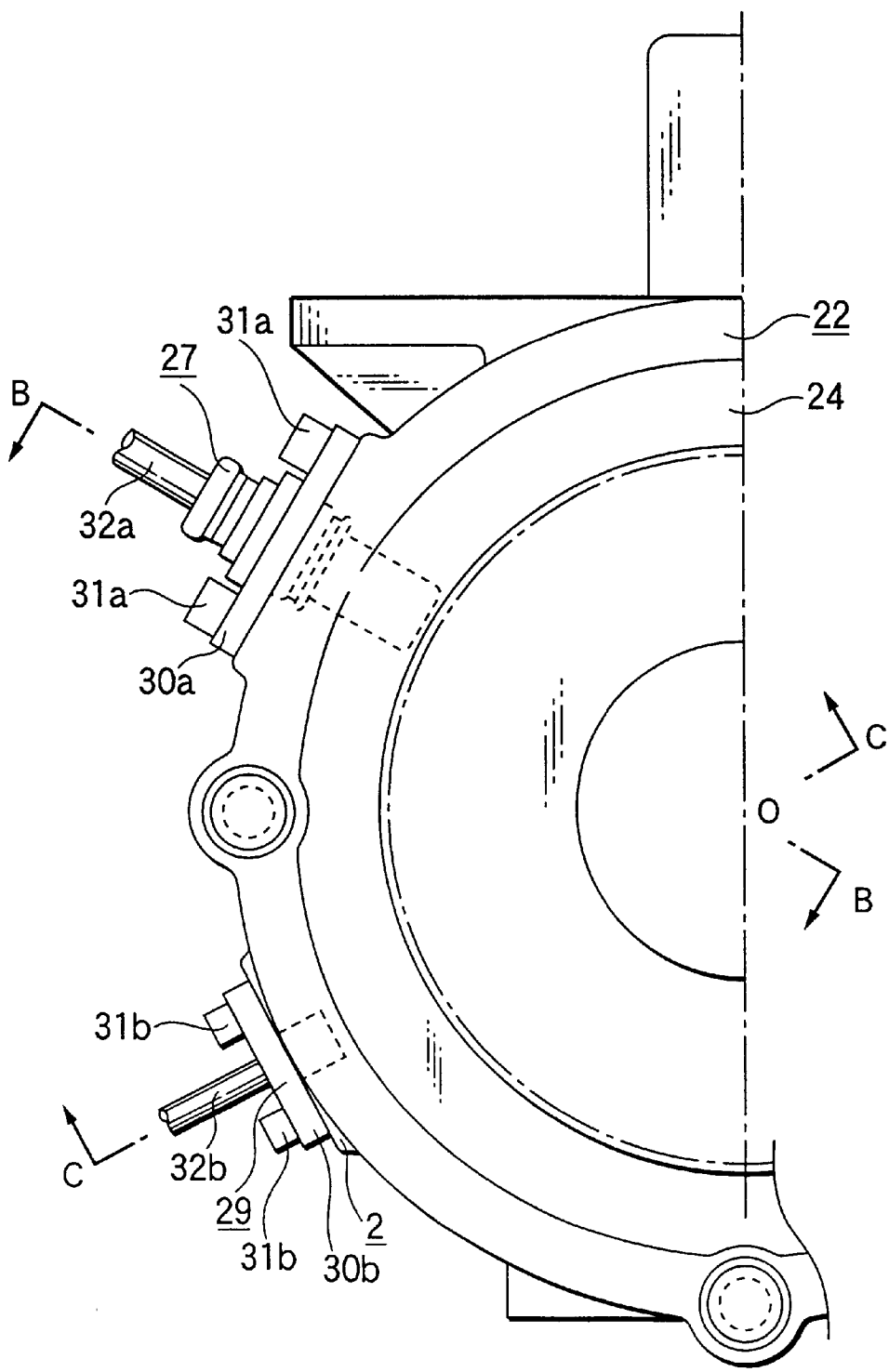
FIG. 60 is a view of the rotating support apparatus when viewed from the left in FIG. 59.
Figure 61:
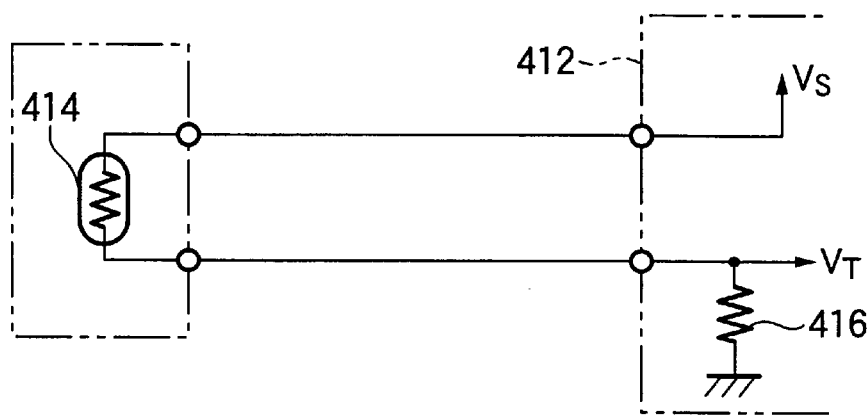
FIG. 61 is a circuit diagram showing a related-art bearing temperature sensor.
Figure 62:
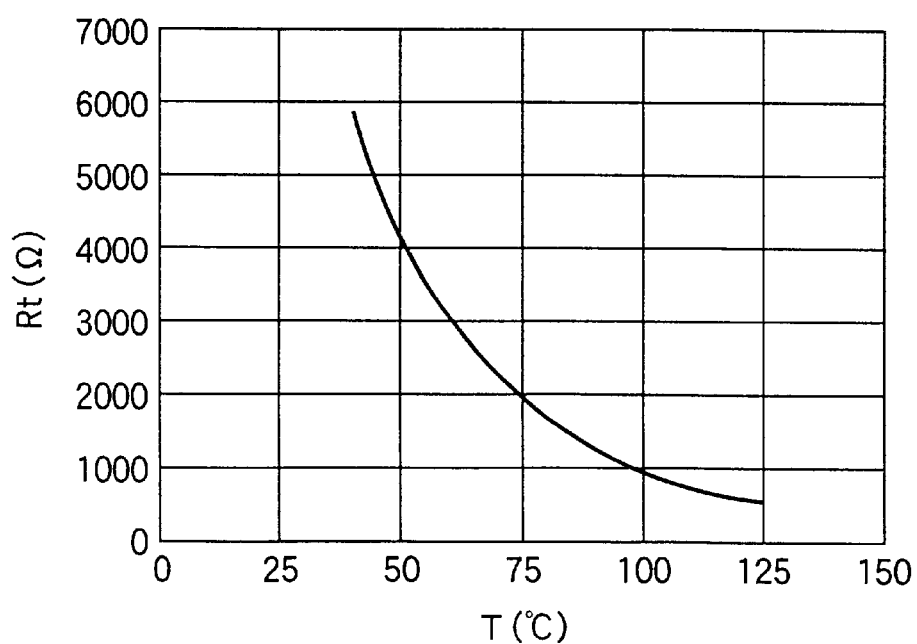
FIG. 62 is a chart showing a resistance value characteristic of an NTC thermistor with respect to temperature.

When compared with the related-art construction shown in FIG. 59 in which the encoder 19 is provided outside the nut 14 in the axial direction thereof, the construction of the rotating support apparatus according to the present embodiment enables provision of a sensor unit 35 to be described later in a position close to an outer ring 4 in the axial direction. Hence, the temperature detecting performance of the temperature sensor 29a to be described later can be improved. Moreover, projections and depressions are formed in the outer rim of the flange section 34 formed on the outer circumferential surface of the annular member 12a, thus imparting the function of an encoder to the annular member 12a. When compared with the related-art construction set forth, the construction of the rotating support apparatus according to the present invention yields advantages, such as a reduction in the number of parts, shortening of the axial dimension of the rotating support apparatus, a reduction in the weight of the same, and cutting of costs.

A cylindrical portion 23a constitutes a cover 22a made of metal, such as steel or aluminum, which closes an opening at the end of the journal box 2. A sensor mount hole 26a is formed at a proximal position on the cylindrical portion 23a (i.e., a position close to the right-side end shown in FIG. 1) so as to penetrate from the outer circumferential surface of the cylindrical portion 23a to the inner circumferential surface of the same. The sensor unit 35 is inserted into the sensor mount hole 26a from the outside of the cylindrical portion 23a to the inside of the same in a radial direction of the cylindrical portion 23a.

The sensor unit 35 is constituted by means of retaining the rotation speed sensor 27a and the temperature sensor 29a in the single sensor holder 33. Of these parts, the rotation speed sensor 27a is embodied by use of one which is constituted of a magnetic resistant element, a hole element, or a combination of a permanent magnet and a magnetic coil and which changes output in accordance with changes in magnetic flux density or the direction of magnetic flux, as in the case of a related-art rotation speed sensor. Such a rotation speed sensor 27a is embedded in the extremity of the sensor holder 33, and a detecting surface of the rotation speed sensor 27a is arranged so as to closely oppose the outer rim of the flange section 34. In contrast, the temperature sensor 29a is supported in a position close to the outer circumferential surface of the sensor holder 33. The position at which the temperature sensor 29a is to be supported is set as close as possible to the cover 22a, where the temperature sensor 29a is vulnerable to heat transferring from the outer ring 4 to the cover 22a.

In order to improve the temperature detecting performance of the temperature sensor 29a, the sensor holder 33 must have good heat conductivity. Further, in order to cause the temperature of the sensor holder 33 to reach ambient temperature within a short period of time, the sensor holder 33 must have small heat capacity. Material having large heat conductivity and small per-volume heat capacity (=density× specific heat) is suitable for the sensor holder 33. More specifically, use of aluminum, magnesium, copper, zinc, or their alloys, each having the foregoing characteristics, as material of the sensor holder 33 is preferable, so long as these materials raise no problem in terms of strength and cost. In order to facilitate transfer of heat from the outer ring 4 to the temperature sensor 29a, these materials are used as material of the journal box 2 and that of the cover 22a, so long as the materials pose no problem in terms of strength and cost. If the materials pose a problem in terms of strength, stainless steel may also be employed. However, even when stainless steel is employed as material of the sensor holder 33, non-magnetic stainless steel such as austenite stainless steel is employed. The reason for this is that, if the sensor holder 33 is made of magnetic stainless steel, magnetic properties of the sensor holder 33 will hinder the rotation speed sensor 27a from measuring a rotation speed, thus posing difficulty in accurate measurement of rotation speed. For this reason, non-magnetic stainless steel is preferable as material of the sensor holder 33.

While the above-mentioned sensor unit 35 remains inserted in the sensor mount hole 26a from the outside to the inside of the cylindrical portion 23a in the radial direction thereof, amount flange 30c provided on the outer circumferential surface of the sensor unit 35 is fixedly coupled to the outer circumferential surface of the cylindrical portion 23a by means of bolts 31c, 31c. In this state, a detecting section of the rotation speed sensor 27a located at the end face of the sensor unit 35 closely opposes a detected section provided on the outer rim of the flange section 34 with a minute clearance provided therebetween. The temperature sensor 29a closely opposes the cylindrical portion 23a of the cover 22a via a portion of the sensor holder 33. A harness which serves as a conductor for acquiring a signal output from the rotation speed sensor 27a (hereinafter simply called a "harness") and another harness for acquiring output from the temperature sensor 29a are bundled into a single cable 36, and the cable 36 is connected to an unillustrated controller. An O-ring 42 is fitted between a portion of the outer circumferential surface of the sensor holder 33 and the inner circumferential surface of the sensor mount hole 26a, thereby preventing entry of extraneous matter, such as muddy water, via a clearance between these circumferential surfaces.

As mentioned above, in the case of the rotating support apparatus with sensor according to the present invention, the single sensor holder 33 retains the rotation speed sensor 27a and the temperature sensor 29a, thus reducing the space to be occupied by the sensors 27a and 29a and facilitating mounting of the same. The harnesses for acquiring signals output from the sensors 27a and 29a are bundled into the single cable 36, thereby facilitating routing of the harnesses for acquiring signals from the sensors 27a and 29a. In the present embodiment, the sensor unit 35 is supported on the cover 22a, which is removably attached to the opening section of the journal box 2. Hence, at the time of maintenance and inspection, the sensor unit 35 can be readily removed or attached.

The harness for acquiring a signal output from the rotation speed sensor 27a and the harness for acquiring a signal output from the temperature sensor 29a are shielded individually while being housed in the single cable 36. Even when a plurality of harnesses are bundled into the single cable 36, there can be prevented occurrence of interference, which would otherwise arise in signal currents flowing through the harnesses, by means of shielding the harnesses individually. Particularly, when a harness for sending a pulse-like signal—which represents a rotation speed and is output from the rotation speed sensor 27a—and a harness for delivering an analog signal—which is output from the temperature sensor 29a and represents a temperature—are bundled together, noise appears in the analog signal for reasons of electromagnetic coupling (electrostatic coupling, electromagnetic induction, or coupling of electromagnetic waves) at the time of occurrence of variations in a pulse-like voltage or current. By means of shielding the harnesses individually, there can be prevented occurrence of noise, which would otherwise arise in the manner mentioned above.

More preferably, the harnesses for acquiring signals output from the respective sensors 27a and 29a and a ground line for grounding purpose are stranded (twisted), thereby further diminishing influence of noise stemming from electromagnetic coupling. An effect of dampening influence of noise can be further increased, by means of individually shielding a twisted pair consisting of the stranded harnesses and the ground line or collectively shielding all the twisted pairs. Particularly, under the situation in which the rotation speed sensor 27a outputs a digital signal, when the harness for delivering a signal output from the rotation speed sensor 27a and the harness for delivering an analog signal output from the temperature sensor 29a (also a signal output from a vibration sensor to be incorporated into a fifth embodiment shown in FIG. 6, such as an acceleration sensor 40) are bundled into the single cable 36, the effect of stranding the harnesses for delivering the output signals and the ground line is great.

In the illustrated embodiment, projections and depressions are formed in the outer rim of the flange section 34 formed integrally with the annular member 12a, thereby assembling the annular member 12a and the encoder into a single piece. Alternatively, an independent disk-shaped encoder can be sandwiched between the annular member 12a and the nut 14, or projections and depressions can be formed in the outer rim of an outward flange section formed integrally with the outer circumferential surface of the inner end section of the nut 14, so that the encoder is integrated with the nut 14. As an encoder, there may also be employed an annular encoder which is constituted by bending a magnetic metal plate and forming a plurality of through holes in a portion of the thus-folded metal plate in a circumferential direction of the plate; or an annular permanent magnet having S-poles and N-poles alternately arranged in the circumferential direction thereof. Even in these cases, the sensor unit 35 can be provided at a position close to the outer ring in the axial direction of the sensor unit. When compared with the related-art construction in which the encoder is located outside the nut in the axial direction thereof, the construction according to the present embodiment enables improvement in the temperature detecting performance of the temperature sensor 29a. Alternatively, in order to enable the temperature sensor 29a to accurately detect arise in the temperature of the double row tapered roller bearing 3, a windshield plate can be provided for covering a portion of the sensor unit 35 projecting from the outer circumferential surface of the cover 22a, thus preventing the sensor unit 35 from being cooled by outside air. The direction in which the cable 36 is to be led from the sensor unit 35 is not limited to a diametrical direction such as that illustrated; the cable 36 may be led in any direction, such as a tangential direction or the direction of intermediate of the cable 36, in accordance with a location where the cable 36 is to be provided, as required. In this case, an L-shaped portion for guiding a leading direction of the cable 36 may be provided at the root of the cable 36.

Figure 3:
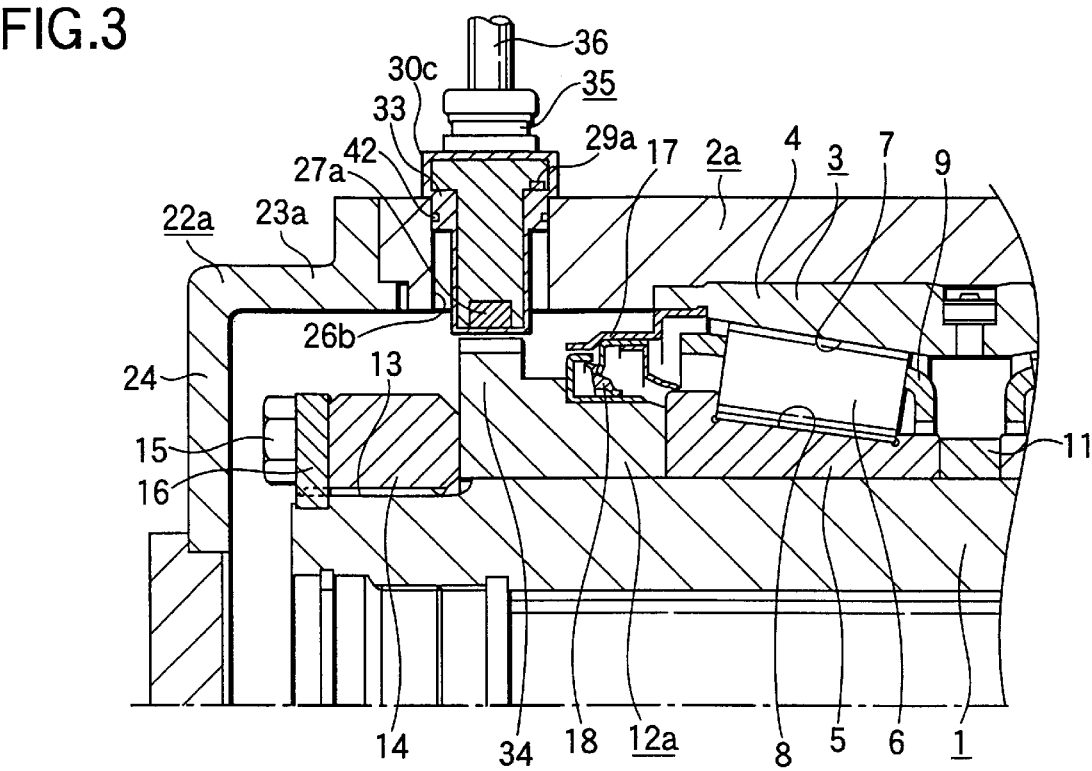
FIG. 3 is a cross-sectional view showing the characteristic portion of a second embodiment of the present invention.

FIG. 3 shows a second embodiment of the present invention. In the present embodiment, the journal box 2a extends so as to surround the annular member 12a, and the sensor mount hole 26b is formed in the end section of the journal box 2a.

In contrast with the first embodiment, the present embodiment may encounter a disadvantage of processing of a sensor mount bearing surface or the sensor mount hole 26b becoming troublesome; a disadvantage of the axial dimension of the journal box 2a becoming larger, thereby rendering the rotating support apparatus heavier (increasing the dimension of the journal box rather than increasing the axial dimension of the cover tends to induce an increase the weight of a rotating support apparatus); or a disadvantage of an operation for removing and attaching the sensor unit 35 from and to the sensor mount hole 26b for maintenance and inspection purpose becoming troublesome to some degree. However, transfer of heat from the outer ring 4 constituting the double row tapered roller bearing 3 to the temperature sensor 29a is improved as compared with the case of the first embodiment.

Figure 4:
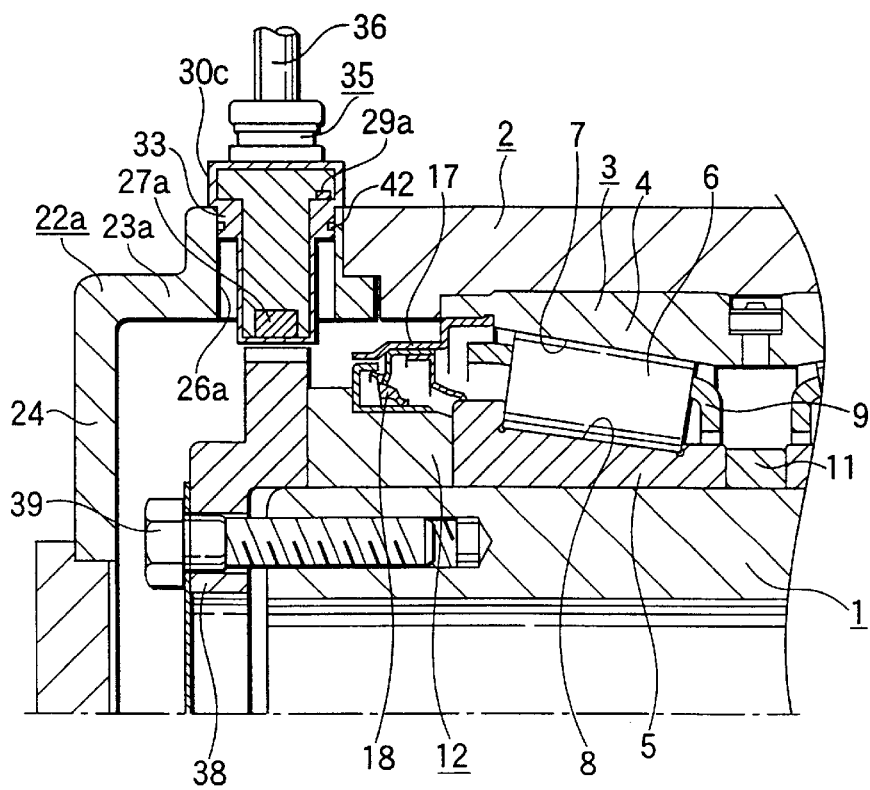
FIG. 4 is a cross-sectional view showing the characteristic portion of a third embodiment of the present invention.

FIG. 4 shows a third embodiment of the present invention. In the present embodiment, in order to retain the inner rings 5 and the annular member 12 in the axial direction, a holding plate 38 formed so as to have an overall disk-like shape and a crank-shaped profile in cross section is fixedly coupled to the end face of the axle shaft 1 by means of the plurality of bolts 39. Projections and depressions are alternately formed at uniform intervals in the circumferential direction along the outer rim of the holding plate 38, thus changing the magnetic properties of the outer rim alternately and at uniform intervals in the circumferential direction. Thus, the holding plate 38 is imparted with the function of an encoder for detecting a rotation speed.

In other respects, the present embodiment is identical in construction and operation with the first embodiment, and hence explanations of the same elements are omitted.

Figure 5:
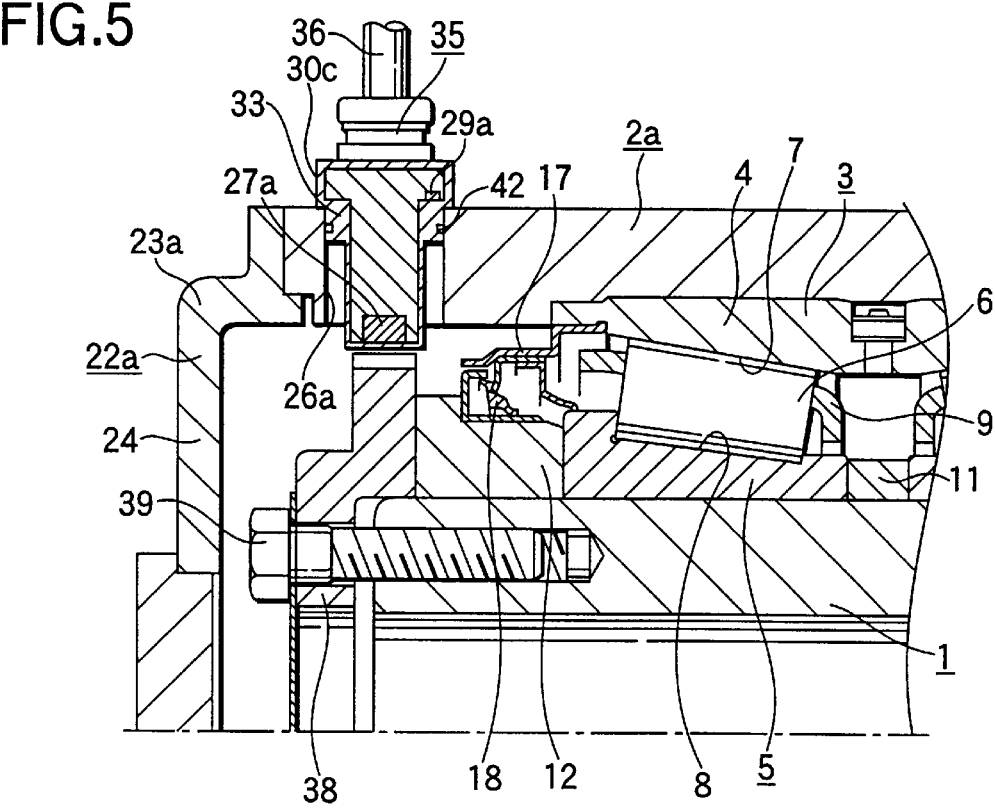
FIG. 5 is a cross-sectional view showing the characteristic portion of a fourth embodiment of the present invention.

FIG. 5 shows a fourth embodiment of the present invention. In the present embodiment, the journal box 2a is extended so as to surround the holding plate 38, and a sensor mount hole 26b is formed in the end section of the journal box 2a.

In contrast with the third embodiment, the present embodiment encounters a disadvantage of processing of a sensor mount bearing surface or the sensor mount hole 26b becoming troublesome; a disadvantage of the axial dimension of the journal box 2a becoming larger, thereby rendering the rotating support apparatus heavier; or a disadvantage of an operation for removing and attaching the sensor unit 35 from and to the sensor mount hole 26b for maintenance and inspection purpose becoming troublesome to some degree. However, transfer of heat from the outer ring 4 constituting the double row tapered roller bearing 3 to the temperature sensor 29a is improved as compared with the case of the third embodiment.

In other respects, the present embodiment is identical in construction and operation with the third embodiment, and hence explanations of the same elements are omitted.

Figure 6:
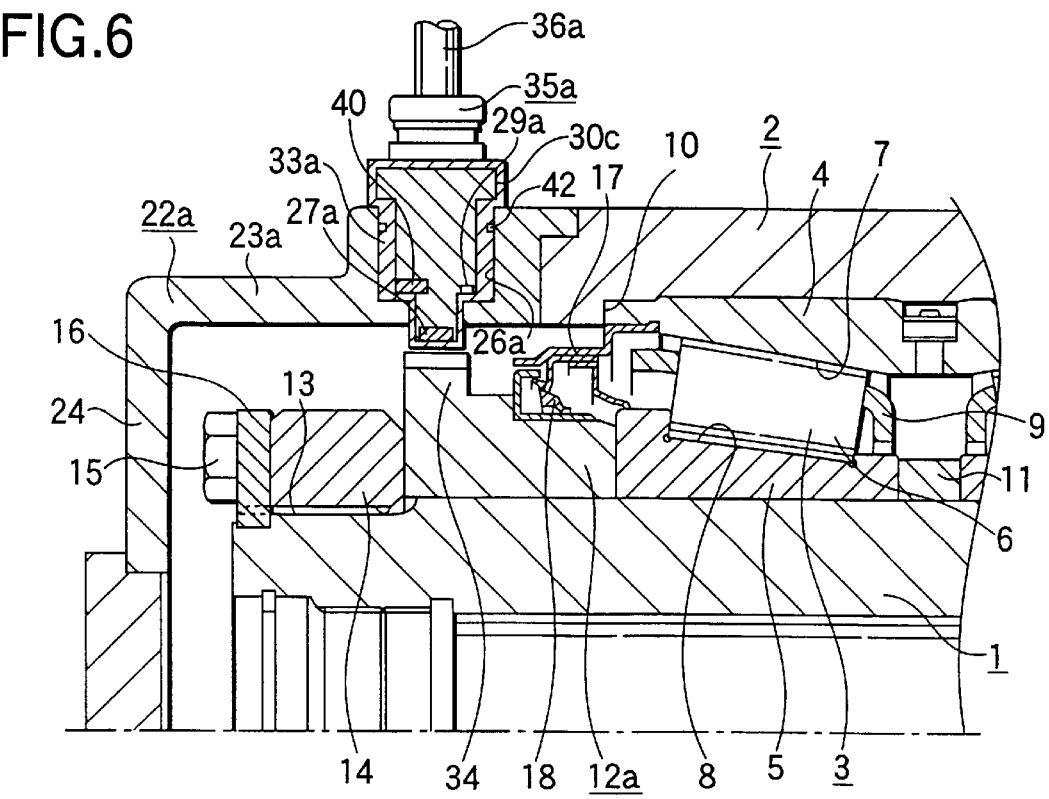
FIG. 6 is a cross-sectional view showing the characteristic portion of a fifth embodiment of the present invention.

FIG. 6 shows a fifth embodiment of the present invention. In the present embodiment, the diameter of the intermediate portion of the sensor holder 33a is made larger than that of the extremity of the sensor holder 33a, thus forming a step in the outer circumferential surface of the sensor holder 33a. The temperature sensor 29a is provided in a position adjacent to the step formed in a location close to the extremity of the sensor holder 33a. In order to realize superior transfer of heat to the temperature sensor 29a, material identical with that of the cover 22a (e.g., iron) covers the extremity and the step of the sensor holder 33a. In the present embodiment, an acceleration sensor 40 (a vibration sensor) for detecting vibration is housed in the sensor holder 33a along with the rotation speed sensor 27a and the temperature sensor 29a, thus constituting a sensor unit 35a. A harness for acquiring signal output from the acceleration sensor 40 is bundled with the harnesses for acquiring signals output from the rotation speed sensor 27a and from the temperature sensor 29a, thus constituting the single cable 36a.

Even in the present embodiment, the harness for acquiring signal output from the rotation speed sensor 27a, the harness for acquiring signal output from the temperature sensor 29a, and the harness for acquiring signal output from the acceleration sensor 40 are housed in the single cable 36. As in the case of the first embodiment, the harnesses are stranded with the ground line and shielded individually, and a twisted pair stranded with the ground line is shielded, thereby preventing occurrence of interference, which would otherwise arise between signal currents flowing through the harnesses. Particularly, when a harness for sending a pulse-like signal, which represents a rotation speed and is output from the rotation speed sensor 27a; a harness for delivering an analog signal, which is output from the temperature sensor 29a and represents a temperature; and a harness for delivering an analog signal, which is output from the acceleration sensor 40 and represents vibration, are bundled together, noise appears in the analog signal for reasons of electromagnetic coupling at the time of occurrence of changes in a pulse-like voltage or current. By means of stranding each harness with a ground line, shielding the harnesses individually, or shielding a twisted pair stranded with a ground line, there can be prevented occurrence of noise in the manner mentioned previously. In the case of a harness for delivering a signal of small output power, such as a signal which is output from the acceleration sensor 40 and represents vibration, shielding and twisting of harnesses yields a strong noise prevention effect. For these reasons, shielding and twisting of harnesses is preferable. Although an effect is yielded by mere shielding of each harness or mere twisting each harness with a ground line, the combination of shielding of each harness and twisting each harness with a ground line yields a superior noise prevention effect. In this case, collectively shielding surroundings of a twisted pair, the pair consisting of a harness for delivering an output signal and a ground line, is most preferable. Noise can be eliminated to some degree, by means of providing a low-pass filter in the circuit or a measuring instrument of the sensors 27a, 29a, and 40.

In the present embodiment, the sensor holder 33a is provided not only with the temperature sensor 29a but also with the acceleration sensor 40 serving as a vibration sensor for detecting vibration. In the event that an abnormality, such an occurrence of flaking, has arisen in the double row tapered roller bearing 3, the status of flaking of the double row tapered roller bearing 3 can be sensed immediately. In contrast with the case where only the temperature sensor 29a is provided, the present embodiment enables realization of a construction suitable for monitoring an abnormality in a rolling bearing. In a case where monitoring of an abnormality in a roller bearing and monitoring of a rotation speed are intended, a combination of three types of sensors; that is, the rotation speed sensor 27a, the temperature sensor 29a, and a vibration sensor, such as the acceleration sensor 40, is most preferable. An abnormality in a roller bearing and a rotation speed can be monitored by a combination of the rotation speed sensor 29a and a vibration sensor, such as the acceleration sensor 40, or by a combination of the rotation speed sensor 29a and the temperature sensor 20a. In a case where monitoring only an abnormality in a roller bearing is intended, there is employed a combination of the temperature sensor 29a and a vibration sensor, such as the acceleration sensor 40, and the rotation speed sensor 27a can be omitted. In this case, there is no necessity for forming projections and depressions in the outer rim in the flange section 34. Alternatively, even when a harness for delivering a signal output from the temperature sensor 29a and a harness for delivering a signal output from a vibration sensor, such as the acceleration sensor 40, are combined together, if the vibration sensor has detected a large vibration value (i.e., a large amplitude of a signal representing vibration), twisting each harness with the ground line, shielding the harnesses individually, or shielding a twisted pair stranded with the ground line is preferable.

In other respects, the present embodiment is identical in construction and operation with the first embodiment, and hence explanations of comparable elements are omitted.

Figure 7:
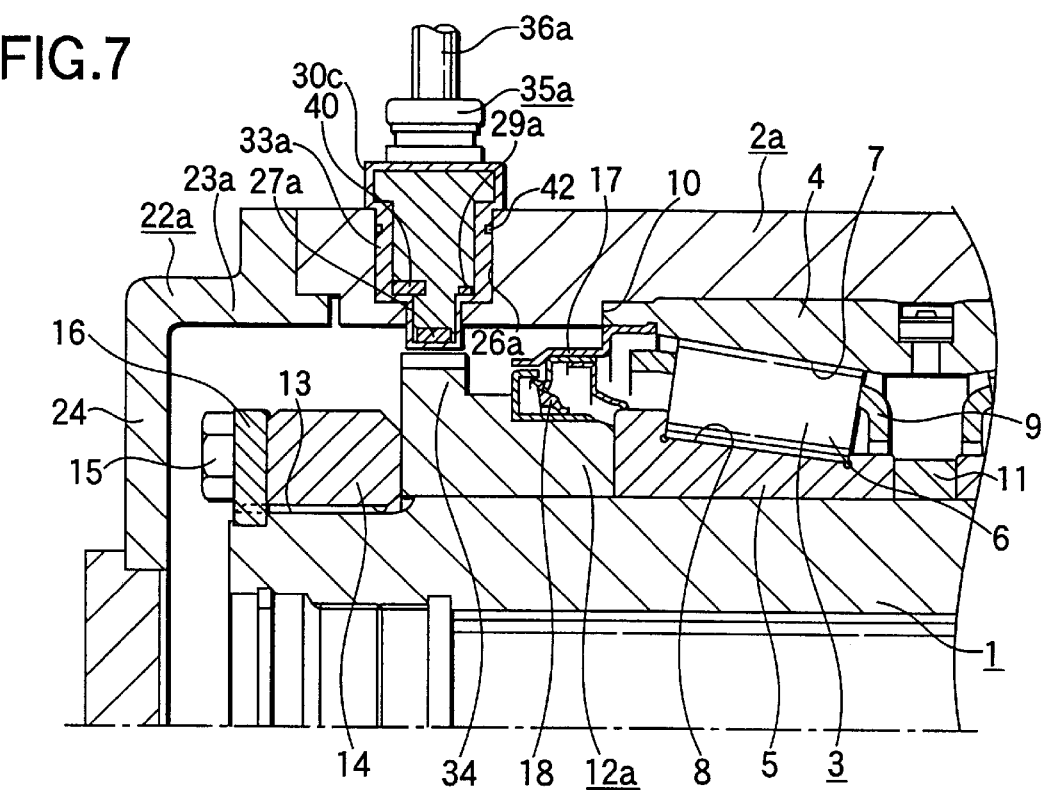
FIG. 7 is a cross-sectional view showing the characteristic portion of a sixth embodiment of the present invention.

FIG. 7 shows a sixth embodiment of the present invention. In the present embodiment, the journal box 2a is extended so as to surround the annular member 12a, and the sensor mount hole 26b is formed in the end of the journal box 2a.

In contrast with the fifth embodiment, the present embodiment encounters a disadvantage of processing of a sensor mount bearing surface or the sensor mount hole 26b becoming troublesome; a disadvantage of the axial dimension of the journal box 2a becoming larger, thereby rendering the rotating support apparatus heavier; or a disadvantage of an operation for removing and attaching the sensor unit 35 from and to the sensor mount hole 26b for maintenance and inspection purpose becoming troublesome to some degree. However, transfer of heat from the outer ring 4 constituting the double row tapered roller bearing 3 to the temperature sensor 29a is improved as compared with the case of the fifth embodiment.

In other respects, the present embodiment is identical in construction and operation with the fifth embodiment, and hence explanations of the same elements are omitted.

Figure 8:
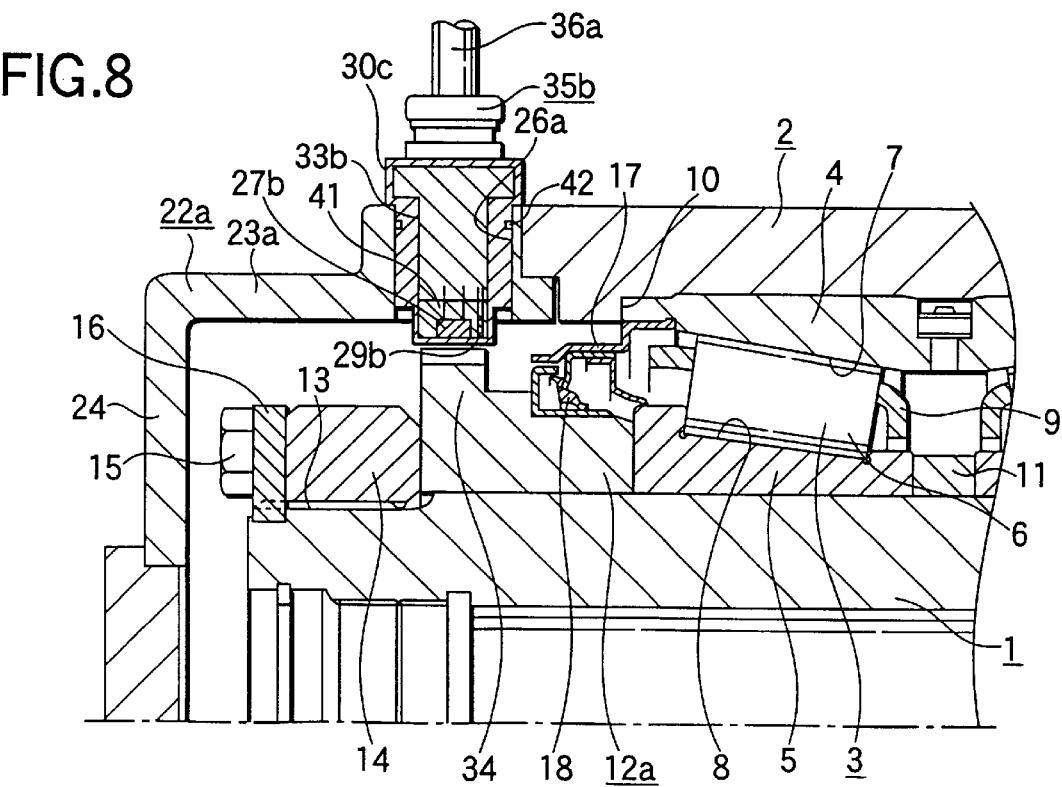
FIG. 8 is a cross-sectional view showing the characteristic portion of a seventh embodiment of the present invention.

FIG. 8 shows a seventh embodiment of the present invention. In the present embodiment, a rotation speed sensor 27b and a temperature sensor 29b are embedded in a single retained block 41 made of synthetic resin. The retained block 41 is held at the extremity of a sensor holder 33b, thereby constituting a sensor unit 35b. Alternatively, the rotation speed sensor 27b and the temperature sensor 29b can be molded at the extremity of the sensor holder 33b, simultaneous with molding of the sensor holder 33b.

In the case of the construction of the rotating support apparatus according to the present embodiment, the temperature sensor 29b is situated within the cover 22a, and hence the temperature sensor 29b can detect the temperature of the double row tapered roller bearing 3 in a more reliable manner and without being subjected to the influence of outside air.

In other respects, the present embodiment is identical in construction and operation with the first embodiment, and hence explanations of the same elements are omitted.

Figure 9:
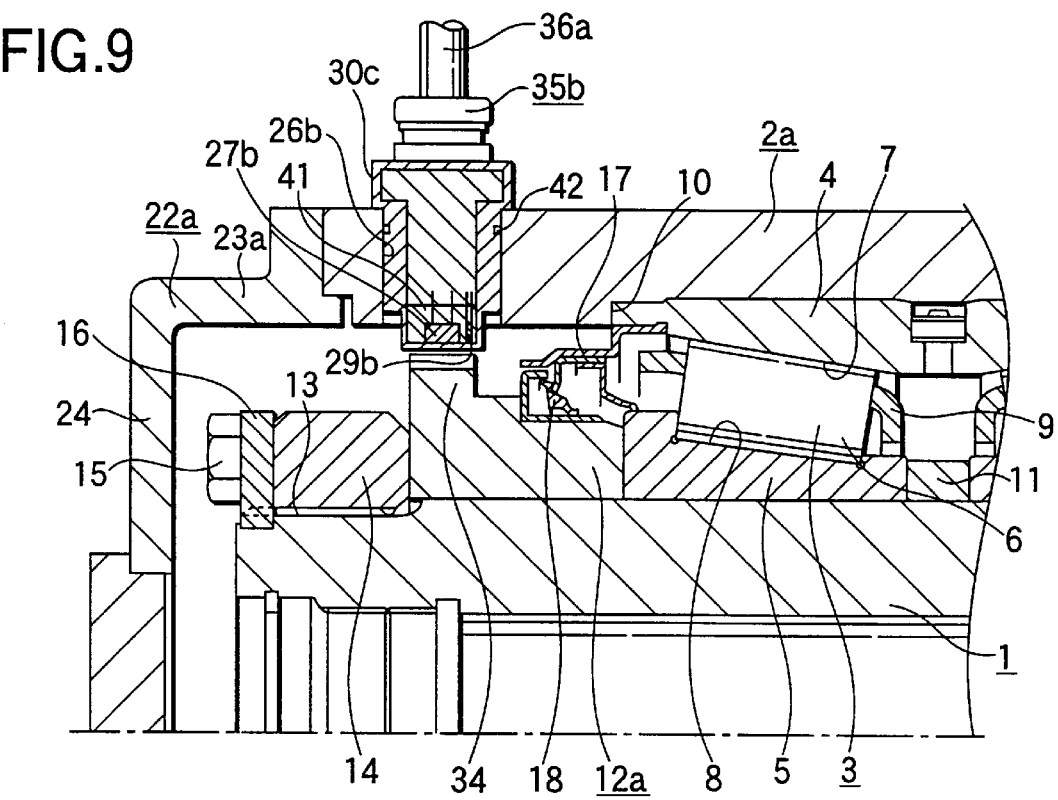
FIG. 9 is a cross-sectional view showing the characteristic portion of an eighth embodiment of the present invention.

FIG. 9 shows an eighth embodiment of the present invention. In the present embodiment, the journal box 2a is extended so as to surround the annular member 12a, and the sensor mount hole 26b is formed in the end of the journal box 2a.

In contrast with the seventh embodiment, the present embodiment encounters a disadvantage of processing of a sensor mount bearing surface or the sensor mount hole 26b becoming troublesome; a disadvantage of the axial dimension of the journal box 2a becoming larger, thereby rendering the rotating support apparatus heavier; or a disadvantage of an operation for removing and attaching the sensor unit 35b from and to the sensor mount hole 26b for maintenance and inspection purpose becoming troublesome to some degree. However, transfer of heat from the outer ring 4 constituting the double row tapered roller bearing 3 to the temperature sensor 29a is improved as compared with the case of the seventh embodiment.

In other respects, the present embodiment is identical in construction and operation with the seventh embodiment, and hence explanations of the same elements are omitted.

Figure 10:
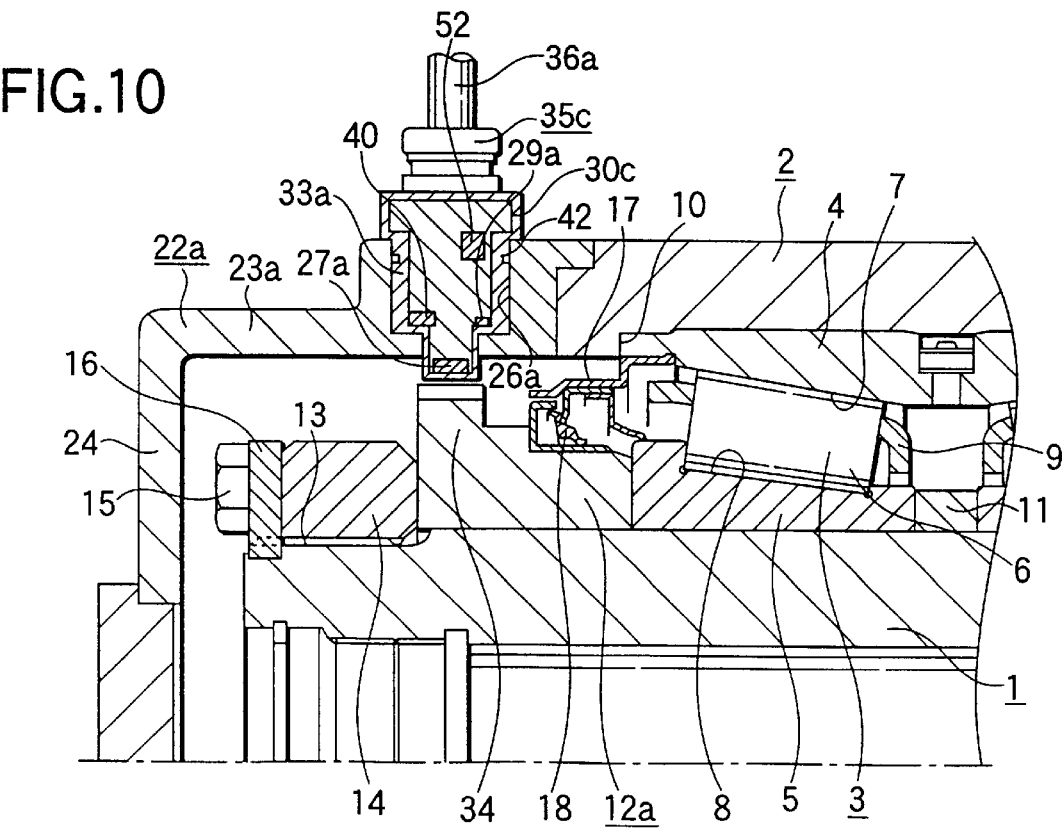
FIG. 10 is a cross-sectional view showing the characteristic portion of a ninth embodiment of the present invention.
Figure 11:
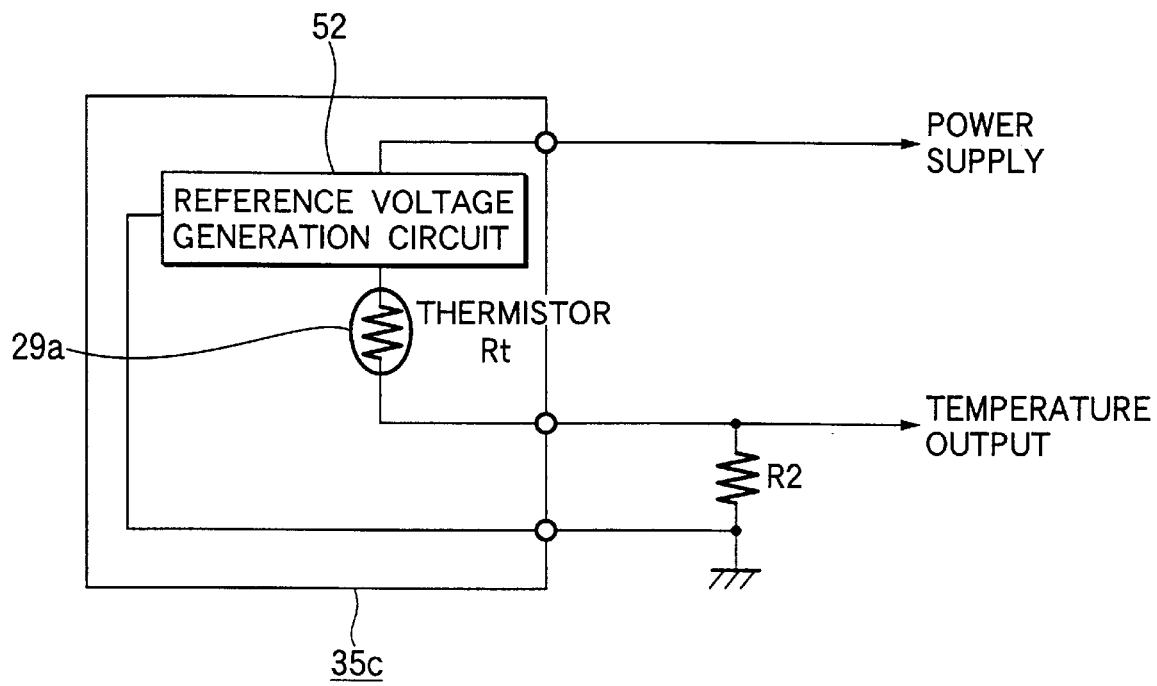
FIG. 11 is a circuit diagram showing a reference voltage generation circuit to be built in a sensor unit constituting the ninth embodiment.

FIGS. 10 and 11 show a ninth embodiment of the present invention. In connection with the construction of the rotating support apparatus according to the present embodiment, a reference voltage generation circuit 52 is retained in the sensor holder 33a constituting a sensor unit 35c, along with the rotation speed sensor 27a, the temperature sensor 29a, and the acceleration sensor 40 serving as a vibration sensor. The reference voltage generation circuit 52 is for generating a reference voltage to be supplied to at least one of the temperature sensor 29a and the acceleration sensor 40 (the temperature sensor 29a in the present embodiment). For instance, a constant voltage regulator, a DC-DC converter, a reference voltage IC, or a constant voltage diode can be used as the reference voltage generation circuit 52. In the present embodiment, such a reference voltage generation circuit 52 is connected to a power supply circuit of the temperature sensor 29a in such a manner as shown in FIG. 11, thereby supplying to the temperature sensor 29a a predetermined reference voltage (having an invariable, accurate value). FIG. 11 shows a case in which using the constant voltage regulator, a reference voltage; that is, 5V, is produced from a supply voltage; that is, DC 12V, and the thus-produced reference voltage is supplied to a thermistor serving as the temperature sensor 29a. In addition to an NTC thermistor (negative temperature coefficient thermistor), a PTC thermistor (positive temperature coefficient thermistor), and a CTR thermistor (critical temperature register thermistor), a thermistor made of silicon (e.g., a silicon thermistor) can be used as the thermistor constituting the temperature sensor 29a. In addition to a thermistor, a resistance temperature sensor (RTD) or a temperature IC (integrated circuit temperature sensor) can also be used as the temperature sensor 29a.

In the present embodiment, a reference voltage produced by the reference voltage generation circuit 52 is supplied to the temperature sensor 29a, thereby enabling accurate measurement of a temperature. The supply voltage (DC 12V) varies in accordance with the ambient temperature of a power source, variations in loads connected to the power source, and variations in the external environment. When the supply voltage is supplied to the temperature sensor 29a such as a thermistor, a voltage output from the temperature sensor 29a, the voltage representing a value measured by the temperature sensor 29a, also varies, thus hampering accurate measurement. In contrast, in the present embodiment, the reference voltage generation circuit 52 sends a constant reference voltage to the temperature sensor 29a without regard to variations in the external environment, thereby enabling accurate measurement. Needless to say, the supply voltage and the reference voltage are not limited to those mentioned above and can be selected in accordance with the characteristics of the power source or those of the temperature sensor 29a, as required.

Figure 12:
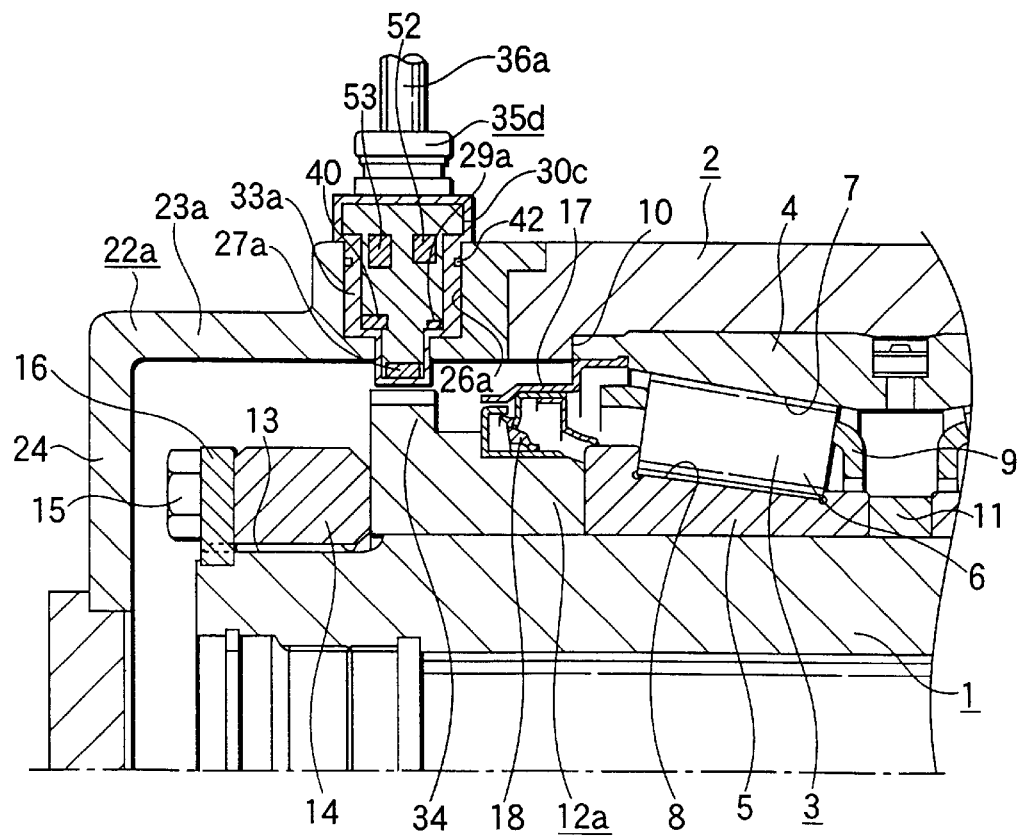
FIG. 12 is a cross-sectional view showing the characteristic portion of a tenth embodiment of the present invention.
Figure 13:
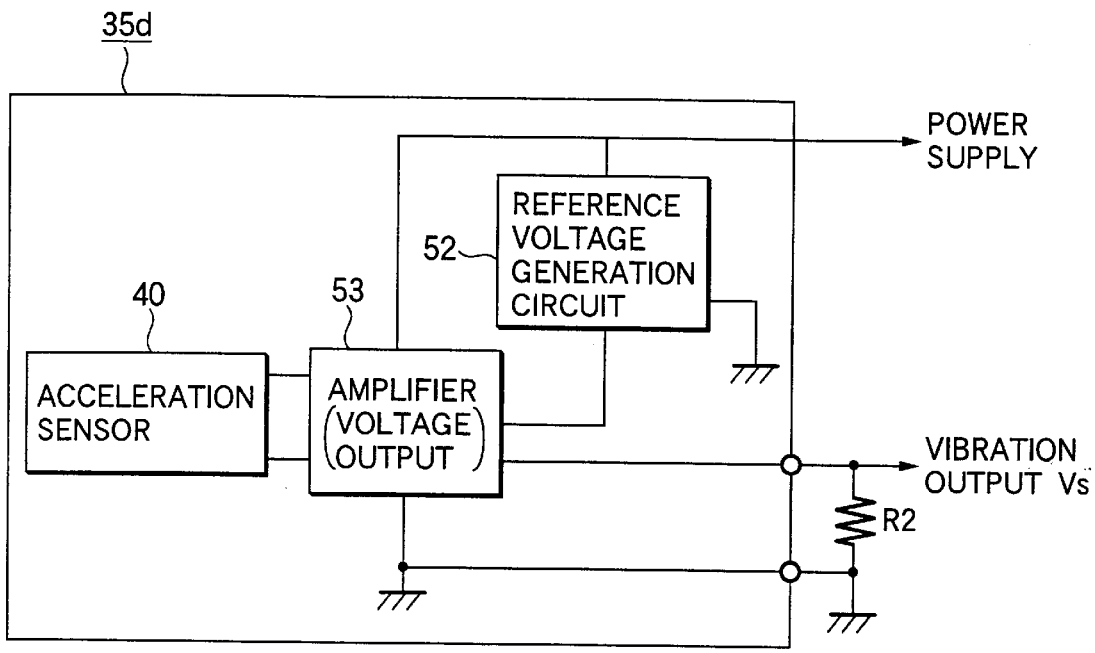
FIG. 13 is a circuit diagram showing an example of an amplifying circuit to be built in a sensor unit constituting the tenth embodiment.

FIGS. 12 and 13 show a tenth embodiment of the present invention. In the present embodiment, the reference voltage generation circuit 52 and an amplifying circuit (amplifier) 53 are retained in the sensor holder 33a constituting a sensor unit 35d, along with the rotation speed sensor 27a, the temperature sensor 29a, and the acceleration sensor 40 serving as a vibration sensor. As a result of the acceleration sensor 40 being combined with the reference voltage generation circuit 52 and the amplifying circuit 53 in the manner mentioned above, the acceleration sensor 40 can accurately measure the vibration exerted on the double row tapered roller bearing 3, without use of an expensive circuit. The reason for this will now be described.

A sensor of bimorph type mounted in a fixed beam manner using a piezoelectric element is used as the acceleration sensor 40 (vibration sensor) to be incorporated into the rotating support apparatus having the foregoing construction. In the acceleration sensor 40 of such a type, a bimorph—which is a piezoelectric element supported in a fixed beam manner—is deformed by the acceleration of vibration, and a vibration level is measured on the basis of electric charges stemming from deformation of the bimorph. The acceleration sensor 40 (or vibration sensor) is not limited to the sensor of bimorph type mounted in a fixed beam manner; a sensor having a piezoelectric element supported in a cantilever fashion or a vibration sensor using an annular piezoelectric element may also be used.

Moreover, an acceleration sensor (vibration sensor) using a strain gauge in lieu of a piezoelectric element can also be used. Even when any one of the above-described sensors is used, electric charge proportional to the magnitude of acceleration exerted on the acceleration sensor 40 usually appears in an output terminal of the acceleration sensor 40 (vibration sensor) in accordance with the direction of acceleration. Accordingly, a "positive" voltage and a "negative" voltage develop, in appearance, in the output terminal of the acceleration sensor 40.

If the positive and negative output voltages are amplified as it is, a negative power supply as well as a positive power supply must be prepared, thus complicating a power supply circuit correspondingly and increasing costs. In the present embodiment, however, the reference voltage produced by the reference voltage generation circuit 52 is taken as a reference, and the voltage of a signal output from the acceleration sensor 40 is offset by an amount corresponding to the reference voltage (i.e., the reference voltage is added to the voltage of an output signal), thereby causing the voltage of the output signal to change within only a "positive" range and obviating a necessity for preparing a "negative" power source. In the present embodiment, a circuit shown in FIG. 13 processes the voltage of a signal output from the acceleration sensor 40 while a reference voltage (5V) produced by the reference voltage generation circuit 52 is taken as a reference. More specifically, changes in the voltage of the signal output from the acceleration sensor 40 with respect to the reference voltage are amplified by an operation amplifier used as the amplifying circuit 53, whereby the thus-amplified changes are delivered (output) as a signal output from the acceleration sensor 40.

Thus, the signal output from the acceleration sensor 40 is delivered after having been amplified. Hence, the signal output from the acceleration sensor 40 is less susceptible to noise, and a signal-to-noise ratio of the output signal to be delivered to an unillustrated controller is improved. Specifically, since the signal output from the acceleration sensor 40 has high impedance, if the signal output from the acceleration sensor 40 is extracted outside from the main body of the acceleration sensor 40 as it is, the output signal is vulnerable to noise. In the present embodiment, however, the signal output from the acceleration sensor 40 is amplified by the amplifying circuit 53, such as an operation amplifier, thus amplifying the voltage of the output signal and reducing an output impedance of the same. In this way, even when the output signal is extracted outside the sensor unit 35d, the signal becomes preferably less vulnerable to noise (i.e., the signal-to-noise ratio of the signal becomes less susceptible to deterioration).

Figure 14:
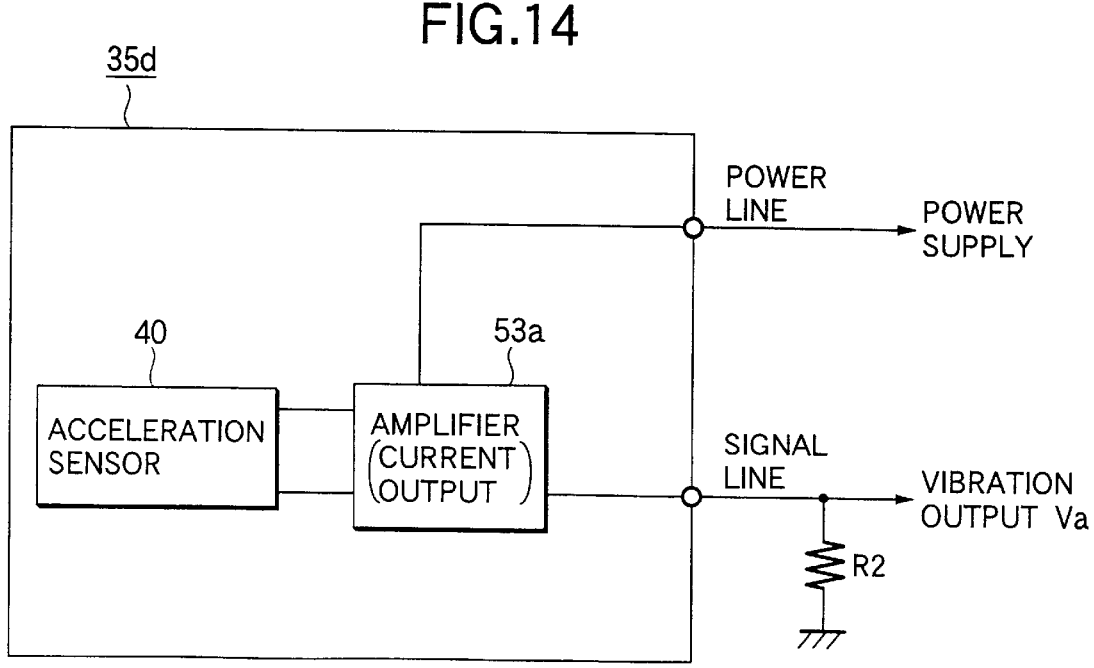
FIG. 14 is a circuit diagram showing another example of the amplifying circuit.

The above embodiment has described a case where an operation amplifier for amplifying a voltage is used as the amplifying circuit 53 for amplifying output from the acceleration sensor 40. In the present invention, an amplifier which outputs an electric current as an output signal can also be used as the amplifying circuit 53, in lieu of the operation amplifier for amplifying a voltage. In this case, the signal output from the acceleration sensor 40 is input to the amplifying circuit (amplifier) 53a which outputs the signal as an electric current, by means of a circuit as shown in FIG. 14. The amplifying circuit 53a outputs the signal originating from the acceleration sensor 40 as a signal for which changes in a vibration value are converted into changes in current. As a result, the output signal becomes less vulnerable to noise or to the influence of a wiring impedance of a signal transmission cable, which is more preferable.

The tenth embodiment has described a case where the signal amplified by the amplifying circuit 53 or 53a corresponds to a signal which is output from the acceleration sensor 40 and represents vibration. Even in the case of the signal output from the temperature sensor 29a described in connection with the ninth embodiment shown in FIG. 10, the signal may be output after amplifying the voltage thereof by the amplifying circuit 53, or amplifying an electric current value thereof by the amplifying circuit 53a. As in a case where the signal output from the acceleration sensor 40 is amplified, there is yielded an effect of increasing a signal-to-noise ratio of the output signal.

Figure 15:
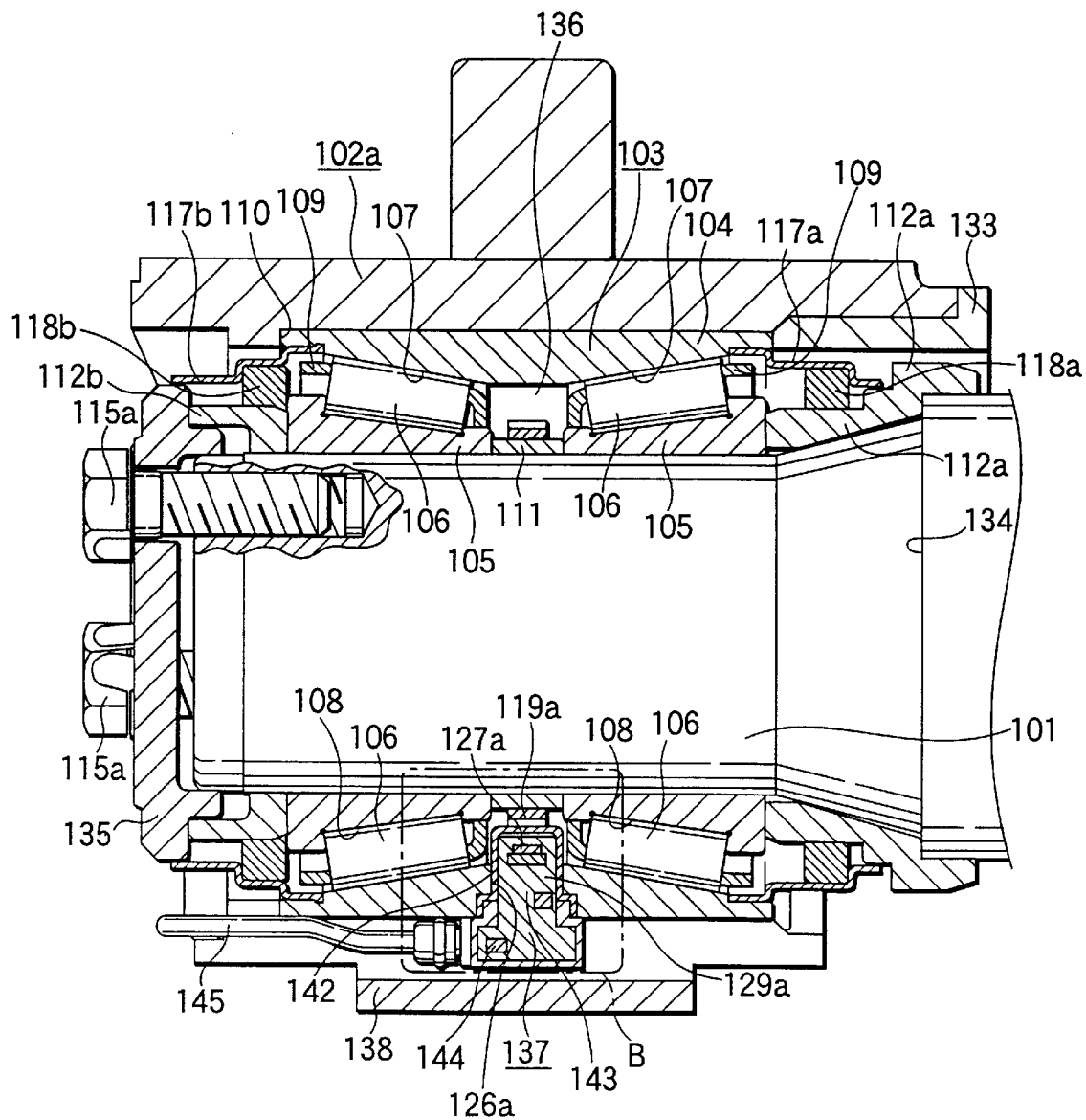
FIG. 15 is a cross-sectional view showing an eleventh embodiment example of an apparatus for detecting an abnormality in a rolling bearing unit according to the present invention.
Figure 16:
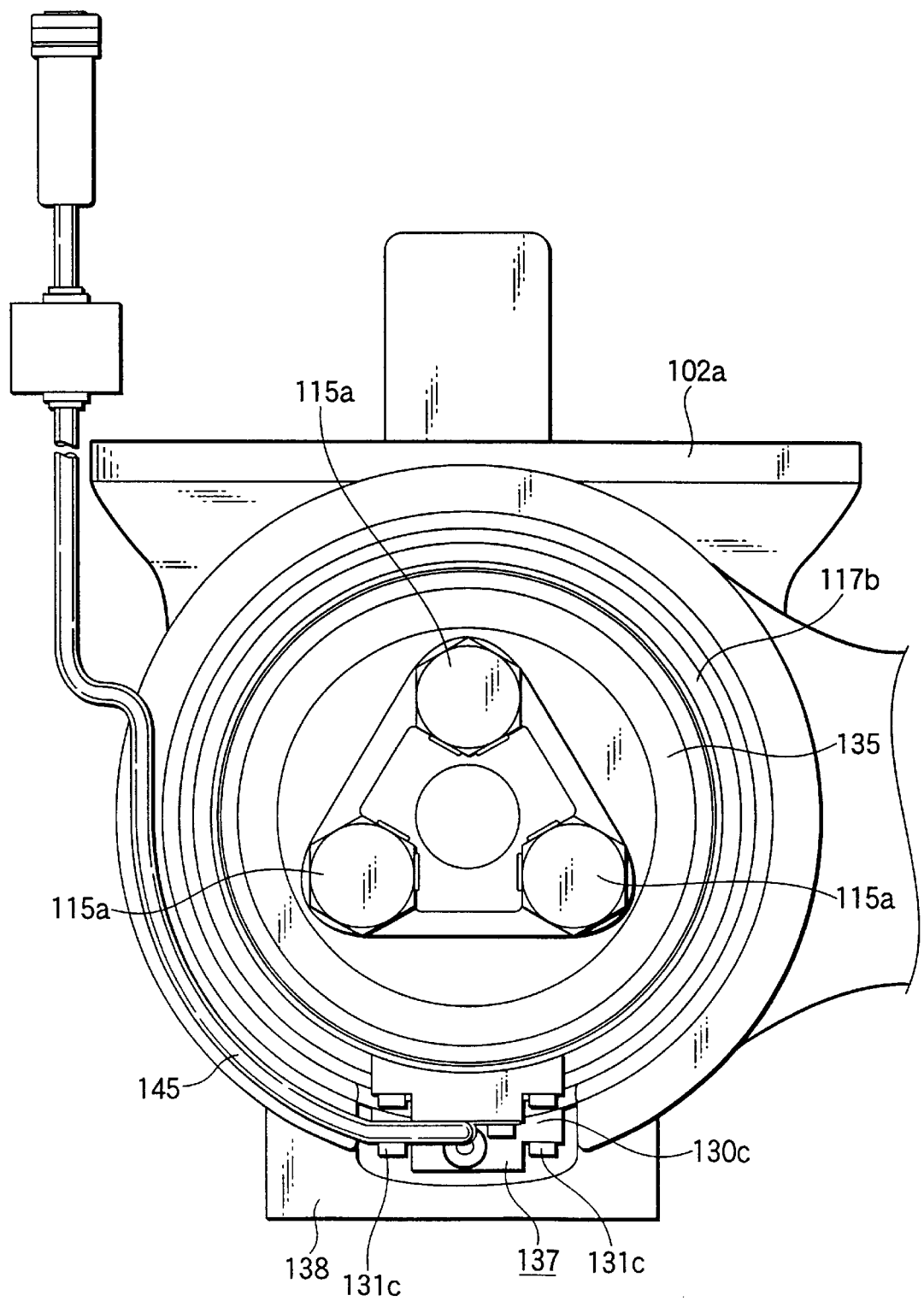
FIG. 16 is a side view of the apparatus when viewed from the left in FIG. 15.
Figure 17:
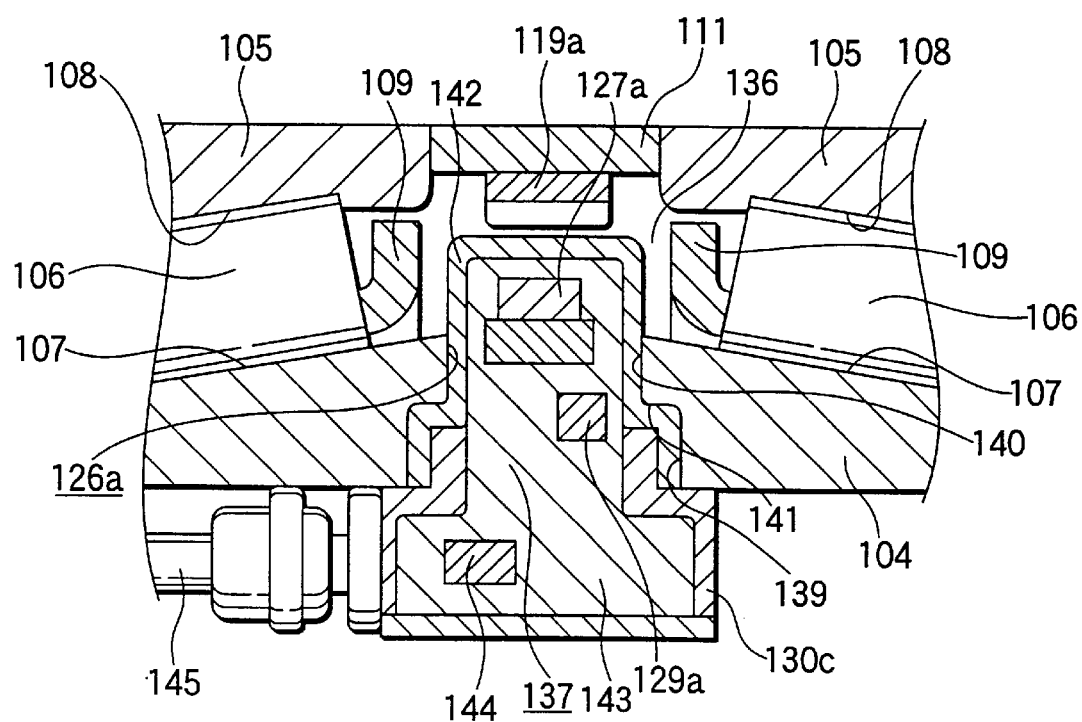
FIG. 17 is an enlarged view of a section B shown in FIG. 15.

FIGS. 15 through 17 show an eleventh embodiment of the present invention. An axle shaft 101 acts as a rotating shaft which rotates at the time of use while having an unillustrated wheel fixedly supported thereon. The axle shaft 101 is rotatably supported by a double row tapered roller bearing 103 (which serves as a rolling bearing) at the interior diameter of a journal box 102a (which does not rotate, even at the time of use). The double row tapered roller bearing 103 comprises an outer ring 104 and a pair of inner rings 105, which are arranged concentrically with each other, and a plurality of tapered rollers 106, 106. Of these elements, the entirety of the outer ring 104 is formed into a substantially cylindrical shape, and outer ring raceways 107 are formed in two rows along the inner circumferential surface of the outer ring 104. Each outer ring raceway 107 has a tapered concave geometry, and the outer ring raceways 107, 107 are inclined in opposite directions such that the interior diameter of the outer ring raceway 107 becomes greater toward the edge of the outer ring 104 with reference to the axial direction thereof.

Each of the pair of inner rings 105 is formed into a substantially short cylindrical shape, and a tapered convex inner ring raceway 108 is formed along the outer circumferential surface of each inner ring 105. The inner rings 105 are arranged at the interior diameter of the outer ring 104 and concentrically with the outer ring 104 while the smaller-diameter-side end faces of the respective inner rings 105 are mutually opposed with a short cylindrical spacer 111 interposed therebetween. Moreover, a plurality of the tapered rollers 106, 106 are rotatably retained by a retainer 109 provided between each outer ring raceway 107 and the corresponding inner ring raceway 108.

The outer ring 104 of the double row tapered roller bearing 103 is fittingly retained by the interior of the journal box 102a. In the present embodiment, the outer ring 104 is sandwiched from either side with reference to the axial direction of the outer ring 104 between a step 110 formed at a position on the interior surface of the journal box 102a close to one edge thereof (i.e., the left-side edge shown in FIG. 15) and a presser ring 133 fittingly fixed to the interior of the other edge portion of the journal box 102a (i.e., the right-side edge portion in FIG. 15). The inner rings 105, 105 and the spacer 111 being interposed therebetween are fitted in a position on the outer circumferential surface of the axle shaft 101 close to one end thereof (i.e., the left end of shown in FIG. 15).

In order to fix the respective inner rings 105, 105 and the spacer 111 to the end of the axle shaft 101, annular members 112a, 112b called oil throwers are fitted to the respective ends of the axle shaft 101 so as to be separated from each other in the axial direction. Of the two annular member 112a, 112b, the annular member 112a, which is fitted in a position close to the inside of the axle shaft 101 with reference to the axial direction, is engaged with a step 134 formed in an inner position on the end section of the axle shaft 101 with reference to the axial direction, thereby preventing the displacement of the axle shaft 101 toward the inside in the axial direction. In contrast, the annular member 112b, which is fitted to a position close to the outside of the axle shaft 101 with reference to the axial direction, is retained by an end cap 135 fastened to the end face of the axle shaft 101 by means of bolts 115a, 115b, thereby preventing the displacement and dislodgment of the annular member 112b from the axle shaft 101. In this way, the inner rings 105, 105 and the spacer 111 are fastened to the end section of the axle shaft 101 from either side with reference to the axial direction, by means of the pair of annular members 112a, 112b.

Seal cases 117a, 117b are formed from a metal plate, such as a mild steel plate, so as to have a substantially cylindrical shape overall and a crank-shaped profile in cross section. The seal cases 117a, 117b are fastened fittingly to the interior of respective end sections of the outer ring 104, through tight fitting. A seal rings 118a is provided between an inner circumferential surface of the seal case 117a and an outer circumferential surface of the annular member 112a; and similarly, a seal ring 118b is provided between an inner circumferential surface of the seal case 117b and an outer circumferential surface of the annular member 112b, thereby sealing an opening on either end of an interior space 136 having the tapered rollers 106, 106 provided therein. This construction prevents leakage to the outside of grease for lubrication purpose sealed in the interior space 136 and entry of extraneous matter, such as rainwater or dust, into the interior space 136 from the outside.

An encoder 119a integrally formed from magnetic metal, such as a steel product, is fixedly fitted around an intermediate section on the outer circumferential surface of the spacer 111, through tight fitting. The encoder 119a is formed so as to have the overall shape of an external gear, and projections and depressions are alternately formed at uniform intervals in the outer rim of the encoder 119a in a circumferential direction thereof. The magnetic properties of the outer rim are changed alternately at uniform intervals with reference to the circumferential direction. The outer rim acts as a detected section for detecting a rotation speed of wheels. The encoder 119a is not limited to one which is formed from magnetic metal, such as a steel product, so as to have the external gear. The encoder 119a may be embodied, by means of molding magnetic metal, such as a steel product, into a cylindrical shape, and forming a plurality of slit-shaped holes axially-elongated in at least an outer circumferential surface of the cylindrical metal at uniform intervals with reference to a circumferential direction thereof. Alternatively, the encoder 119a may also be embodied, by means of affixing a rubber magnet to the entire outer circumferential surface of cylindrical core material made of magnetic metal. In this case, the rubber magnet is polarized in a radial direction, and a polarization direction is switched alternately at uniform intervals with reference to the circumferential direction, thus constituting S poles and N poles alternately at uniform intervals on the outer circumferential surface.

A housing section 138 for housing a sensor unit 137 to be described later is provided in a lower portion of the journal box 102a, so as to protrude downward. The outer circumferential surface of the lower end section of the outer ring 104 is exposed in the housing section 138. An opening at an outer end of a sensor mount hole 126a formed in the lower end section of the outer ring 104 is situated in the housing section 138. The sensor mount hole 126a is in the axially-intermediate section of the outer ring 104 and between the pair of outer ring raceways 107, 107, so as to penetrate from the outer circumferential surface to the inner circumferential surface of the outer ring 104. The sensor mount hole 126*a* has a stepped geometry formed by means of continuously connecting a large-diameter portion 139 close to an exterior diameter with a small-diameter portion 140 close to an interior diameter by way of a step 141.

A partition case 142 is fittingly supported in such a sensor mount hole 126*a*. The partition case 142 is formed thinly from a non-magnetic material having superior thermal conductivity, such as aluminum or its alloys, copper or its alloys, or austenite stainless steel. A base-end half of the case 142 (i.e., a lower half of the case 142 shown in FIGS. 15 and 16) is formed into a stepped cylindrical shape so as to be hermetically and removably fitted into the sensor mount hole 126*a*. A front half of the case 142 has a bottomed cylindrical shape closing a leading-end opening. When the base-end half of the partition case 142 is hermetically fitted into the sensor mount hole 126*a*, the leading end face of the case 142 (i.e., the upper end face shown in FIGS. 15 and 16) is closely opposed to the outer circumferential surface of the encoder 119*a*. The partition case 142 is preferably formed from non-magnetic metal having superior heat conductivity. Alternatively, the case 142 may be formed from material having sufficient heat-resistance, the material being selected from non-magnetic materials such as synthetic resin and rubber, although the material is slightly inferior in thermal conductivity to non-magnetic metal.

The sensor unit 137 is inserted into the partition case 142 retained in the sensor mount hole 126*a* by way of an opening on the base end of the partition case 142 from the outside of the outer ring 104 to the inside of the same in the radial direction. The sensor unit 137 is constituted, by means of retaining in a single sensor holder 143, a rotation speed sensor 127*a*, a temperature sensor 129*a*, and a vibration sensor (acceleration sensor) 144 for detecting vibrations. Of these elements, as the rotational speed sensor 127*a*, there is employed one which is constituted of a magnetic resistant element, a hole element, or a combination of a permanent magnet and a magnetic coil and which changes output in accordance with changes in magnetic flux density or the direction of magnetic flux, as in the case of a related-art rotation speed sensor. Such a rotation speed sensor 127*a* is embedded in the extremity of the sensor holder 143, and a detecting surface of the rotation speed sensor 127*a* is arranged so as to closely oppose the outer circumferential surface of the encoder 119*a* via the bottom of the partition case 142. In contrast, the temperature sensor 129*a* is supported in the intermediate section of the sensor holder 143 close to the outer circumferential surface of the same and opposes the inner circumferential surface of the sensor mount hole 126*a* via an intermediate wall of the partition case 142. Specifically, the position at which the temperature sensor 129*a* is to be supported is set as close as possible to the outer ring 104, where the temperature sensor 129*a* is vulnerable to heat of the outer ring 104. The vibration sensor 144 is embedded and supported in a portion of the sensor holder 143 where the vibration sensor 144 interferes with the rotation speed sensor 127*a* and the temperature sensor 129*a*. That is, the vibration sensor 144 can be placed in any position where the vibration sensor 144 can detect vibration propagating to the sensor holder 143 from the outer ring 104.

In order to improve the temperature detecting performance of the temperature sensor 129*a*, as described in the first embodiment, it is preferable that the sensor holder 143 is made of aluminum, magnesium, copper, zinc, or their alloys, so long as these materials raise no problem in terms of strength and cost. Alternatively, the sensor holder 143 may be formed from material having sufficient heat-resistance, the material being selected from austenite stainless steel, synthetic resin, and rubber, although the material slightly deteriorates the temperature detecting performance. In this case, the vibration sensor 144 is provided in a position close to the outer circumferential surface of the sensor holder 143 without involvement of low-stiffness material, such as synthetic resin or rubber, between the outer ring 104 and the vibration sensor 144 thereby facilitating propagation of vibration from the outer ring 104 to the vibration sensor 144.

Of the sensor holder 143, a portion of the holder where the rotation speed sensor 127*a* opposing the encoder 119*a* is disposed; more specifically, an area between the encoder 119*a* and the rotation speed sensor 127*a* and its surroundings, need to be formed from non-magnetic material, in order not to exert an influence on changes in magnetic flux. On the other hand, the remaining portion of the sensor holder 143 can be formed from magnetic material. In order to facilitate transfer of heat from the outer ring 104 to the temperature sensor 129*a*, the partition case 142 is also made of a thin metal plate possessing superior thermal conductivity in the same manner as mentioned the above. However, at least a portion of the partition case 142 needs to be made of nonmagnetic material in order to ensure the rotation speed detecting function of the rotation speed sensor 127*a*.

While the sensor unit 137 remains inserted in the partition case 142, a mount flange 130*c* provided at the base end section of the sensor unit 137 is fixedly coupled to the outer ring 104 by means of bolts 131*c*, 131*c*. In this state, a detecting section of the rotation speed sensor 127*a* located at the end face of the sensor unit 137 closely opposes a detected section provided on the outer rim of the encoder 119*a*, with the bottom of the partition-shaped case 142 and a minute clearance provided therebetween. The temperature sensor 129*a* opposes the inner circumferential surface of the sensor mount hole 126*a* formed in the outer ring 104, via an intermediate wall section of the partition case 142. A harness to be used for acquiring a signal output from the rotation speed sensor 127*a*, a harness to be used for acquiring output from the temperature sensor 129*a*, and a harness to be used for acquiring output from the vibration sensor 144 are bundled into a single cable 145, and the cable 145 is connected to an unillustrated controller. Upon receipt of a signal from any of the sensors 127*a*, 129*a*, and 144, the controller performs control operation, such as skid control or warning operation.

As mentioned above, in the case of the rotating support apparatus with sensor according to the present invention, the single sensor holder 143 retains the rotation speed sensor 127*a*, the temperature sensor 129*a*, and the vibration sensor 144, thus reducing the space to be occupied by the sensors 127*a*, 129*a*, and 144 and facilitating mounting of the same. The harnesses for acquiring signals output from the sensors 127*a*, 129*a*, and 144 are bundled into the single cable 145, thereby facilitating routing of the harnesses for acquiring signals from the sensors 127*a*, 129*a*, and 144.

Figure 18:
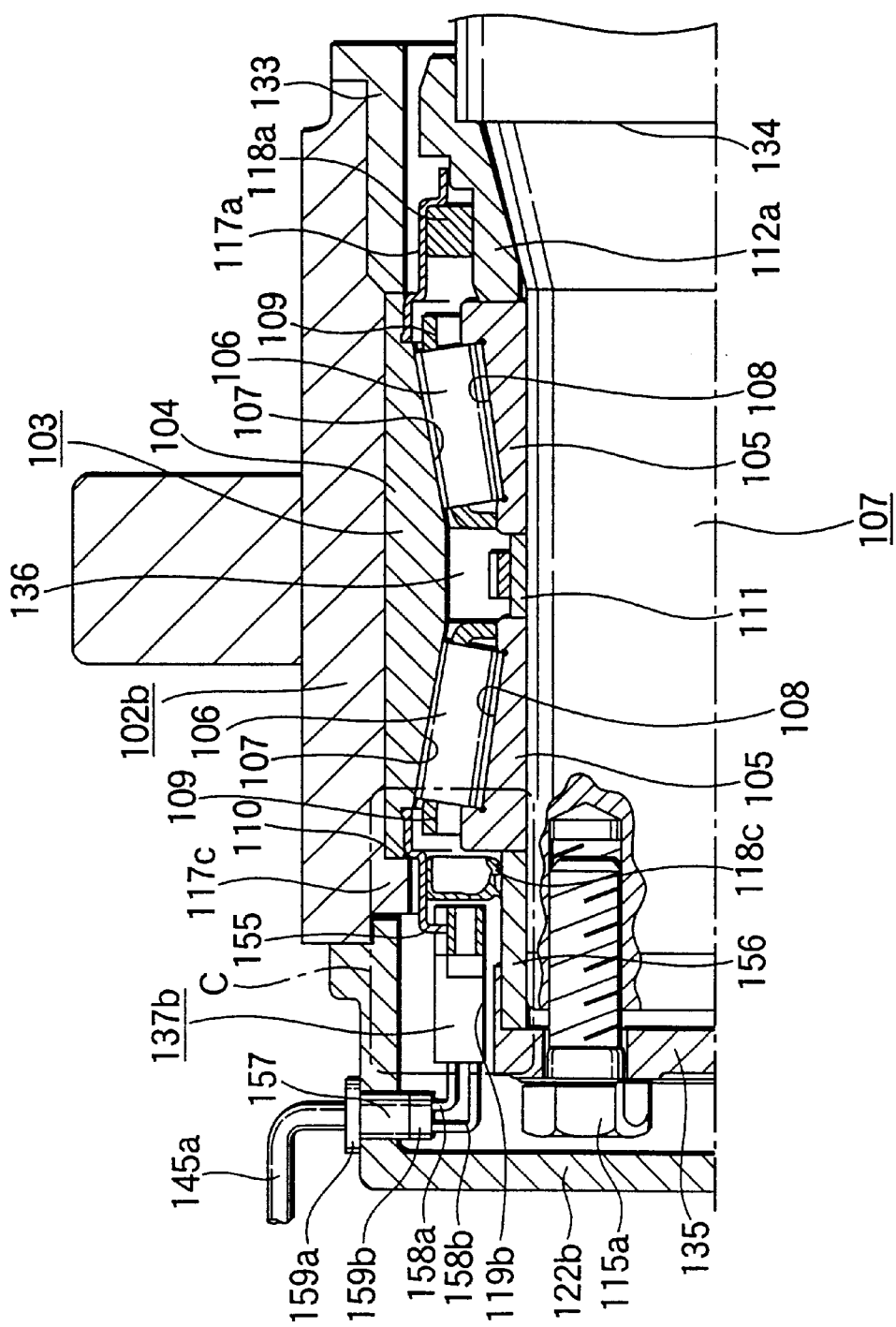
FIG. 18 is a partial cross-sectional view showing a twelfth embodiment of an apparatus for detecting an abnormality in a rolling bearing unit according to the present invention.
Figure 19:
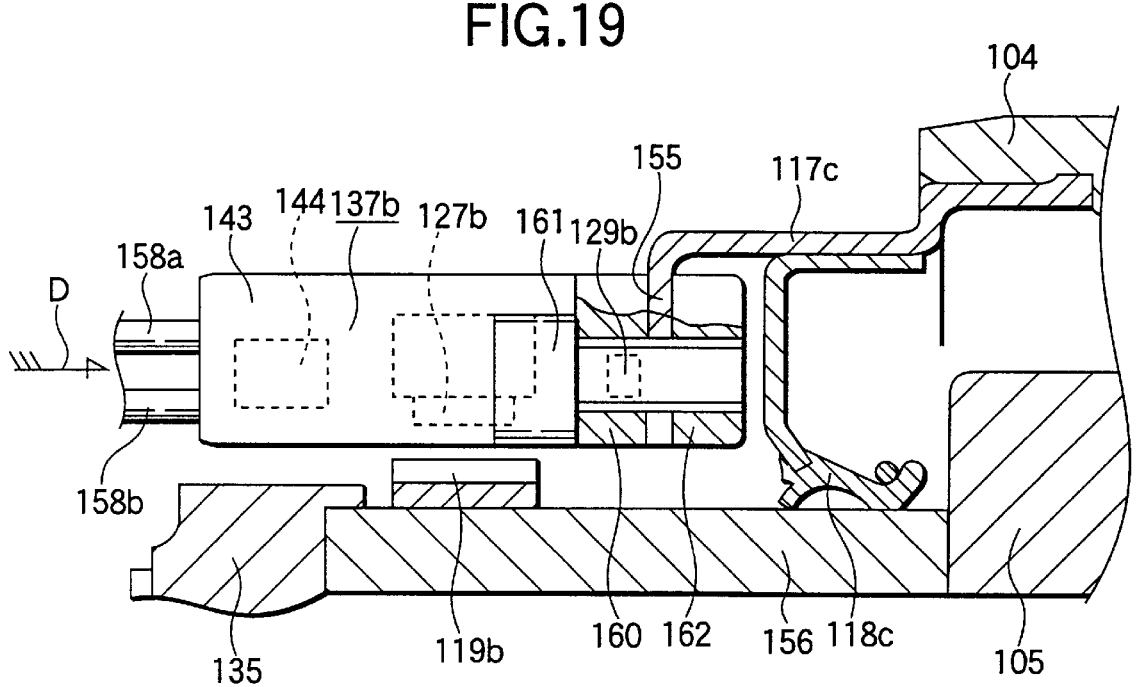
FIG. 19 is an enlarged view of a section C shown in FIG. 18.
Figure 20:
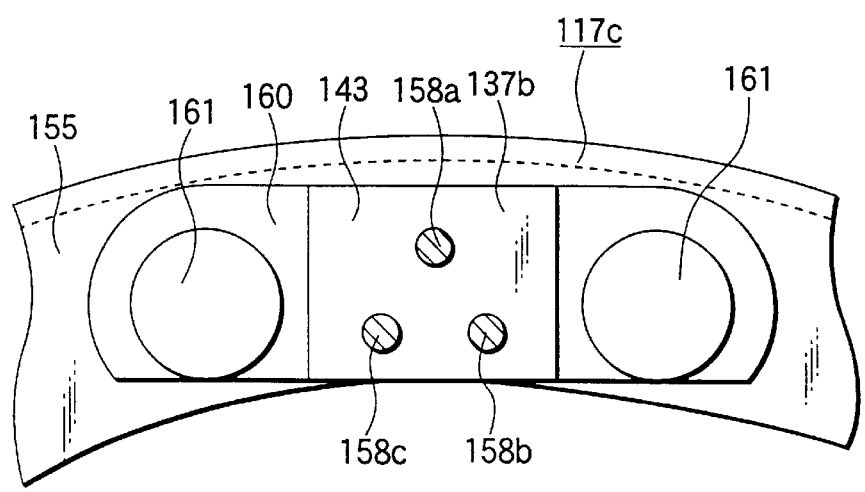
FIG. 20 is a view of the apparatus when viewed from an arrow D shown in FIG. 19.

FIGS. 18 through 20 show a twelfth embodiment of the present invention. In the present embodiment, a sensor unit 137*b* is fixedly supported on a seal case 117*c* for supporting a seal ring 118*c* which shields the interior space 136 of the double row tapered roller bearing 103 from the outside. More specifically, in the present embodiment, a disk section 155 provided on the outer end section of the seal case 117*c* projects outward from the seal ring 118*c* (i.e., in a leftward direction in FIGS. 18 and 19). A mount flange 160 of the sensor unit 137*b* is fixedly coupled to a part of the disk section 155 by means of bolts 161, 161 being screw-engaged with a nut 162. The nut 162 is provided with a tap on a steel plate welded to the inside of the seal case 117c, for fastening the sensor 137b. Such a nut 162 ensures a required length of a tapped hole for threading the bolts 161, 161 and plays a role of reinforcing the fixed portion of the sensor 137b. Further, an encoder 119b is fixedly fitted to a cylindrical spacer 156 sandwiched between the inner rings 105 and an end cap 135b.

In the sensor unit 137b, a rotation speed sensor 127b is disposed so as to closely oppose the encoder 119b which is an object of detection. A temperature sensor 129b is embedded and retained in a base end section (i.e., the right end section shown in FIGS. 18 and 19) while remaining in contact with or close to the disk section 155 of the seal case 117c. Further, the vibration sensor 144 is retained in the extremity of the sensor unit 137 (the left end section shown in FIGS. 18 and 19) while remaining embedded in the sensor holder 143. A detecting surface of the rotation speed sensor 127b is caused to closely oppose the outer rim of the encoder 119b.

Moreover, in the present embodiment, a connector 157 to which the end of a signal transmission cable 145a can be freely connectable is provided in a cover 122b attached to an opening end of the journal box 102b. Harnesses 158a, 158b, and 158c attached to the rotation speed sensor 127b, the temperature sensor 129b, and the vibration sensor 144 are removably connected to the connector 157. More specifically, the cable 145a and plugs 159a, 159b fixed to the ends of the harnesses 158a, 158b, and 158c are independently removable from the connector 157 fixed to the cover 122b. Such a construction facilitates connection of the harnesses 158a, 158b, and 158c to the cable 145a.

In other respects, the present embodiment is identical in construction and operation with the eleventh embodiment, and hence explanations of the same elements are omitted.

Even in any one of the above-described embodiments (first through twelfth embodiments), when the output signal represents changes in voltage, it is preferable that a harness for acquiring an output signal from the sensor holder constituting the sensor unit to the outside is stranded (twisted) with a ground line as a twisted pair in terms of a reduction in the influence of noise stemming from electromagnetic coupling (electrostatic coupling, electromagnetic induction, or coupling of electromagnetic waves). If the output signal corresponds to a current output which outputs a signal as an electric current, a harness for sending the output signal is stranded with a power line as a twisted pair. In any event, twisting a pair of harnesses into a twisted pair yields an effect of diminishing noise primarily stemming from electromagnetic induction and electromagnetic waves. So long as the twisted pair is shielded, there is yielded a great effect of diminishing noise stemming from electrostatic coupling. In a case where the twisted pair is shielded in the manner as mentioned above, so long as a plurality of twisted pairs including harnesses for acquiring signals output from sensors are bundled together and the entirety of the thus-bundled twisted pairs is shielded, influence of external noise on the signals can be diminished. Moreover, it is more preferable that the twisted pairs are shielded individually, so that there can be prevented occurrence of interference, which would otherwise arise between harnesses for sending signals output from sensors.

In any of the above-described embodiments, it is preferable to use a harness coated with resin or rubber, such as chloroprene rubber, TEFLON resin, silicon rubber or polyethylene, as a harness for sending a signal output from each sensor, in consideration of weather resistance or strength.

In order to eliminate noise, a circuit is preferably provided with a surge absorber or a Zener diode (Zener voltage regulator diode) which protects the circuit by means of absorbing a surge voltage applied from the outside, or with an EMI (electromagnetic interference) filter serving as noise filter for eliminating high-frequency noise.

The circuit configuration described in connection with the ninth embodiment shown in FIGS. 10 and 11 and that described in connection with the tenth embodiment shown in FIGS. 12 through 14 can be applied to the other embodiments (i.e., the first through eighth embodiments and the eleventh and twelfth embodiments).

The reference voltage produced by the reference voltage generation circuit 52 can be used not only for detection of measured values by the temperature and acceleration sensors, but also for detection of values by another sensor.

Moreover, in connection with the amplifier for amplifying a voltage and the amplifying circuits 53 and 53a for amplifying a current value, output from the temperature sensor and that from the vibration sensor can be used not only for amplifying purpose but also for amplifying output from other sensors.

Although the rolling bearing with a sensor and the rotating support apparatus with sensor according to the present invention have the foregoing configurations, the present invention employs the temperature sensor 29 (29a, 29b, 129a) and the vibration sensor such as the acceleration sensor 40 (144) as well as the rotation speed sensor 27 (27a, 27b, 127a). Hence, combination of the rolling bearing with a sensor, the rotating support apparatus with sensor, a comparator (comparison means) and a threshold-value setting circuit (threshold-value setting means) enables highly-reliable detection of an abnormality having arisen in a rolling bearing, such as the double row tapered roller bearing 3, 103, whose running speed frequently changes from a low speed to a high speed. Next, there will be described five examples of a determination circuit for determining whether or not an abnormality has existed.

Figure 21:
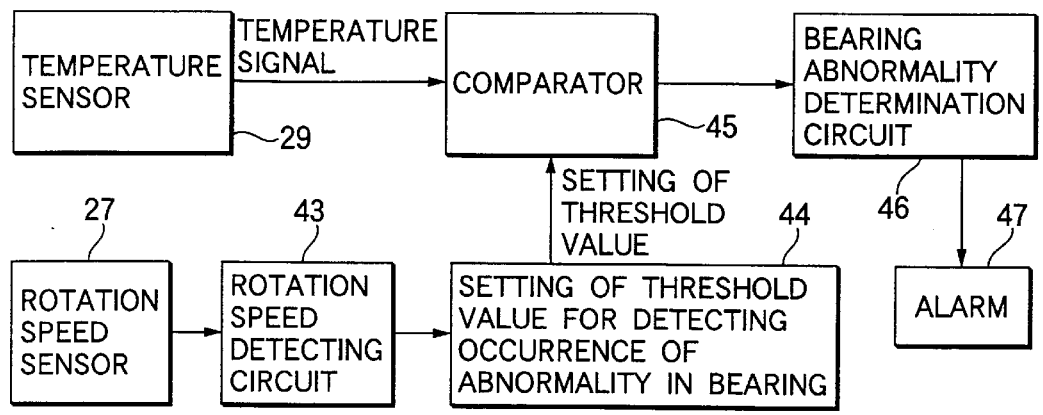
FIG. 21 is a block diagram showing an example of a determination circuit for detecting an abnormality in a rolling bearing unit.

A first example of the determination circuit shown in FIG. 21 determines whether or not an abnormality has arisen in the double row tapered roller bearing 3, 103, on the basis of a rotation speed of the axle shaft 1, 101 supported by the double row tapered roller bearing 3, 103 and the temperature of the double row tapered roller bearing 3, 103. The rotation speed is obtained from a detection signal output from the rotation speed sensor 27 and the temperature is obtained from a detection signal output from the temperature sensor 29. In the first example, a rotation speed detection circuit 43 processes the detection signal output from the rotation speed sensor 27 and obtains a speed signal representing a value pertaining to the rotation speed of the axle shaft 1, 101. A threshold-value setting circuit 44 determines a threshold value for detecting an abnormality from the speed signal obtained from the rotation speed detection circuit 43. A comparator 45 then compares the threshold value with a temperature signal sent from the temperature sensor 29. A bearing abnormality determination circuit 46 judges a signal representing a comparison result, thereby determining occurrence of an abnormality in the double row tapered roller bearing 3, 103. If an abnormality is present in the bearing, a signal is sent to an alarm 47, such as a beeper or an alarm lamp, thereby activating the alarm 47 to inform an operator or a worker of occurrence of the abnormality. In the case of such a first example of determination circuit, a temperature threshold value for detecting the abnormality can be changed consequently in accordance with changes in the rotation speed of the axle shaft 1, 101 determined from the detection signal output from the rotation speed sensor 27. Consequently, the detection of abnormality having arisen in the double row tapered roller bearing 3, 103 at the time of low-speed operation, as well as the detection of abnormality having arisen in the same at the time of high-speed operation, becomes possible.

During operation, the temperature of the double row tapered roller bearing 3, 103 or that of another rolling bearing unit usually increases as a rotation speed increases. To this end, when a determination is made as to whether or not an abnormality has arisen in a rolling bearing unit such as the double row tapered roller bearing 3, 103, on the basis of only a detection signal output from the temperature sensor, a threshold value for detecting an abnormality must be determined in accordance with a temperature expected at the maximum rotation speed. For this reason, the detection of abnormality in the rolling bearing unit, such as the double row roller bearing 3, 103, during low-speed rotation has been difficult. So long as the determination circuit according to the first example is used, a threshold value for detecting an abnormality can be sequentially changed in accordance with a rotation speed at the time. Hence, the highly-reliable detection of abnormality based on temperature can be effected. In connection with the determination circuit such as that shown in FIG. 21, the rotation speed detection circuit 43, the threshold value setting circuit 44, the comparator 45, and the bearing abnormality determination circuit 46 can be embodied through software processing by means of a circuit using an analog-to-digital converter, a microprocessor, or a digital signal processor (DSP).

Figure 22:
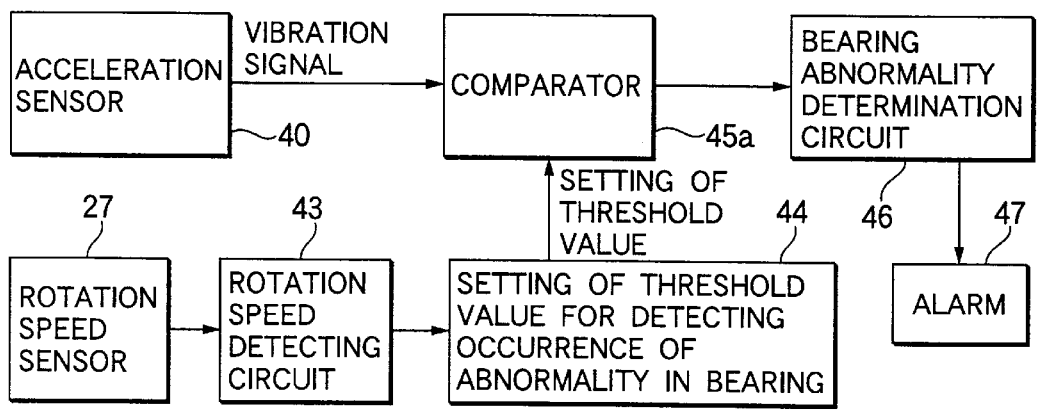
FIG. 22 is a block diagram showing a second example of the determination circuit.

A second example of the determination circuit shown in FIG. 22 determines whether or not an abnormality has arisen in the double row tapered roller bearing 3, 103, on the basis of a rotation speed of the axle shaft 1, 101 supported by the double row tapered roller bearing 3, 103 and the vibration of the double row tapered roller bearing 3, 103. The rotation speed of the axle shaft 1, 101 is obtained from a detection signal output from the rotation speed sensor 27. The vibration of the roller bearing 3, 103 is obtained from a detection signal output from the vibration sensor such as the acceleration sensor 40. In the case of the second example of determination circuit, a threshold value for detecting an abnormality pertaining to vibration is set in accordance with the detection signal output from the rotation speed sensor 27. A comparator 45*a* then compares the threshold value with a signal output from the acceleration sensor 40, thereby determining the occurrence of abnormality in the double row tapered roller bearing 3, 103. In the case of such a determination circuit according to the present embodiment, since a threshold value for detection of an abnormality pertaining to vibration is sequentially changed in accordance with changes in rotation speed of the axle shaft 1, 101 abnormal vibration in the double row tapered roller bearing 3, 103 can be detected even at the time of low-speed rotation. Accordingly, a flaking arisen in a rolling contact surface in the double row tapered roller bearing 3, 103 can be detected at an early stage.

The magnitude of vibration arising at the time of operation of the rolling bearing unit including the double row tapered roller bearing 3, 103 usually increases with an increase in rotation speed. For this reason, when an occurrence of an abnormality in the rolling bearing unit, such as the double row tapered roller bearing 3, 103, is determined on the basis of only a signal detected by the acceleration sensor 40, a threshold value for detecting the abnormality must be set in accordance with a vibration value expected at an expected maximum rotation speed. For this reason, the detection of abnormality in the rolling bearing unit, such as the double row tapered roller bearing 3, 103, at the time of low-speed operation has been difficult. So long as the determination circuit according to the second example is used, a threshold value for detecting an abnormality can be sequentially changed in accordance with a present rotation speed. Hence, the highly-reliable detection of abnormality based on the magnitude of vibration can be effected. Even in connection with the determination circuit such as that shown in FIG. 22, the rotation speed detection circuit 43, the threshold value setting circuit 44, the comparator 45*a*, and the bearing abnormality determination circuit 46 can be embodied through software processing by means of a circuit using an analog-to-digital converter, a microprocessor, or a digital signal processor (DSP).

Figure 23:
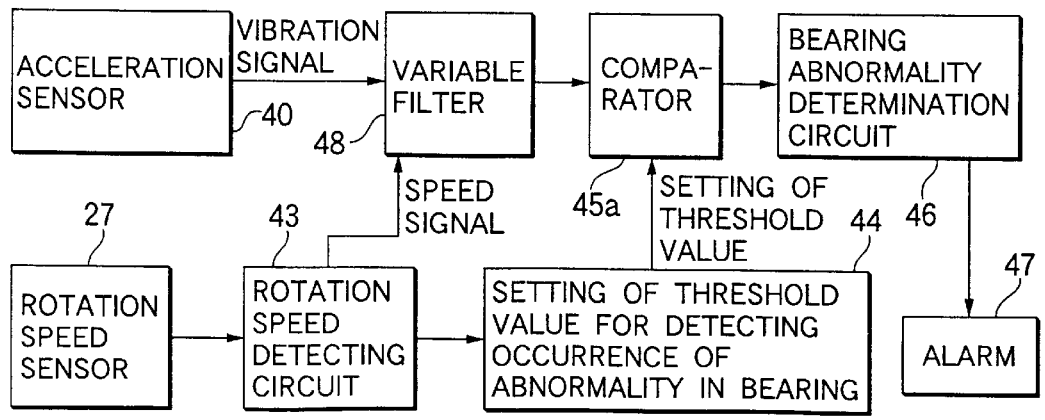
FIG. 23 is a block diagram showing a third example of the determination circuit.

A third example of the determination circuit shown in FIG. 23 determines whether or not an abnormality has arisen in the double row tapered roller bearing 3, 103, on the basis of a rotation speed of the axle shaft 1, 101 supported by the double row tapered roller bearing 3, 103 and the vibration of the double row tapered roller bearing 3, 103. The rotation speed of the axle shaft 1, 101 is obtained from a detection signal output from the rotation speed sensor 27. The vibration of the double row tapered roller bearing 3, 103 is obtained from a detection signal output from the vibration sensor such as the acceleration sensor 40. Particularly, in the case of the present example, the signal which is output from the acceleration sensor 40 and represents vibration of the double row tapered roller bearing 3, 103 passes through a variable filter 48. The variable filter 48 changes a frequency to be eliminated or dampened on the basis of a signal which is obtained from the signal detected by the rotation speed sensor 27 and represents the rotation speed of the double row tapered roller bearing 3, 103. The comparator 45*a* compares a vibration value obtained after the variable filter 48 has eliminated or dampened a rotational speed component of the double row tapered roller bearing 3, 103 with the threshold value detecting an abnormality obtained in the same manner as in the second example, thus determining the occurrence of abnormality in the double row tapered roller bearing 3.

Of vibration arising during rotation of the rolling bearing unit, such as the double row tapered roller bearing 3, 103, a vibration value based on a rotation speed component synchronized with a rotation speed is usually the maximum of all components. In the event that damage, such as flaking, has arisen in the rolling bearing unit, such as the double row tapered roller bearing 3, 103, a vibration value of frequency component not synchronized with the rotation speed increases. In the case of the present example, the signal sent from the acceleration sensor 40 is passed through the variable filter 48, which changes a frequency to be eliminated or dampened on the basis of the signal output from the rotation speed sensor 27, thereby eliminating or dampening a vibration value of frequency corresponding to the rotation speed component. Accordingly, vibration represented by the signal that has passed through the variable filter 48 is free of a frequency component appearing even in a normal time, or contains the frequency component in nominal amount. Correspondingly, a vibration component arising in association with an abnormality becomes noticeable, and hence the precision of detection of an abnormality in the rolling bearing unit, such as the double row tapered roller bearing 3, 103, can be improved. Accordingly, an abnormality in the double row tapered roller bearing 3 can be detected at an initial phase in which occurrence of flaking in a rolling contact portion in the double row roller bearing 3, 103 has begun, thereby preventing occurrence of serious damage, such as seizing up, in the double row tapered roller bearing 3, 103. In connection with the determination circuit such as that shown in FIG. 23, the rotation speed detection circuit 43, the variable filter 48, the threshold value setting circuit 44, the comparator 45a, and the bearing abnormality determination circuit 46 can also be embodied through software processing by means of a circuit using an analog-to-digital converter, a microprocessor, or a digital signal processor (DSP).

Figure 24:
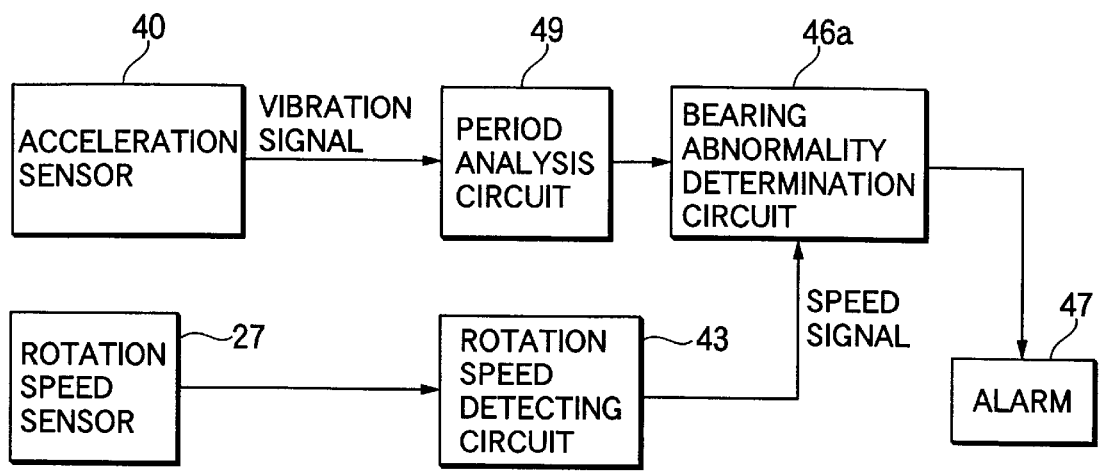
FIG. 24 is a block diagram showing a fourth example of the determination circuit.

A fourth example of the determination circuit, shown in FIG. 24 determines the occurrence of abnormality in the double row tapered roller bearing 3, 103 on the basis of the rotation speed of the axle shaft 1, 101 supported on the double row tapered roller bearing 3, 103 and the vibration of the double row tapered roller bearing 3, 103. The rotation speed of the axle shaft 1, 101 is obtained from the detection signal output from the rotation speed sensor 27. The vibration of the rolling bearing 3, 103 is obtained from the detection signal output from the vibration sensor, such as the acceleration sensor 40. Particularly, in the present example, after a period analysis circuit 49 analyzes the waveform of vibration detected by a vibration sensor, such as the acceleration sensor 40, the occurrence of abnormality in the double row tapered roller bearing 3 is determined. To this end, in the case of the present example, a bearing abnormality determination circuit 46a computes periods $T_1$, $T_2$, and $T_3$ of various vibrations developing in the double row tapered roller bearing 3, 103 and determines the occurrence of abnormality in the double row tapered roller bearing 3, 103, on the basis of a speed signal which is produced from the detection signal output from the rotation speed sensor 27 and represents the speed of the double row tapered roller bearing 3, 103. In the case where the double row tapered roller bearing 3, 103 is used while rotating inner rings, period $T_1$ denotes a vibration period developing when flaking has occurred in any of the outer ring raceways 7, 107 formed on the inner circumferential surface of the outer ring 4, 104; period $T_2$ denotes a vibration period developing when flaking has occurred in any of the inner ring raceways 8, 108 formed on the respective outer circumferential surfaces of the inner rings 5; and period $T_3$ denotes a vibration period developing when flaking has occurred in any of the rolling contact surfaces of the tapered rollers 6, 106. The period of the signal output from the acceleration sensor 40 is analyzed by utilization of the rotation speed signal, thereby identifying a position on the double row tapered roller bearing 3, 103 where flaking has arisen, as well as determination of occurrence of damage stemming from flaking of the double row tapered roller bearing 3, 103.

For example, under the situation in which the double row tapered roller bearing 3, 103 is used while rotating the inner rings, if flaking has arisen in any of the outer ring raceways 7, 107 formed on the inner circumferential surface of the outer ring 4, 104, a vibration having a frequency to be expressed by the following expression arises.

$$f_1 = z \cdot fc$$

wherein "z" represents the number of rolling elements, and "fc" represents the rotational frequency of a retainer.

Here, period $T_1$ of the vibration is expressed by the following expression.

$$T_1 = 1/f_1 = 1/(z \cdot fc)$$

In the event that flaking has arisen in any of the inner ring raceways 8, 108 formed on the outer circumferential surfaces of the inner rings 5, 105 to be rotated, a vibration having a frequency expressed by the following expression arises.

$$f_2 = z \cdot (fr - fc)$$

where "z" represents the number of rolling elements, "fr" represents the rotational frequency of an inner ring, and "fc" represents the rotational frequency of a retainer.

Period $T_2$ of the vibration is expressed by the following expression.

$$T_2 = 1/f_2 = 1/\{Z \cdot (fr - fc)\}$$

Further, in the event that flaking has arisen in any of the rolling contact surfaces of the tapered rollers 6 serving as rolling elements, a vibration having a frequency expressed by the following expression arises.

$$f_3 = 2 \cdot fb$$

where "fb" represents the rotation frequency of a rolling element.

$$T_3 = 1/f_3 = 1/(2 \cdot fb)$$

In these cases, frequencies fc, fr, and fb can be computed, so long as specifications about the rolling bearing unit, such as the double row tapered roller bearing 3, 103, and the rotation speed thereof are known. By means of analyzing the period of a vibration wave form, a position on the double row tapered roller bearing 3, 103 where flaking has arisen can be identified.

For instance, if a vibration component having a vibration other than vibrations $T_1$, $T_2$, and $T_3$ increases, an abnormality is ascertained to have arisen in a location other than a rolling contact surface of the double row tapered roller bearing 3, 103. Accordingly, in a case where the period of the detection signal output from the acceleration sensor 40 is analyzed by means of the period analysis circuit 49 as in the present example, an abnormality having arisen in the rotating support section and its surroundings, including the double row tapered roller bearing 3, 103 and its surroundings, can be detected. In this case, if a period corresponding to a primary component of a rotation speed has become remarkably large, partial wear stemming from a skid is assumed to have arisen in one location on wheels. Further, in the determination circuit such as that shown in FIG. 24, the rotation speed detection circuit 43, the period analysis circuit 49, and the bearing abnormality determination circuit 46a can be embodied through software processing by means of a circuit using an analog-to-digital converter, a microprocessor, or a digital signal processor (DSP).

Figure 25:
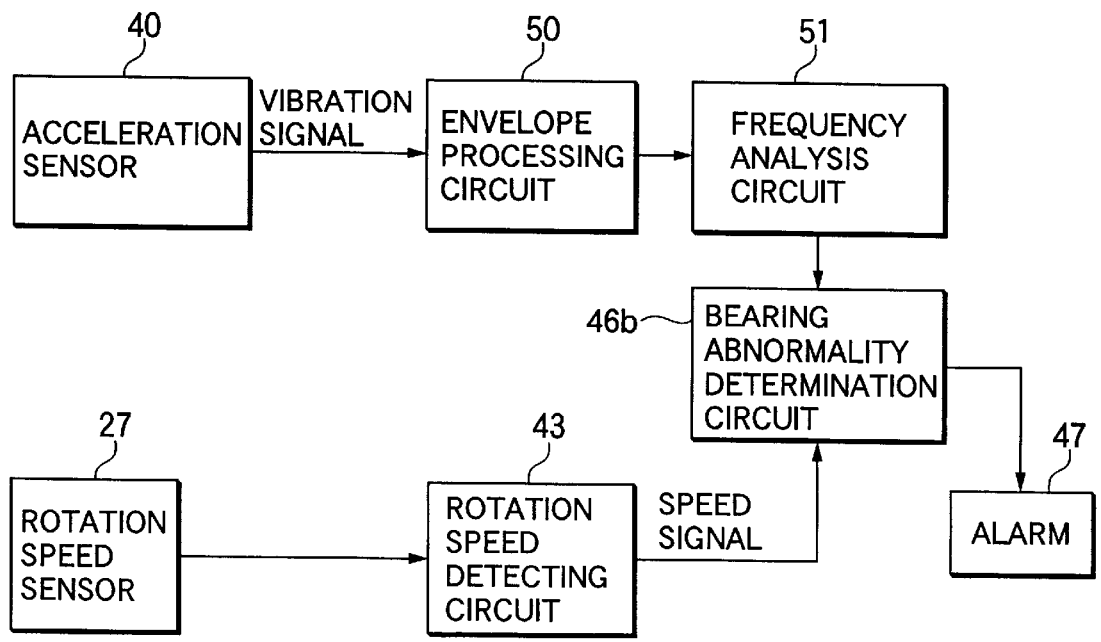
FIG. 25 is a block diagram showing a fifth example of the determination circuit.

A fifth example of the determination circuit, shown in FIG. 25, determines the occurrence of abnormality in the double row tapered roller bearing 3, 103 on the basis of the rotation speed of the axle shaft 1, 101 supported on the double row tapered roller bearing 3, 103 and the vibration of the double row tapered roller bearing 3, 103. The rotation speed is obtained from the detection signal output from the rotation speed sensor 27. The vibration of the roller bearing 3, 103 is obtained from the detection signal output from the vibration sensor, such as the acceleration sensor 40. Particularly, in the present example, a vibration signal passes through an envelope processing circuit 50 for performing an envelope processing, where a frequency is analyzed by use of the thus-processed waveform. An abnormality in the double row tapered roller bearing 3, 103 cannot be analyzed when analyzing the frequency of a vibration waveform (raw waveform) detected by the vibration sensor such as the acceleration sensor 40. However, if a raw waveform of vibration is subjected to envelope processing, to thereby analyze a frequency by means of a frequency analysis circuit 51 through use of the thus-processed waveform, analysis of an abnormality in the rolling bearing unit, such as the double row tapered roller bearing 3, 103, becomes feasible, thereby detecting frequencies $f_1$, $f_2$, and $f_3$ of vibrations stemming from flaking of a rolling contact portion. Even in the determination circuit such as that shown in FIG. 19, the rotation speed detection circuit 43, the envelope processing circuit 50, the frequency analysis circuit 51, and the bearing abnormality determination circuit 46b can be embodied through software processing by means of a circuit using an analog-to-digital converter, a microprocessor, or a digital signal processor (DSP).

In any event, the setting of the threshold value for detecting an abnormality in the rolling bearing section, such as the double row tapered roller bearing 3, 103, is changed or analyzed in accordance with changes in rotation speed by means of any of the five examples of the determination circuits shown in FIGS. 21 through 25. This enables setting of a threshold value optimal for the changing rotating status of the rolling bearing, such as the double row tapered roller bearing 3, 103, which has been difficult to perform in the related-art. As a result, the determining accuracy of occurrence of abnormality in the rolling bearing section, such as the double row tapered roller bearing 3, 103 can be improved dramatically. In the cases of the fifth and sixth embodiments of the rotating support apparatus shown in FIGS. 6 and 7 and the ninth and tenth embodiments of the rotating support apparatus shown in FIGS. 10 through 14, each rotating support apparatus is equipped with all of the rotation speed sensor 27a, the temperature sensor 29a, and the acceleration sensor 40. An abnormality in the rolling bearing section, such as the double row tapered roller bearing 3, 103, can be detected with high reliability by use of a combination of only the rotation speed sensor 27a and the temperature sensor 29a. Alternatively, an abnormality in the rolling bearing can be detected with high reliability by use of a combination of only the rotation speed sensor 27a and the acceleration sensor 40. By means of applying the determination circuit shown in FIGS. 21 through 25 to the previously-described first through twelfth embodiments, an abnormality in a bearing can be detected accurately.

A construction consisting of a combination of the temperature sensor 29a, 129a and the acceleration sensor 40, 144 along with the rotation speed sensor 27, 27a, 127a enables detection of an abnormality in the double row tapered roller bearing 3, 103, from a temperature signal and a vibration signal. Broad detection of an abnormality, such as lubrication failures stemming from deterioration of grease and flaking of a rolling contact surface due to abrasion by foreign substances, becomes feasible. The rotating support apparatus with sensor combined with the above-mentioned determination circuit enables early detection of an abnormality in the rolling bearing section, such as the double row tapered roller bearing 3, 103, thereby effectively preventing occurrence of serious damage, such as seizing up of the rolling bearing section; e.g., the double row tapered roller bearing 3, 103.

In the rolling bearing apparatus with sensor and the rolling support apparatus with sensor shown in FIGS. 1 through 20, the inner rings 5, 105 are rotating wheels, and the outer ring 4, 104 is a stationary wheel. The present invention is not limited to such the constructions and can be implemented as a construction in which an outer ring is taken as a rotating wheel and inner rings are taken as stationary rings. The rolling bearing apparatus with sensor and the rotating support apparatus with sensor according to the respective embodiments have been described by reference to use of the double row tapered roller bearing 3, 103, in which a plurality of rolling elements are taken as the tapered rollers 6, 106. Here, the present invention is not limited to such a construction; the present invention can be applied to use of a cylindrical roller bearing using cylindrical rollers as rolling elements, a ball bearing using balls as rolling elements, or any of other various types of rolling bearings. In each of the previous embodiments, the detecting surface of the rotation speed sensor 27 and the detected section are mutually opposed in the diametrical direction of the rolling bearing apparatus with sensor and that of the rotating support apparatus with sensor, in order to detect a rotation speed. However, the present invention enables mutual opposing of the detecting surface and the detected section in the axial direction of the rolling bearing apparatus with sensor and that of the rotating support apparatus with sensor.

The rolling bearing apparatus with sensor and the rotating support apparatus with sensor according to the present invention are embodied in the form of the above-described constructions so as to operate in the manner described above. As a result, there can be achieved facilitation of a mounting operation as well as a reduction in a space to be occupied by a plurality of types of sensors including a rotation speed sensor and a temperature sensor. Further, routing of harnesses for acquiring signals from the sensors is also facilitated. Therefore, there can be attained miniaturization and cost reduction of a rotating support section of an axle of a railroad vehicle, or of rotating support sections of various types of machinery, as well as an improvement in design freedom.

A thirteenth embodiment of the present invention will be described with reference to FIG. 26. A bearing apparatus 201 shown in FIG. 26 has two rolling bearings 202; and a housing 204 for joining together outer rings 203 serving as stationary rings of the bearings 202. Further, inner rings 205 serving as rotating rings support a rotating shaft 206. A through hole 207 is formed in the housing 204 of the bearing apparatus 201 so as to penetrate from an outer surface 204a to an inner surface 204b of the housing 204. A sensor unit 208 is inserted into the through hole 207 from the outside and is secured with sensor mount screws 209. Specifically, the housing 204 is a member secured on the outer rings 203 serving as stationary rings. A wheel 210 is attached to an end section 206a of the shaft 206 for detecting a rotation speed of the shaft 206. An extremity 208a of the sensor unit 208 projects from the inner surface 204b of the housing 204 and is located close to teeth 210a of the wheel 210 provided on the end section 206a of the shaft 206.

Figure 27:
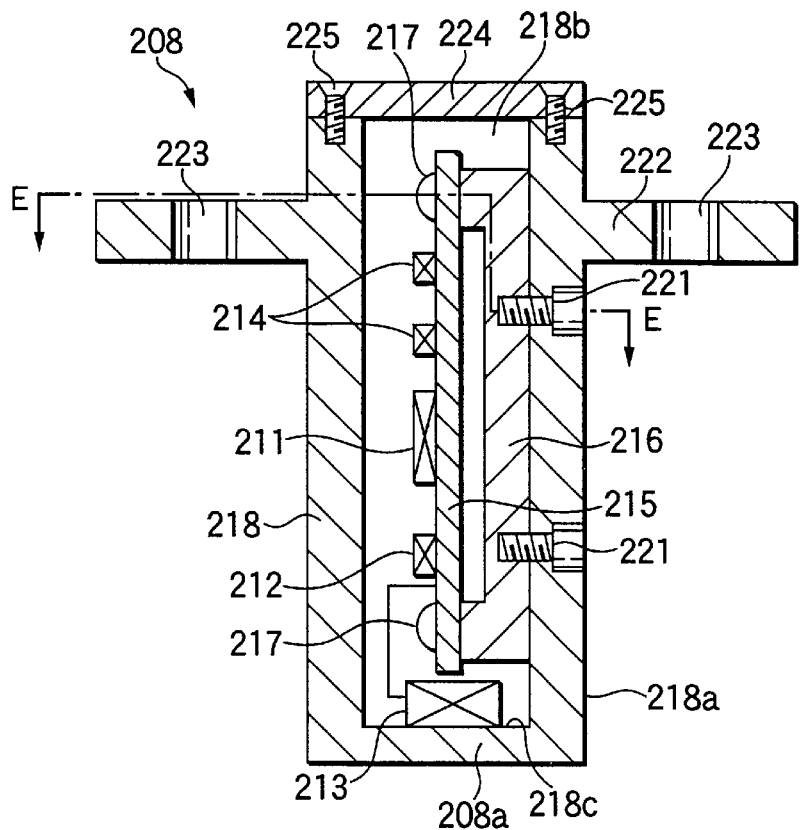
FIG. 27 is a cross-sectional view showing the sensor shown in FIG. 26.
Figure 28:
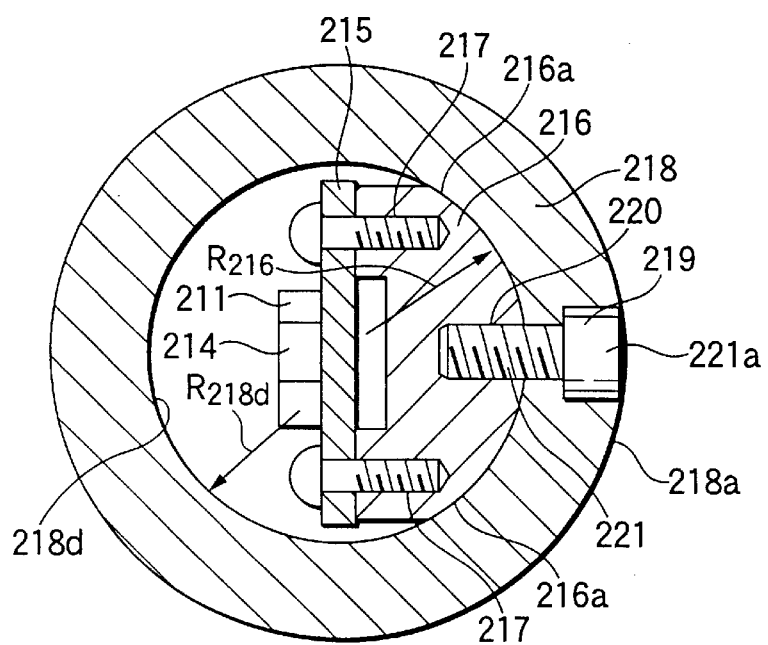
FIG. 28 is a cross-sectional view of the sensor taken along a line E—E shown in FIG. 27.

As shown in FIGS. 27 and 28, the sensor unit 208 includes: a vibration sensor 211 being a vibration detecting section for detecting vibrations; a temperature sensor 212 being a temperature detecting section for detecting a temperature; a rotation speed sensor 213 being a rotation speed detecting section for detecting a rotation speed of the shaft 206; and a circuit component 214 for processing signals detected by the sensors 211, 212, and 213. The vibration sensor 211 and the temperature sensor 212 are mounted on a circuit board 215 along with the circuit component 214. The circuit board 215 is secured on a fixing jig 216 by means of substrate fastening screws 217 and is housed in a sensor case 218. A position in which the circuit board 215 is to be fastened to the fixing jig 216 with screws is set such that resonance does not arise in vibration of an object of detection as a result of the size, thickness, or rigidity of the circuit board 215.

The sensor case 218 is provided with a hole 219 for fastening the fixing jig 216 from the outside. A threaded hole 220 is provided in the fixing jig 216 in alignment with the position of the hole 219. The fixing jig 216 having the circuit board 215 mounted thereon is secured in the sensor case 218 by means of a jig fixing component; e.g., a jig fixing screw 221 inserted into the hole 219 from the outside. At this time, preferably, the head 221a of the screw 221 does not project beyond the outer surface 218a of the sensor case 218. A curvature radius $R_{216}$ of a surface along which the fixing jig 216 is to be attached to the sensor case 218 is made slightly larger than a curvature radius $R_{218d}$ of an inner circumferential surface 218d of the sensor case 218. In this case, a shoulder 216a of the fixing jig 216 comes into contact with the inner circumferential surface 218d of the sensor case 218. Hence, the fixing jig 216 is preferably stably secured on the inside 218d of the sensor case 218 at three points of the shoulder 216a and the screw 221.

A flange 222 is provided on an outer surface 218a of the sensor case 218. Bolt holes 223 for fastening the sensor case 218 to the housing 222 with the sensor mount screws 209 are formed in the flange 204. A cover 224 is attached to an opening section 218b of the sensor case 218 with small screws 225. The rotation speed sensor 213 is attached to the internal surface 218c close to the extremity of the sensor case 218.

The bearing apparatus 201 with a sensor having the foregoing construction measures vibration occurring from rotation of the shaft 206 supported on the inner rings 205 and heat caused by rolling friction of the bearing 202. Further, the wheel 210 rotates along with the shaft 206, and the teeth 210a of the wheel 210 passes an area close to the extremity 208a of the sensor unit 208. As a result, the rotation speed of the shaft 206 is measured by means of measuring changes in magnetic flux developing in, e.g., the rotation speed sensor 213.

Figure 26:
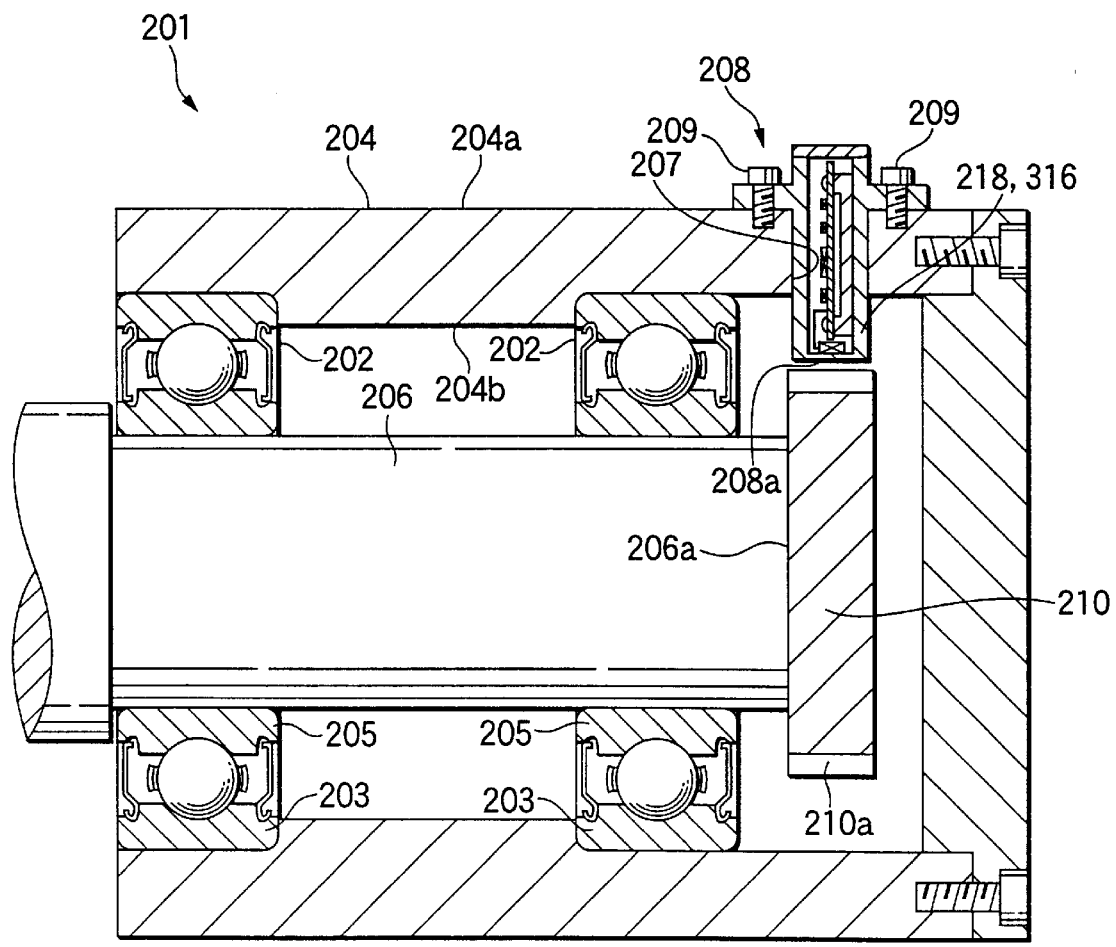
FIG. 26 is a cross-sectional view showing a bearing apparatus with sensor according to a thirteenth embodiment of the present invention.

At this time, as shown in FIG. 26, the sensor unit 208 is fastened by the sensor mount screws 209 on the housing 204 in a predetermined orientation. As shown in FIG. 28, the circuit board 215 having mounted thereon the vibration sensor 211 and the temperature sensor 212 is fixed on the sensor case 218 in a determined orientation. In short, the vibration sensor 211 is fastened to the bearing apparatus 201 in a predetermined orientation. Consequently, vibration signals measured by the sensor unit 208 produced in the same manner involve little dispersion in value, and hence calibration of signals of each sensor is seldom required.

The circuit board 215 is fastened to the fixing jig 216 by means of the substrate fixing screws 217, and the fixing jig 216 is fastened to the sensor case 218 with the jig fixing screw 221. If an adhesive is also used in combination with the screws, loosening of the screws 217, 221 can be prevented.

When the bearing apparatus is used in an environment in which the apparatus is exposed to water, after the jig fixing screw 221 having been attached, the hole 219 is molded with waterproof resin; e.g., silicon resin or epoxy resin, in order to prevent entry of water from the hole 219 formed for fastening the fixing jig 216 to the sensor case 218 with screws. Alternatively, the surface of the circuit board 215 may be made waterproof, by means of coating the surface with waterproof resin; e.g., silicon resin.

In order to improve transfer of heat to the temperature sensor 212, it is better to fill a clearance between the sensor case 218 and the circuit board 215 with a resin possessing superior thermal conductivity. As the resin to be filled, there is employed soft resin which does not impart damage to the sensors 211, 212, 213 and the circuit component 214 mounted on the circuit board 215 even at the time of occurrence of temperature changes; for example, silicon resin. When silicon resin is used in a closed space, as in the case of the present embodiment, use of silicon resin of addition type is preferable.

In the bearing apparatus 201 according to the present embodiment, the sensor unit 208 is structured such that the circuit board 215 having mounted thereon a detecting section (including the vibration sensor 211, the temperature sensor 212, and the rotation speed sensor 213) and the circuit component 214 is attached to the sensor case 218 by means of the fixing jig 216. And, the sensor unit 208 is fastened to the housing 204 that couples together the two outer rings 203 acting as stationary rings of the two bearings 202. There may be embodied a bearing apparatus in which the sensor 208 is attached directly to the outer rings (i.e., stationary rings) 203 of the bearings 202. Further, the sensor 208 is provided with a signal output device for transmitting a detected signal by means of wireless transmission; e.g., electric waves, light, or ultrasound. The sensor unit 208 may be attached to the inner rings 205 serving as rotating rings or to a member fastened to the inner rings.

Although the bearing of the thirteenth embodiment shown in FIG. 26 is a ball bearing, the bearing may be embodied as another type of bearing, such as a thrust ball bearing, an angular ball bearing, or a tapered roller bearing.

In addition to a vibration sensor of bimorph type using a piezoelectric element, a vibration sensor using a piezoelectric element and a weight in combination, or a vibration sensor having a cantilever structure, a vibration sensor utilizing a strain gauge in lieu of the piezoelectric element used for the vibration sensor can also be used as the vibration sensor 211. Further, an ordinary thermistor, a silicon-based thermistor, or a IC temperature sensor (integrated circuit temperature sensor) can be used as the temperature sensor 212. In addition, a sensor using a Hall element or a Hall IC (Hall integrated circuit) or a sensor using an MR element (magnetoresistance element) can be used as the rotation speed sensor 213.

Figure 29:
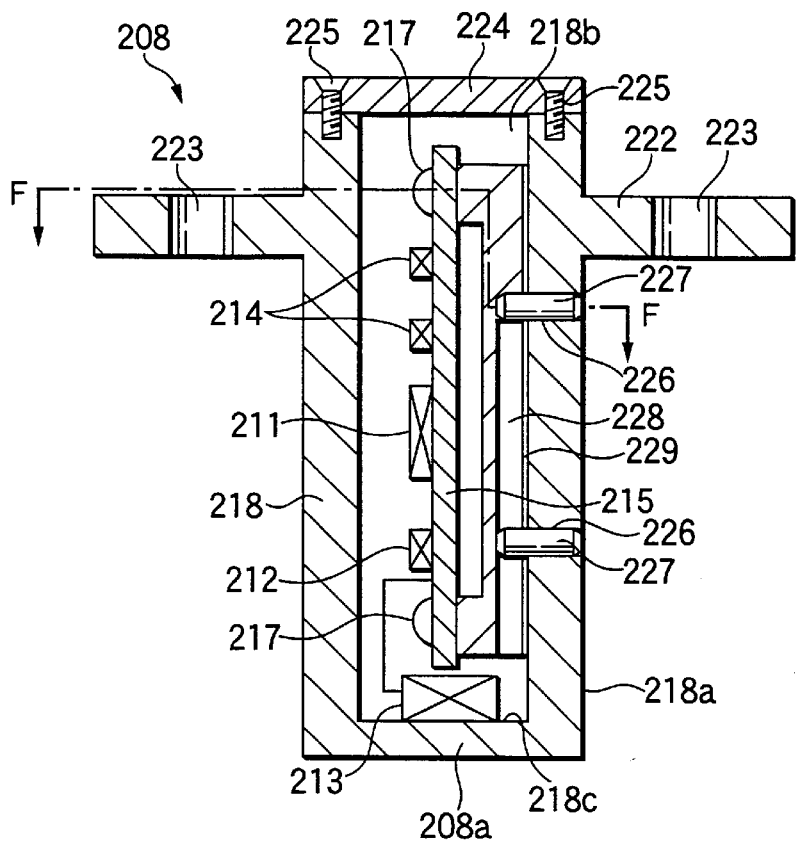
FIG. 29 is a cross-sectional view showing a sensor according to a fourteenth embodiment of the present invention.
Figure 30:
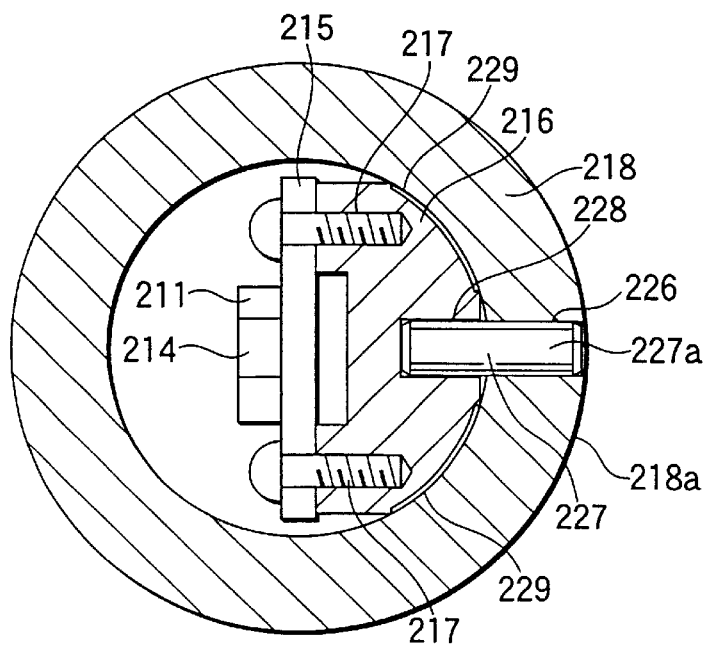
FIG. 30 is a cross-sectional view of the sensor taken along line F—F shown in FIG. 29.

A second embodiment of the present invention will be described by reference to FIGS. 29 and 30. Those constituent elements identical with those of the thirteenth embodiment are assigned the same reference numerals, and their explanations are omitted. A positioning pin 227 is fitted into a hole 226 formed in the sensor case 218 of the sensor 208 shown in FIG. 29 through fastening, and a guide groove 228 is formed in the fixing jig 216. The fixing jig 216 is inserted into the sensor case 218 while the positioning pin 227 is caused to follow the guide groove 228. A clearance between the sensor case 218 and the fixing jig 216 is fixed by means of an adhesive 229, thus enabling fastening of the fixing jig 216 without use of the screw 221. Similarly, a positioning pin is formed on the circuit board 215, and a positioning groove or hole is formed in the fixing jig 216. The circuit board 215 and the fixing jig 216 are bonded together by means of an adhesive, thereby enabling fastening the fixing jig 216 without use of the screw 217.

As mentioned above, in connection with the sensor unit 208 having the fixing jig 216 fastened to the sensor case 218, the fixing jig 216 is fixed in a certain direction with respect to the sensor case 218. At this time, the circuit board 215 having the vibration sensor 211 mounted thereon is fixed to a predetermined position on the fixing jig 216. More specifically, the vibration sensor 211 is fixed in a predetermined direction with respect to the sensor case 218. Consequently, signals measured by the sensors 208 produced in the same manner involve few variations in value, and hence calibration of signals of each sensor is seldom required.

A sensor according to the present invention comprises a detecting section for detecting an object of detection; a circuit component for processing a detection signal output from the detecting section; a circuit board having mounted thereon the detecting section and the circuit component; a jig for fixing the circuit board; and a container having the fixing jig secured therein through use of a jig fixing component. Hence, the circuit board is fastened to a predetermined position in the sensor case. A detecting section can be placed in a predetermined orientation with respect to the sensor case. Signals measured by sensors of the same type produced in the same manner involve few variations in value, and hence calibration of signals of each sensor is seldom required.

A bearing apparatus with the sensor enables mounting of a detecting section of the sensor in a predetermined direction with reference to the bearing apparatus. Signals detected by the sensors involve little dispersion in value. Consequently, at the time of evaluation of an operating status of a bearing apparatus with sensor manufactured in the same manner, changes in a signal stemming from bearing apparatus.

Figure 31:
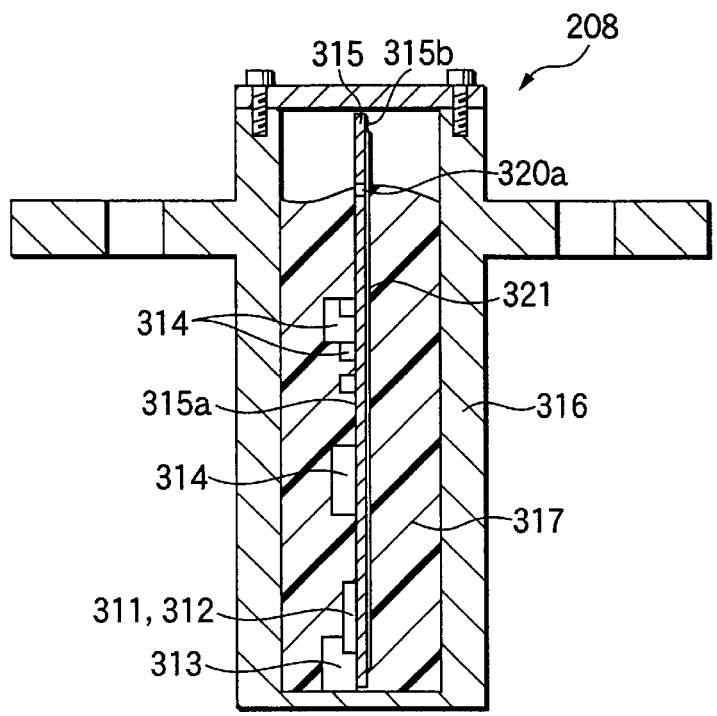
FIG. 31 is a cross-sectional view showing a sensor according to a fifteenth embodiment of the present invention.
Figure 32A:
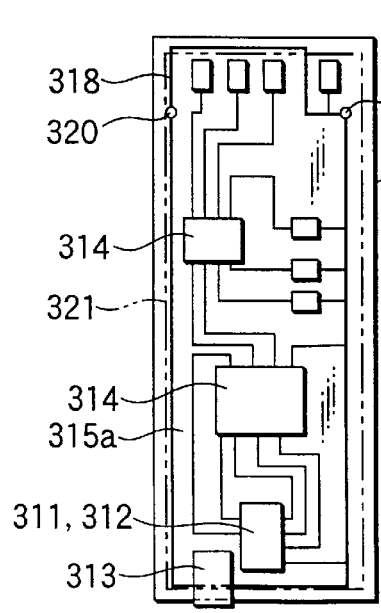
FIG. 32A is a front view of the circuit board shown in FIG. 31.
Figure 32B:
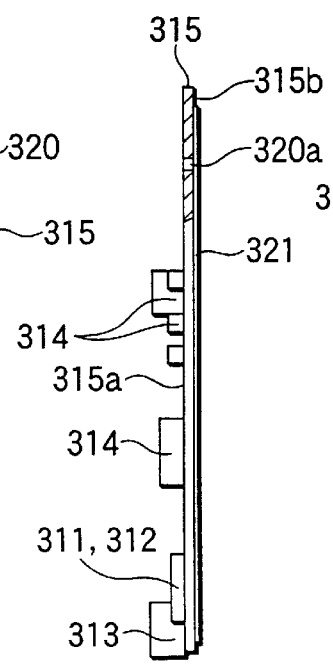
FIG. 32B is a partially-cross-sectional side elevation view of the circuit board shown in FIG. 31.
Figure 32C:
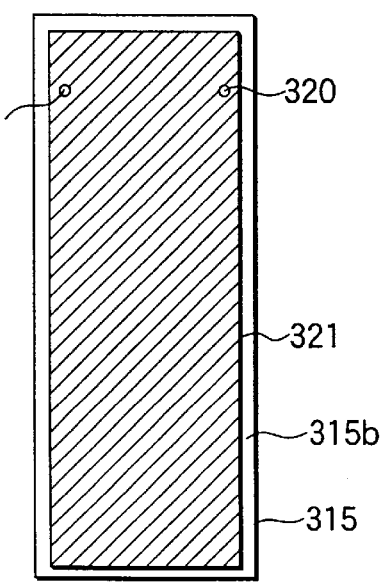
FIG. 32C is a rear view of the circuit board shown in FIG. 31.

FIGS. 31 to 32C show a sensor unit 208 attached to a bearing apparatus 201 of FIG. 26 according to a fifteenth embodiment of the present invention.

As shown in FIGS. 31 to 32C, the sensor unit 208 comprises: a vibration sensor 311 being a vibration detecting section for detecting vibrations; a temperature sensor 312 being a temperature detecting section for detecting a temperature; a rotation speed sensor 313 being a rotation speed detecting section for detecting a rotation speed of the shaft 206; and a circuit component 314 for processing signals detected by the sensors 311, 312, and 313. The sensors 311, 312, and 313 and the circuit component 314 are mounted on a single surface 315a of a circuit board 315. As shown in FIG. 31, the circuit board 315 is housed in a sensor case 316 and is secured by means of filling a clearance between the circuit board 315 and the sensor case 16 with a filler 317; e.g., epoxy resin, through molding.

As shown in FIG. 32A, a protective line 318 is provided on the surface 315a of the circuit board 315 as an annular first noise shield so as to surround the circuit component 314. The protective line 318 is grounded so as to provide a reference voltage for the sensor unit 208. Further, as shown in FIG. 32B, the protective line 318 is connected to a plane-like shield 321 serving as a plane-like second noise shield provided on a remaining surface 315b of the circuit board 316, via a through hole 320 penetrating from the surface 315a to the other surface 315b of the circuit board 315. The reference voltage can be set to an arbitrary constant voltage other than a ground potential of 0 V. As shown in FIG. 32C, the plane-like shield 321 is provided so as to cover substantially the entire surface 315b of the circuit board 315. Here, the through hole 320 may be embodied as a hole whose interior wall 320a is plated so as to be able to establish electrical conductivity between the surfaces 315a and 315b. Alternatively, the through hole 320 may be embodied as an eyelet or a jumper line.

The sensor unit 208 having the foregoing construction effectively shields external noise by means of the protective line 318 provided on the surface 315a of the circuit board 315 and the plane-shaped shield 321 provided on the surface 315b of the same. Hence, superimposition of external noise, which would affect a signal output from the sensor unit 208, can be diminished. Hence, there can be obtained a signal having a high S/N ratio and involving mixing of little external noise, whereby a signal output from the sensor unit 208 is improved in terms of resolution and accuracy.

Figure 33:
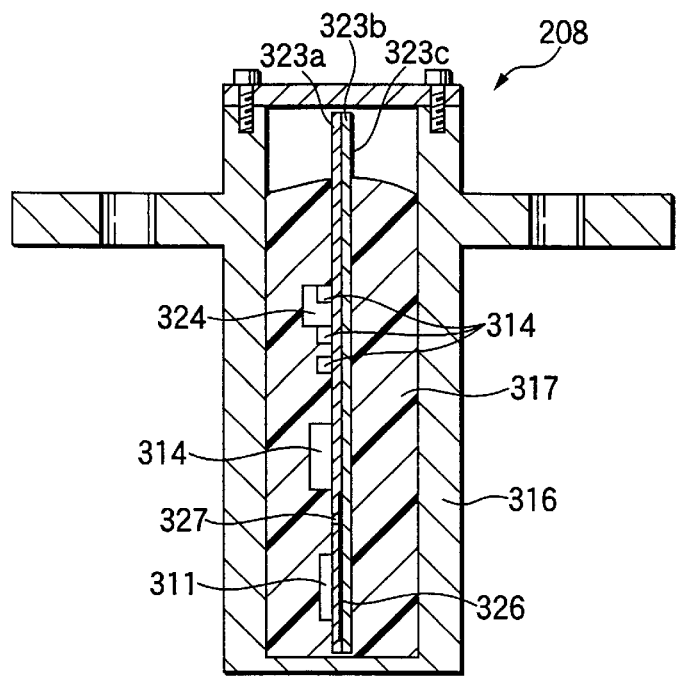
FIG. 33 is a cross-sectional view showing a sensor according to a sixteenth embodiment of the present invention.
Figure 34A:
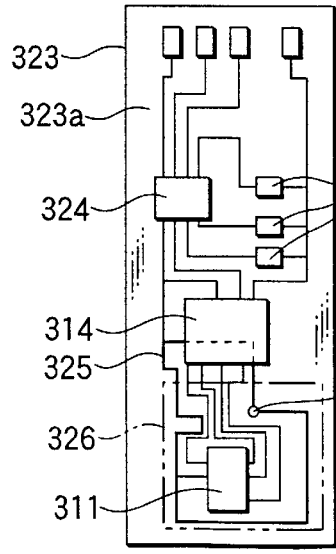
FIG. 34A is a front view of the circuit board shown in FIG. 33.
Figure 34B:
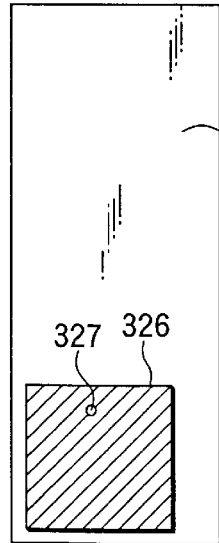
FIG. 34B is a partially-cross-sectional side elevation view of the circuit board shown in FIG. 33.
Figure 34C:
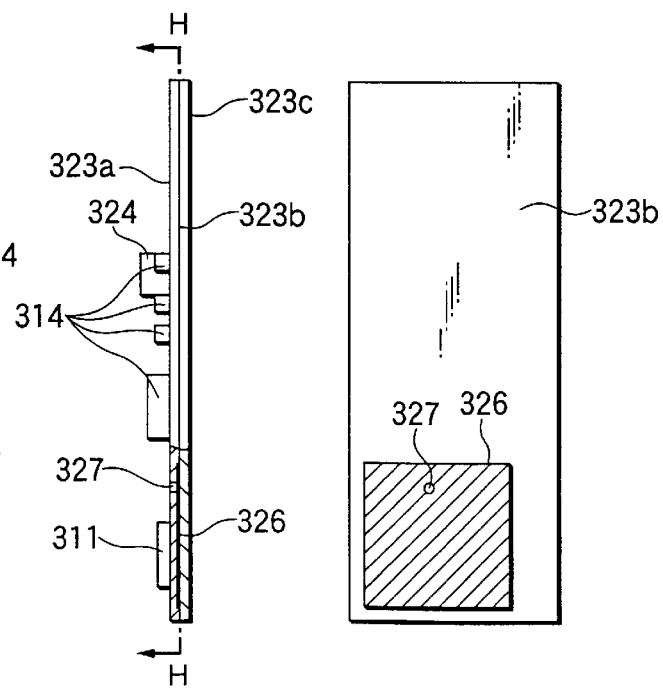
FIG. 34C is a cross-sectional view taken along a line H—H shown in FIG. 34B, showing an intermediate layer of the circuit board.

A sixteenth embodiment of the present invention will now be described by reference to FIGS. 33 to 34C. Those constituent elements identical with those of the fifteenth embodiment are assigned the same reference numerals, and their explanations are omitted. A sensor unit 208 shown in FIG. 33 comprises the vibration sensor 311 being the vibration detecting section, and the circuit component 314 for processing a detection signal output from the vibration sensor 311., both being mounted on a single surface 323a of a circuit board 323. As shown in FIG. 34A, a protective line 325—which acts as a first shield and is connected to a regulator 324 serving as a constant voltage source—is provided on the surface 323a of the circuit board 323 so as to surround the vibration sensor 311. As shown in FIG. 34B, the circuit board 323 is a three-layer board having an intermediate layer 323b. A plane-shaped shield 326 as a second shield is provided in a portion of the intermediate layer 323b corresponding to the position of the vibration sensor 311, for protecting the vibration sensor 311 from noise. The plane-shaped shield 326 is connected to the protective line 325 provided on the surface 323a via a through hole 327 which establishes electrical conductivity between the surface 323a and the intermediate layer 323b, to thereby further connect to the regulator 324 constituting a portion of the circuit component 314. A voltage identical with the reference voltage of the vibration sensor 311 is applied to the protective line 325 and the plane-shaped shield 326, by means of the regulator 324. Therefore, the protective line 325 and the plane-shaped shield 326 are less vulnerable to influence of variations in a voltage of another circuit.

As mentioned above, by means of the protective line 325 and the plane-shaped shield 326, the sensor unit 208 can effectively shield from external noise a portion susceptible to influence of external noise from among the sensor 311, the electronic component 314, and their lines; for example, the sensor 311 having the high impedance. Superimposition of external noise, which would affect the signal output from the sensor unit 208, can be diminished. Consequently, there can be obtained a signal having a high S/N ratio with involvement of little external noise. Accordingly, the signal output from the sensor unit 208 is improved in terms of accuracy and resolution.

It is preferable that the protective line 325 is routed in an annular pattern so as to completely surround an area susceptible to influence of external noise. If difficulty is encountered in routing the protective line 325 in an annular pattern because of limitations on wiring, the protective line 325 may be routed into a substantially annular pattern with a portion being open. However, the noise shielding effect achieved in this case becomes slightly inferior to that achieved in a case where the protective line is routed into a perfect annular pattern. When there is formed a through hole or line penetrating from the surface 323a to the surface 323c of a multilayer substrate and the circuit components are mounted on both surfaces 323a and 323b, a mount area wider than that obtained in the sensor unit 208 of the fifteenth embodiment is ensured. Although the entire surface of the intermediate layer 323b may be formed into a plane-shaped shield 326, provision of the plane-shaped shield 326 in only a required position enables utilization of the other area for wiring, thereby increasing the degree of design freedom. The partial shield described in the present embodiment can be applied also to the circuit board 315 described in the fifteenth embodiment.

A seventeenth embodiment of the present invention will now be described by reference to FIGS. 35 to 36C. Those constituent elements identical with those of the fifteenth and sixteenth embodiments are assigned the same reference numerals, and their explanations are omitted. A sensor unit 208 shown in FIG. 35 is provided with a protective line 329 which is routed so as to surround the vibration sensor 311 being the vibration detecting section, the temperature sensor 312 being the temperature detecting section, and the circuit component 314 provided on the surface 315a of the circuit board 315. Further, the sensor unit 208 has a shield case 330 having a case shape, which covers the surface 315a and serves as a third shield. As shown in FIG. 36A, a portion of the shield case 330 is electrically connected to the protective line 329. Further, the shield case 330 is grounded to the same reference voltage as that of the protective line 329 and that of the plane-shaped shield 321 provided on the surface 315b of the circuit board 315 electrically connected to the protective line 329 via the through hole 320. When the sensor case 316 is housed in the circuit board 315 and the filler 317 is filled into a clearance between the circuit board 315, the shield case 330, and the sensor case 316, the sensor case 316 and the shield case 330 are disposed to avoid occurrence of direct contact therebetween.

As described the above, the sensor unit 208 encloses the sensors 311 and 312 and the circuit component 314 by the protective line 329, the shield case 330, and the plane-shaped shield 321, thereby effectively shielding external noise. Consequently, mixing of external noise, which would affect the signal output from the sensor 328, is suppressed to a low level, and a signal having a high S/N ratio can be obtained. Thus, the signal output from the sensor 322 is improved in terms of accuracy and resolution.

As described in the sixteenth embodiment, an area susceptible to influence of external noise may be covered with the protective line 329, the shield case 330, or the plane-shaped shield 321. Moreover, when the circuit board 315 is embodied as the multi-layer circuit board 323 and when the sensors 311 through 313 and the circuit component 314 are mounted on both the surfaces 323a and 323c, the shield case 330 is provided on each of the surface 323a and the surface 323b, thereby protecting from external noise the sensors 311, 312, and 313 and the circuit component 314.

In each embodiment, the sensors respectively detect temperature, vibration, and a rotation speed. However, the sensor is not limited to those detections but may be used for detecting pressure or humidity.

In the sensor unit 208 described in the fifteenth and sixteenth embodiments, the circuit boards 315, 323 are molded with the filler 317 and secured in the sensor case 316. However, if the sensor unit is used in an environment involving drastic temperature changes, the surfaces 315a and 323a are coated with soft resin; e.g., silicon resin or soft urethane resin, so as to protect the sensors 311, 312, 313 and the circuit component 314 mounted on the surfaces from damage, which would otherwise arise because of a difference in coefficient of thermal expansion between the circuit board 315, the sensor case 316, and the filler 317. Subsequently, the circuit boards are further fixed by means of being covered with hard resin; e.g., epoxy resin or hard urethane resin. Alternatively, the circuit boards may be fastened by means of screws instead of by use of a filler.

A sensor according to the present invention comprises a detecting section for detecting an object of detection; a circuit component for processing a detection signal output from the detecting section; a circuit board having mounted thereon the detecting section and the circuit component; and a noise shield connected to a reference voltage of the circuit. Hence, superimposition of external noise which would affect a signal output from a sensor can be diminished effectively. Consequently, there is obtained a signal having a high S/N ratio and involving mixing of little external noise, thereby improving the signal output from the sensor in terms of accuracy and resolution.

A bearing apparatus having the sensor produces a signal having a high S/N ratio and involving mixing of little external noise even in an environment abounding with external noise. Consequently, the status of the bearing can be monitored accurately.

The construction of the sensor unit 208 described in the thirteenth to seventeenth embodiments is applicable to the sensor unit 35, 35a, 35b, 35c and 137, 137b of the first to twelfth embodiments.

An eighteenth embodiment of the present invention will be described hereinbelow by reference to FIGS. 37 to 40. In the drawing, reference numeral 410 designates an axle bearing abnormality detecting apparatus for detecting an abnormality in an axle bearing. The axle bearing abnormality detecting apparatus 410 includes a temperature sensor 411 to be incorporated into an axle bearing or its surroundings; a temperature detection circuit 412 for converting an output from the temperature sensor 411 into an output voltage $V_T$; and a sensor cable 413 including a plurality of electric wires 430, 431 for interconnecting the temperature detection circuit 412 and the temperature sensor 411.

The temperature sensor 411 is constituted of an NTC thermistor 414 having a negative temperature coefficient. A resistor 415 whose resistance value is not changed by temperature is connected in parallel with the NTC thermistor 414.

The temperature detection circuit 412 has a resistor 416 for converting output from the temperature sensor 411 into a voltage. Provided that an electric resistance value of the resistor 416 is taken as $R_{16}$ ($\Omega$), an electric resistance of the thermistor 414 is taken as Rt ($\Omega$) and an electric resistance value of the fixed resistor 415 is $R_{15}$ ($\Omega$), output from the temperature sensor 411 is extracted from the temperature detection circuit 412 as a voltage signal $V_T$ to be expressed by the following expression. In the following expression, $R_T$ denotes a combined resistance value ($\Omega$) consisting of the resistance of the thermistor 414 and the resistance of the resistor 415; and Vs denotes a supply voltage (V) to be supplied to the temperature sensor 411.

$$R_T = \frac{R_T \times R_{15}}{R_T + R_{15}}$$

$$V_T = \frac{R_{16}}{R_{16} + R_T} \times V_S$$

Figure 38:
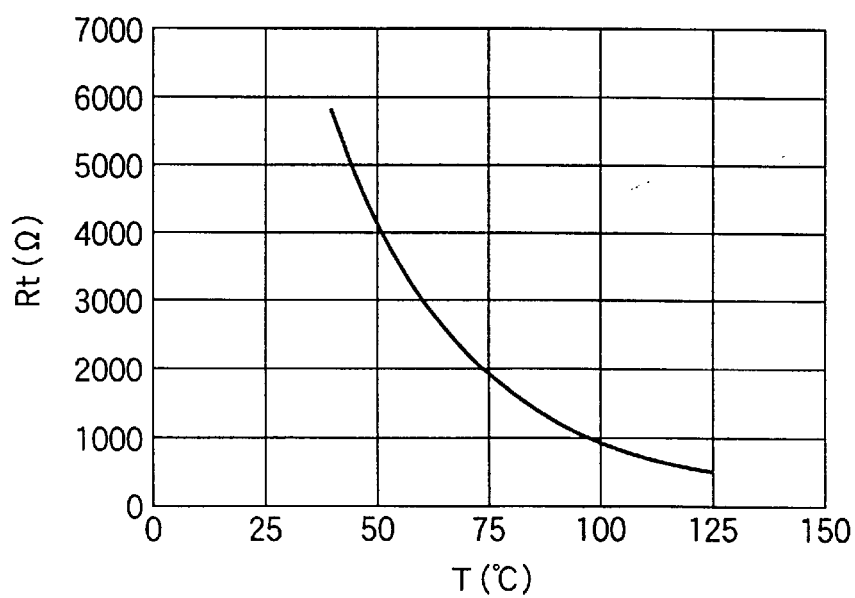
FIG. 38 is a chart showing a resistance value characteristic of an NTC thermistor with respect to temperature.

FIG. 38 shows a relationship between a resistance Rt of the NTC thermistor 414 and a temperature T. As illustrated, the resistance Rt of the NTC thermistor 414 decreases logarithmically as the temperature T increases.

Figure 39:
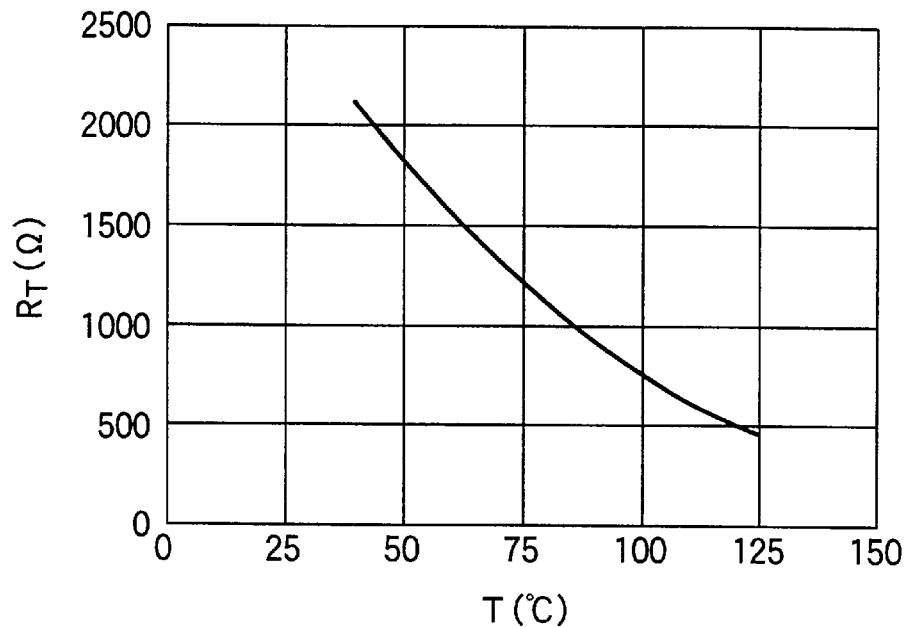
FIG. 39 is a chart showing a relationship between temperature and a combined resistance value of the NTC thermistor shown in FIG. 37 and a resistor.

Next, FIG. 39 shows a relationship between a combined resistance $R_T$ and a bearing temperature T appearing when the fixed resistance 415 is connected in parallel with the NTC thermistor 414 serving as a temperature sensor. The relationship shows that the temperature characteristic of the combined resistance has become more linear than that appearing when solely a thermistor is employed.

Figure 40:
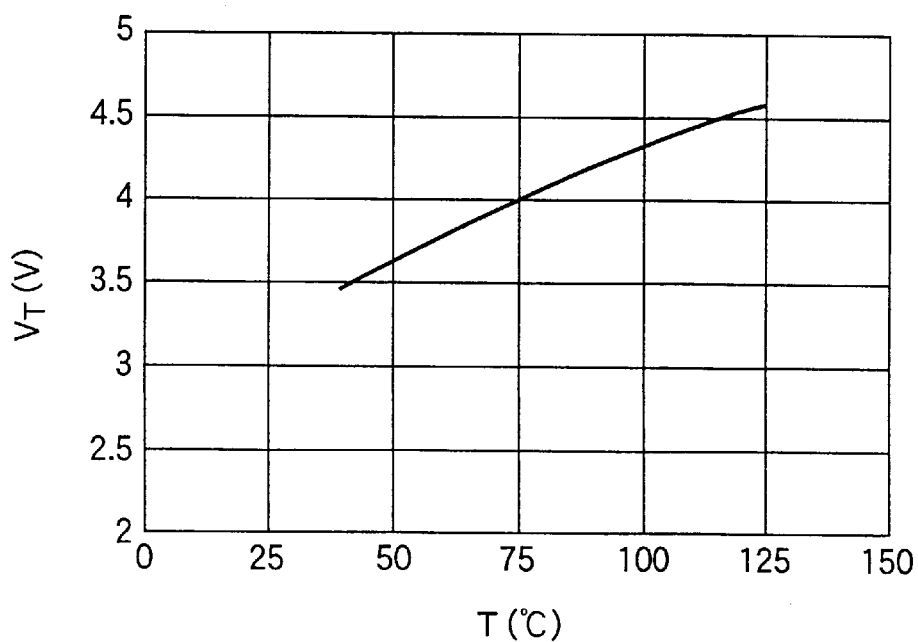
FIG. 40 is a chart showing a relationship between a voltage output from the temperature sensor shown in FIG. 37 and temperature.

FIG. 40 shows the relationship between the output voltage $V_T$ and temperature. As shown in FIG. 40, the linearity of the output voltage-temperature characteristic of the temperature sensor 411 has been improved substantially, and hence the temperature of a bearing can be detected without involvement of complication of configuration or an increase of cost. When the fixed resistor 415 is connected in parallel with the NTC thermistor, difficulty is encountered in linearizing an output voltage characteristic of the NTC thermistor over a wide temperature range from −40° C. to 300° C. Hence, it is better to linearize the output voltage characteristic of the NTC thermistor within a temperature range required for an application. When detecting an abnormality in bearing temperature, the output voltage characteristic of an NTC thermistor is linearized within a temperature range from 0° C. to 200° C. When a break has arisen in the sensor cable 430 or 431, the voltage $V_T$ output from the temperature sensor 411 becomes 0 V, and hence a break in the sensor cable 413 can also be detected.

Figure 41:
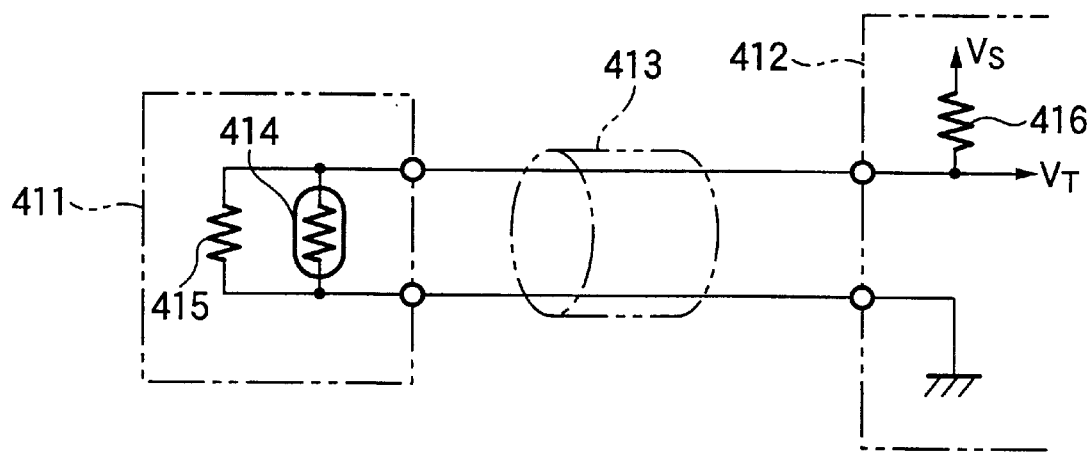
FIG. 41 is a circuit diagram showing a nineteenth embodiment of the bearing temperature sensor according to the present invention.

FIG. 41 shows a nineteenth embodiment of the bearing temperature sensor according to the present invention. The nineteenth embodiment shown in the drawing differs from the eighteenth embodiment in that a circuit including the thermistor 414 is provided on a ground side, and a resistor 416 to be used for acquiring an output voltage is provided on a power side. In other respects, the nineteenth embodiment is identical in configuration with the eighteenth embodiment.

In the nineteenth embodiment, the linearity of the temperature characteristic of the voltage $V_T$ output from the temperature sensor 411 has been improved substantially as well as the eighteenth embodiment. Hence, the temperature of the bearing can be detected without involvement of complication of circuit configuration or an increase of cost. In the nineteenth embodiment, the resistance of the NTC thermistor decreases with an increase in temperature, and hence the output voltage $V_T$ has a decreasing negative temperature characteristic. In contrast with the eighteenth embodiment, when the supply voltage Vs supplied to the thermistor 414 drops, the voltage $V_T$ output from the temperature sensor 411 also decreases, and as a result, temperature T is determined to be higher than a real temperature. In other words, since the temperature sensor 411 has a negative output voltage characteristic, there arises a phenomenon identical with a rise in bearing temperature which would arise in the event of occurrence of an abnormality in a sensor, such as a drop in the supply voltage Vs. Consequently, when an abnormality, such as seizing up, is detected by the temperature sensor 411, there is prevented overlooking of an anomalous temperature of the bearing, which would otherwise be caused by an abnormality in the sensor, thus imparting a fail-safe function to the bearing temperature sensor.

Figure 42:
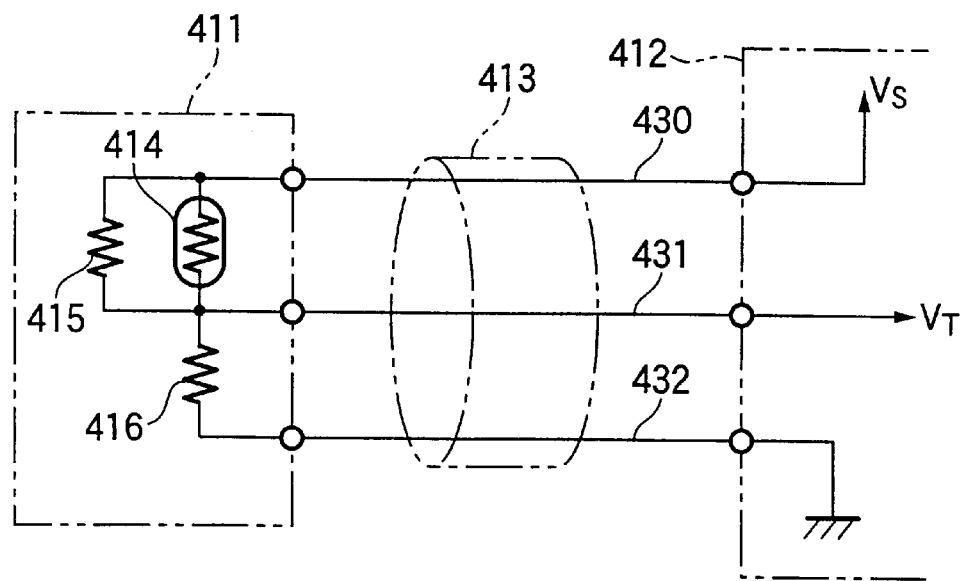
FIG. 42 is a circuit diagram showing a twentieth embodiment of the bearing temperature sensor according to the present invention.

FIG. 42 shows a twentieth embodiment of the bearing temperature sensor according to the present invention. The twentieth embodiment shown in the drawing differs from the eighteenth embodiment set forth in that the resistor 416 for detecting an output from the temperature sensor 411 is provided in the temperature sensor 411. In other respects, the twentieth embodiment is identical in configuration with the eighteenth embodiment. Consequently, in the present embodiment, the voltage $V_T$ output from the temperature sensor 411 changes substantially linearly in accordance with the temperature T, as in the case of the eighteenth embodiment. Hence, the temperature of the bearing can be detected without involvement of complication of configuration and an increase of cost.

When a break has arisen in the electric line 430, the output voltage $V_T$ becomes equal to 0 V. When a break has arisen in the electric line 431, the output voltage $V_T$ becomes equal to the supply voltage. Thus, the line detection is feasible. However, when a break has arisen in the electric line 431, a break cannot be detected, because the output voltage $V_T$ becomes unstable (if the thermistor is normal, the output voltage $V_T$ does not become equal to 0 V or the supply voltage).

Figure 43:
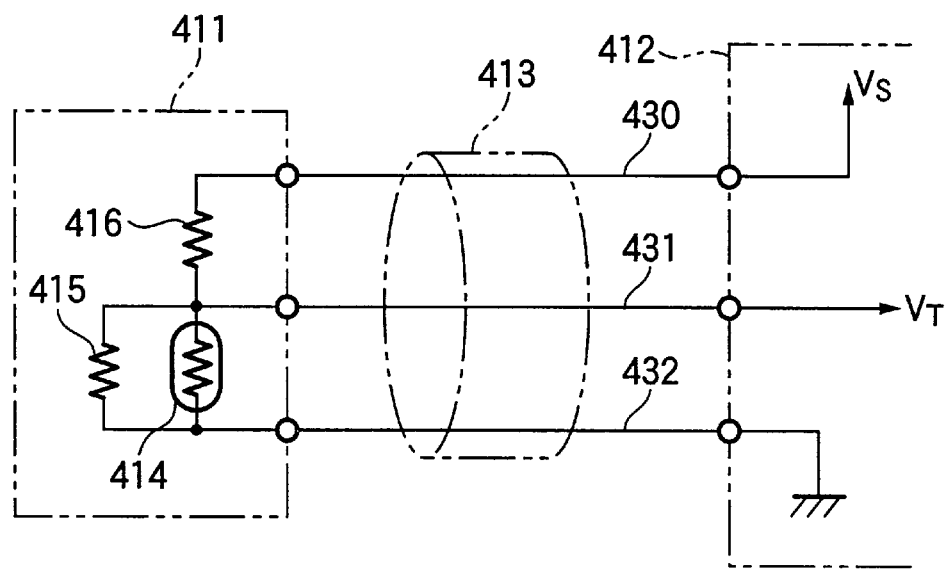
FIG. 43 is a circuit diagram showing a twenty-first embodiment of the bearing temperature sensor according to the present invention.

FIG. 43 shows a twenty-first embodiment of the bearing temperature sensor according to the present invention. The twenty-first embodiment shown in the drawing differs from the nineteenth embodiment in that the resistor 416 for detecting an output from the temperature sensor 411 is provided in the temperature sensor 411. In other respects, the twenty-first embodiment is identical in configuration with the nineteenth embodiment. Consequently, in the present embodiment, the voltage $V_T$ output from the temperature sensor 411 changes substantially linearly with the temperature T, as in the case of the nineteenth embodiment. Hence, the temperature of the bearing can be detected without involvement of complication of configuration and an increase of cost.

In the twenty-first embodiment, the resistance of the NTC thermistor decreases with an increase in temperature, and hence the output voltage $V_T$ has a decreasing negative temperature characteristic. When the supply voltage Vs supplied drops, the voltage $V_T$ output from the temperature sensor 411 also decreases, and as a result temperature T is determined to be higher than a real temperature, as in the case of the nineteenth embodiment. Consequently, when an abnormality, such as seizing up, is detected by the temperature sensor 411, a fail-safe function can be to the bearing temperature sensor.

In this case, when a break has arisen in the electric line 430, the output voltage $V_T$ becomes equal to 0 V. When a break has arisen in the electric line 432, the output voltage $V_T$ becomes equal to the supply voltage. Thus, the line detection is feasible. However, when a break has arisen in the electric line 431, a break cannot be detected, because the output voltage $V_T$ becomes unstable.

Figure 44:
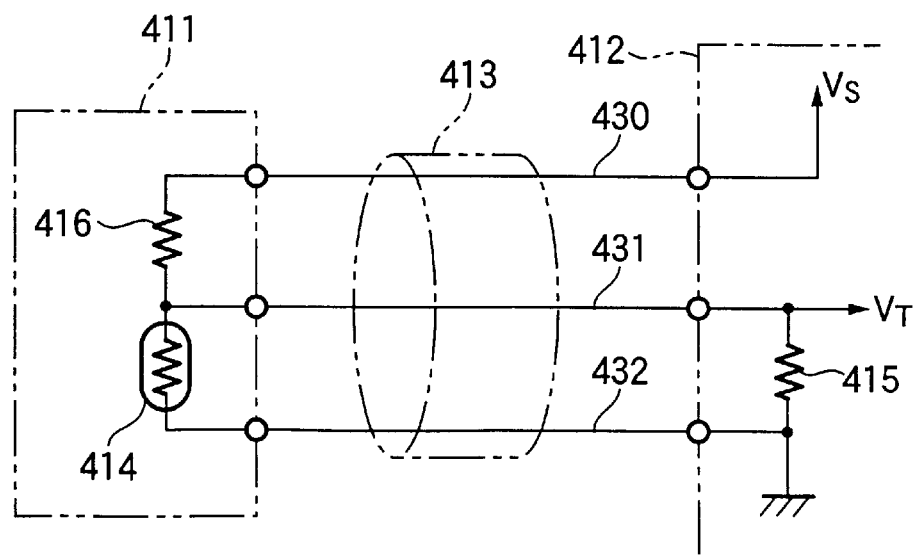
FIG. 44 is a circuit diagram showing a twenty-second embodiment of the bearing temperature sensor according to the present invention.

FIG. 44 shows a twenty-second embodiment of the bearing temperature sensor according to the present invention. The twenty-second embodiment shown in the drawing differs from the twenty-first embodiment set forth in that the fixed resistor 415 is provided in the voltage conversion circuit 412. In other respects, the twenty-second embodiment is identical in configuration with the twenty-first embodiment. Consequently, in the present embodiment, the voltage $V_T$ output from the temperature sensor 411 changes substantially linearly in accordance with the temperature T, as in the case of the twenty-first embodiment. Hence, the temperature of the bearing can be detected without involvement of complication of configuration and an increase of cost. Since the twenty-second embodiment is also identical in circuit configuration with the twenty-first embodiment, the voltage $V_T$ has a negative temperature characteristic decreasing with an increase in temperature. Consequently, a fail-safe function can be imparted to the bearing temperature sensor, as in the case of the twenty-first embodiment.

When a break has arisen in the electric line 430 or 431, the output voltage $V_T$ becomes equal to 0 V. When a break has arisen in the electric line 432, the output voltage $V_T$ becomes $R_{15} \cdot V_S(R_{15}+R_{16})$. Since these voltages differ from output voltages produced under normal conditions, a break in the line 432 can be detected.

Figure 45:
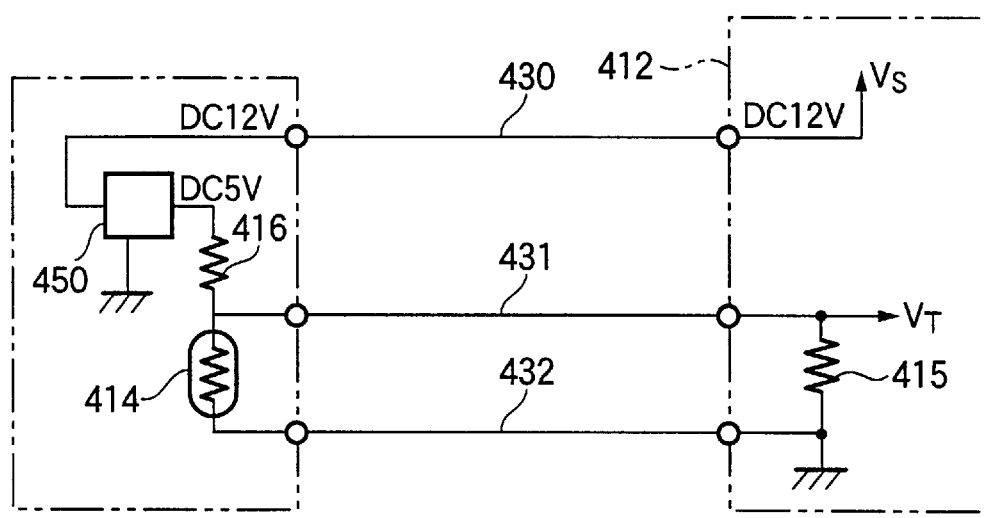
FIG. 45 is a circuit diagram showing a twenty-third embodiment of the bearing temperature sensor according to the present invention.

FIG. 45 shows a twenty-third embodiment of a temperature sensor according to the present invention. The twenty-third embodiment shown in the drawing differs from the twenty-second embodiment in that a regulator (or a DC-DC conversion circuit) 450 is provided in the temperature sensor, for supplying the supply voltage Vs (DC 5V) to the thermistor 414 after having converted the supply voltage Vs (DC 12V) through use of the regulator 450 (or a DC-DC conversion circuit). When the regulator 450 is employed, a voltage output from the regulator 450 remains unchanged even if changes have arisen in the supply voltage Vs. Therefore, there can be prevented changes in output from the temperature sensor, which would otherwise be caused by changes in supply voltage Vs. The other embodiments yield the same result, so long as the regulator 450 is employed. Alternatively, a DC-DC converter or a reference voltage IC may also be used instead of a regulator.

Figure 46:
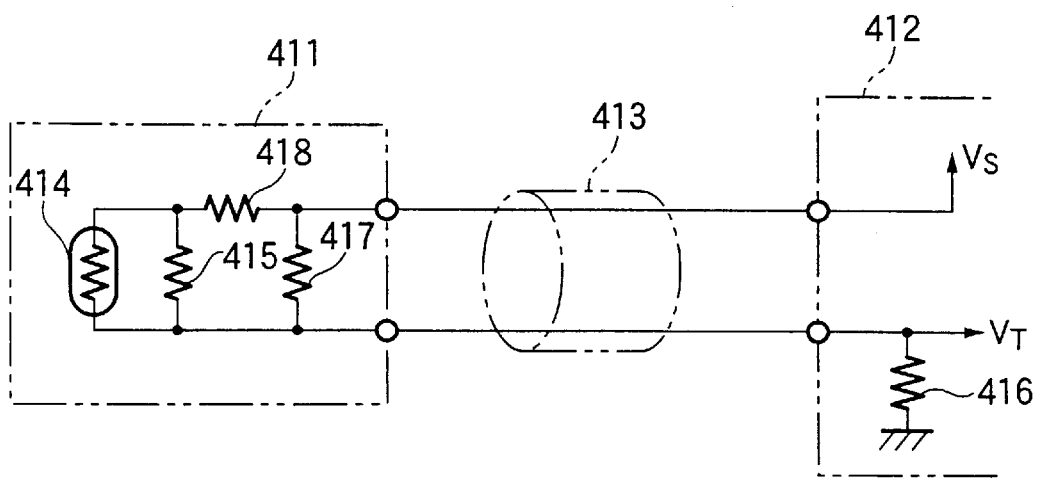
FIG. 46 is a circuit diagram showing a twenty-fourth embodiment of the bearing temperature sensor according to the present invention.

FIG. 46 shows a twenty-fourth embodiment of a bearing temperature sensor according to the present invention. The twenty-fourth embodiment shown in the drawing differs from the eighteenth embodiment in that there is provided a combined resistor consisting of resistors 415, 417, and 418 as a resistor connected in parallel with the thermistor 414. In other respects, the twenty-fourth embodiment is identical in configuration with the eighteenth embodiment. In this case, the linearity of an output voltage can be improved as compared with the eighteenth embodiment, consequently, in the present embodiment, the voltage $V_T$ output from the temperature sensor 411 changes substantially linearly with the bearing temperature T, as in the case of the eighteenth embodiment. Hence, the temperature of the bearing can be detected without involvement of complication of configuration and an increase of cost.

Figure 47:
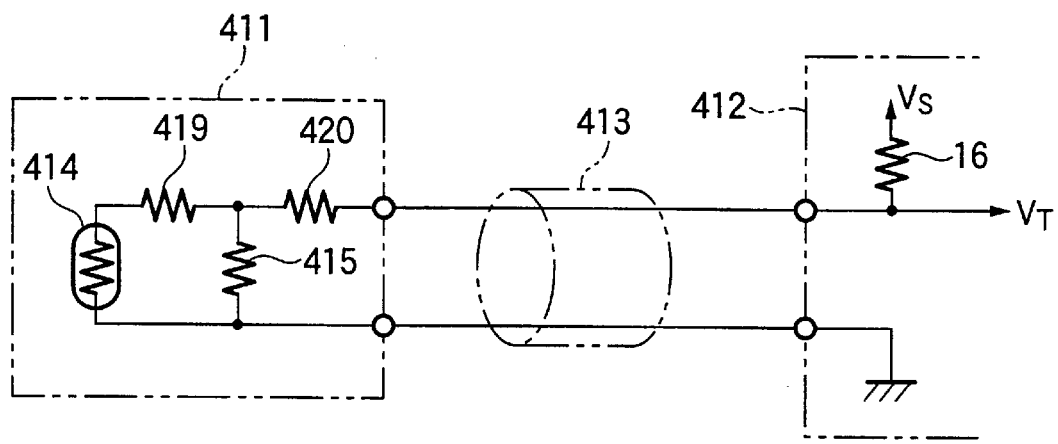
FIG. 47 is a circuit diagram showing a twenty-fifth embodiment of the bearing temperature sensor according to the present invention.

FIG. 47 shows a twenty-fifth embodiment of a bearing temperature sensor according to the present invention. The twenty-fifth embodiment shown in the drawing differs from the nineteenth embodiment in that there is provided a combined resistor consisting of resistors 415, 419, and 420 as a resistor connected in parallel with the thermistor 414. In other respects, the twenty-fifth embodiment is identical in configuration with the nineteenth embodiment. In this case, the linearity of an output voltage can be improved as compared with the nineteenth embodiment. Since the voltage Vt output from the temperature sensor 411 has a negative temperature characteristic, a fail-safe function can be imparted to the bearing temperature sensor in the same manner as mentioned above. Consequently, in the present embodiment, the voltage $V_T$ output from the temperature sensor 411 to the voltage conversion circuit 414 changes substantially linearly with the temperature T, as in the case of the nineteenth embodiment. Hence, the temperature of the bearing can be detected without involvement of complication of configuration and an increase of cost. Further, the twenty-fifth embodiment yields the same advantage as that yielded in the nineteenth embodiment.

A method of detecting an abnormality in an axle bearing according to the present invention will now be described with reference to FIG. 48.

Figure 48:
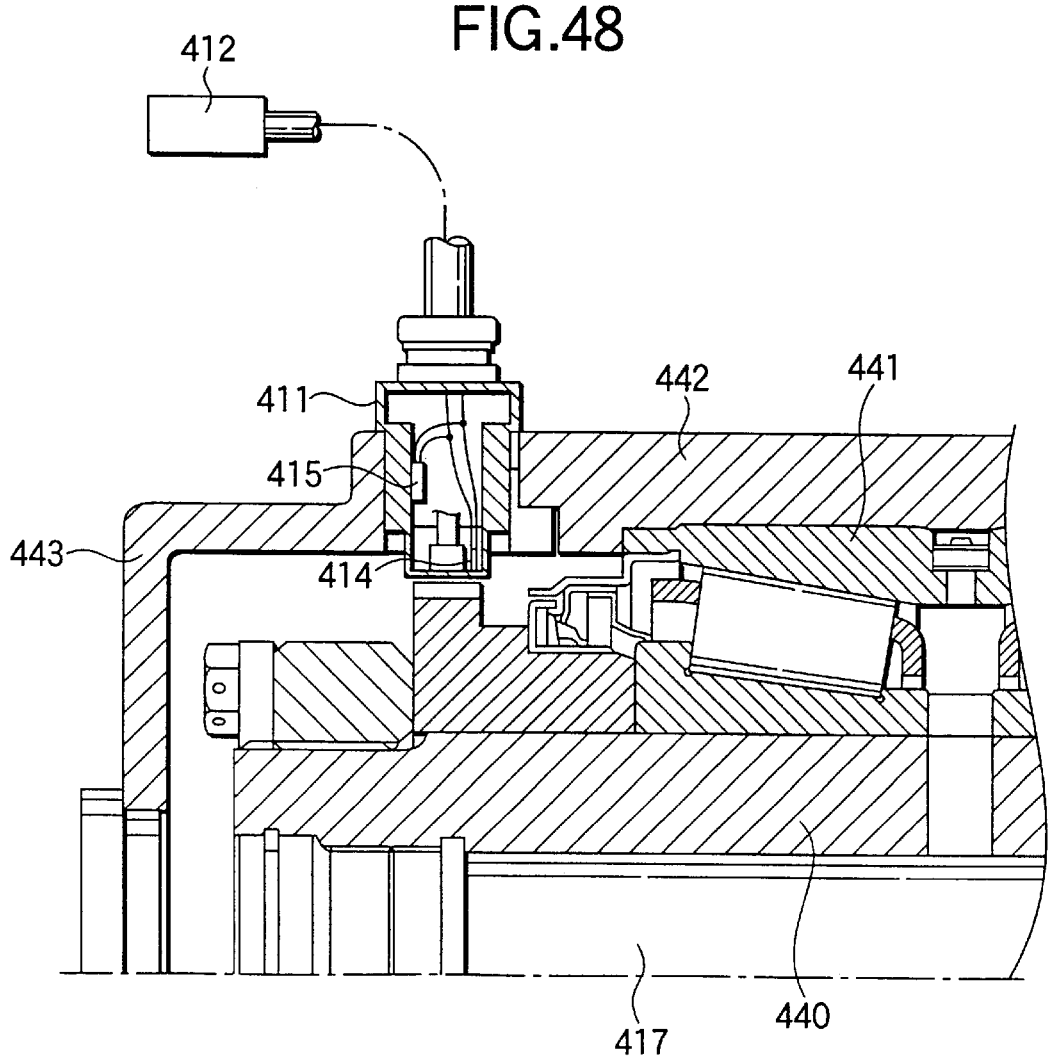
FIG. 48 is a diagram for describing a method of detecting an abnormality in an axle bearing according to the present invention.

FIG. 48 shows a diagrammatic sketch of a system for detecting an abnormality in an axle bearing. As shown in the drawing, reference numeral 440 designates an axle shaft; 441 designates a bearing; 442 designates a journal box serving as a bearing housing; and 443 designates a cover of the journal box 442. The temperature sensor 411 is provided in a location close to the bearing 441 of the cover 443 of the journal box 442. Further, the thermistor 414 serving as a temperature detecting element and the resistor 415 are built in the temperature sensor 411. The temperature detection circuit 412 is spaced away from the temperature sensor 411; for example, in the trunk of a vehicle.

When detection of occurrence of an abnormality such as seizing up in the bearing 441 is effected with the foregoing configuration, the resistor 415 is connected in parallel with the thermistor 414. Further, the temperature of the bearing 441 is detected by the temperature detection circuit 412.

If the fixed resistor 415 is connected in parallel with the thermistor 414 serving as a temperature sensor when an abnormality in the axle bearing 441 is detected by use of the temperature sensor built in the bearing, the voltage $V_T$ output from the temperature sensor changes linearly with the bearing temperature T. Even when the temperature sensor incorporated into the vehicle bearing 441 corresponds to a thermistor, an abnormality in the axle bearing 441 can be detected with high accuracy.

In the present embodiment, the NTC thermistor having a negative temperature coefficient has been employed as a thermistor to be incorporated into the axle bearing. However, the present invention is not limited to this type of thermistor. For example, a silicon temperature sensor, such as a PTC thermistor having a positive temperature coefficient or a silicon-based thermistor (hereinafter called a "silicon thermistor"), may also be employed as the thermistor to be incorporated into the axle bearing. Further, there may also be employed a CTR thermistor which has a negative temperature coefficient and shows an abrupt variation in resistance when having achieved a specific temperature.

Figure 37:
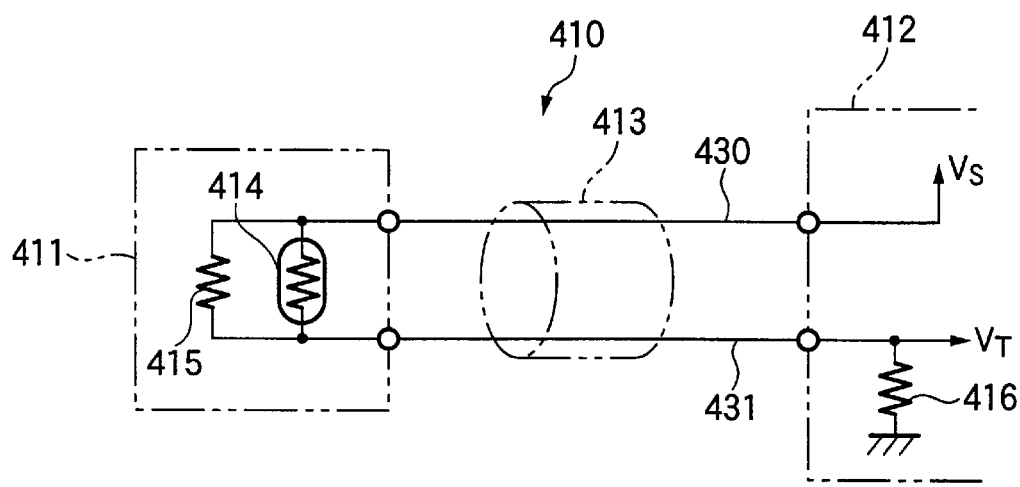
FIG. 37 is a circuit diagram showing an eighteenth embodiment of a bearing sensor according to the present invention.

In this case, if there is employed a PTC thermistor having a positive temperature coefficient or a silicon thermistor, the concept of fail-safe operation can be added to the method while the linearity of combined resistance of the thermistor is improved and the circuit configuration shown in FIG. 37 is maintained.

Figure 49:
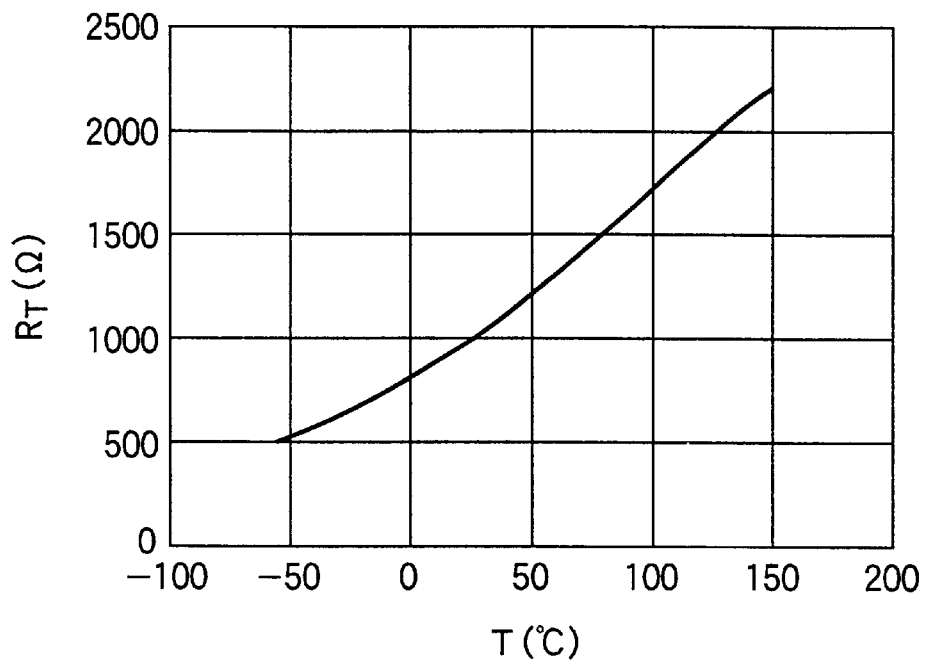
FIG. 49 is a chart showing a temperature-resistance characteristic of a silicon thermistor.
Figure 50:
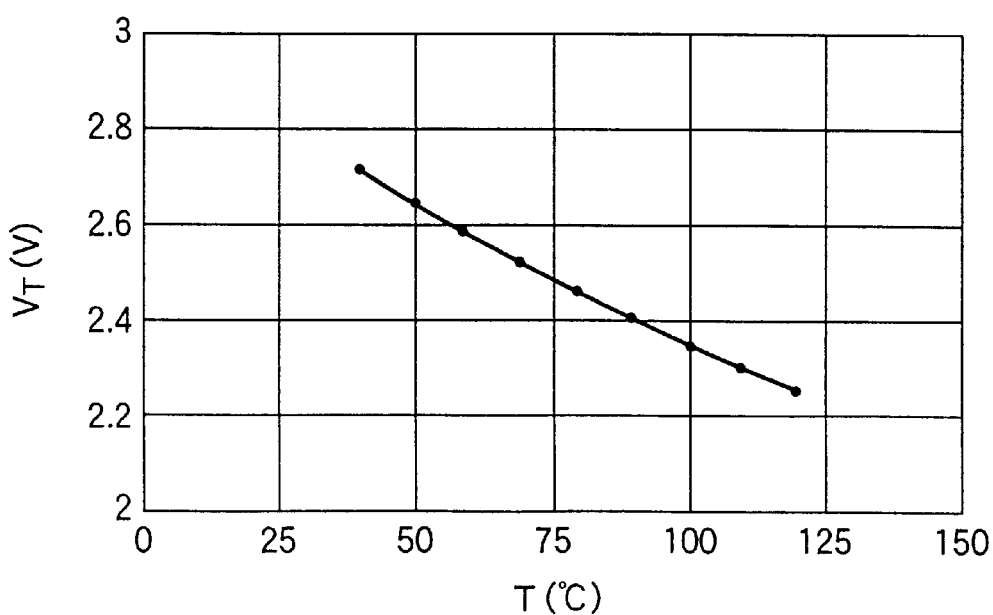
FIG. 50 is a chart showing a characteristic of a voltage output form the temperature sensor when a silicon thermistor is employed as a thermistor of the circuit shown in FIG. 37.

For instance, when a silicon thermistor having a temperature-resistance characteristic shown in FIG. 49 is employed as a thermistor provided in the circuit shown in FIG. 37, there can be achieved an output characteristic, in which an output voltage drops with an increase in temperature, as shown in FIG. 50. Thus, the function of improving linearity and the fail-safe function can be imparted to the thermistor.

When a break has arisen in the electric wire 430 or 431, the output voltage $V_T$ becomes 0 V. Thus, the output voltage changes in the same manner as in a case where the temperature of the bearing has become high. Thus, the thermistor has the fail-safe function.

If no demand exists for high accuracy of temperature measurement and thus, the temperature-resistance value characteristic of the silicon thermistor remains identical with that shown in FIG. 49, the fixed resistor 415 shown in FIG. 37 may be removed. The circuit of this case slightly deteriorates the linearity of the output voltage Vt as compared with the circuit shown in FIG. 37 but possesses a fail-safe function for detecting a break.

The temperature sensor of the eighteenth to twenty-fifth embodiments may be used in combination with a rotation speed sensor and a vibration sensor as in the first to seventeenth embodiments.

As has been described, as a result of a fixed resistor being connected in parallel with a thermistor, the linearity of the temperature-resistance characteristic of a thermistor provided in a bearing temperature sensor according to the present invention is improved substantially. Hence, the temperature of a bearing can be detected without involvement of complication of configuration and cost hike.

The method of detecting an abnormality in an axle bearing according to the present invention enables highlyaccurate detection of an abnormality in an axle bearing even when a thermistor is incorporated into the axle bearing as a temperature sensor.

FIGS. 51A to 55C show a twenty-sixth embodiment of the present invention. In the present embodiment, a sensor magnet 510 (i.e., a detected member) is formed in the flange section 34 serving as an encoder of the first embodiment, and the sensor magnet 510 is constituted of a bond magnet on which N poles, S poles, and no poles are alternately provided thereon, thereby enabling identification of rotating direction of a bearing through use of a single sensor.

The rotating speed of a rotating bearing can be detected by means of arranging a detected member having alternately provided N poles and S poles on a rotating side; and arranging a sensor (detector) for detecting changes in magnetic flux on a stationary side. However, such a configuration acquires only a rotation pulse and fails to determine whether the rotating direction is clockwise or counterclockwise.

Figure 54A:
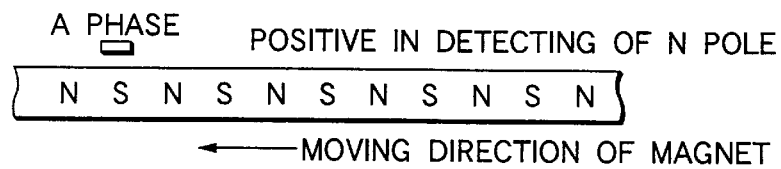
FIGS. 54A and 54B are views for explaining signals output from the sensor.
Figure 54B:
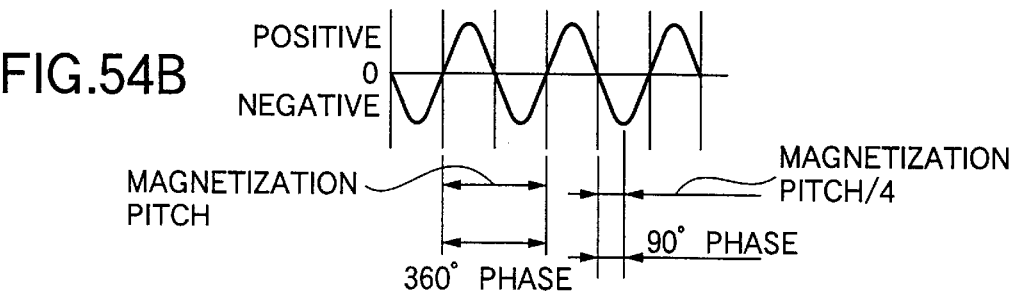

A waveform resulting from movement of the magnetic poles in association with rotation of the bearing is converted by a circuit such that a positive sinusoidal wave is detected when an N pole is detected. As a result, as shown in FIGS. 54A and 54B, only a positive sinusoidal waveform appears when an N pole is detected, and only a negative sinusoidal waveform appears when an S pole is detected. The rotating direction of the bearing cannot be determined on the basis of these waveforms. Provided that, when the sensor has passed through both of N and S poles, a magnetization pitch is taken as one cycle, a phase angle of the polarization pitch assumes a value of 360°; and a phase in which the maximum or minimum peak from a positive sinusoidal waveform output of 0 appears is 90°; i.e., a quarter polarization pitch.

Figure 55A:
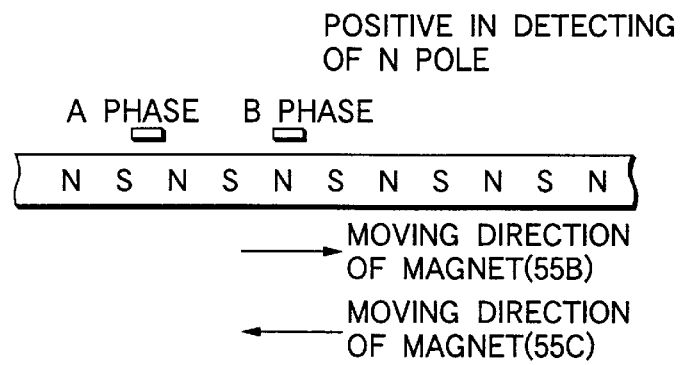
FIGS. 55A to 55C are views for explaining a method determining a rotating direction with two sensors.
Figure 55B:
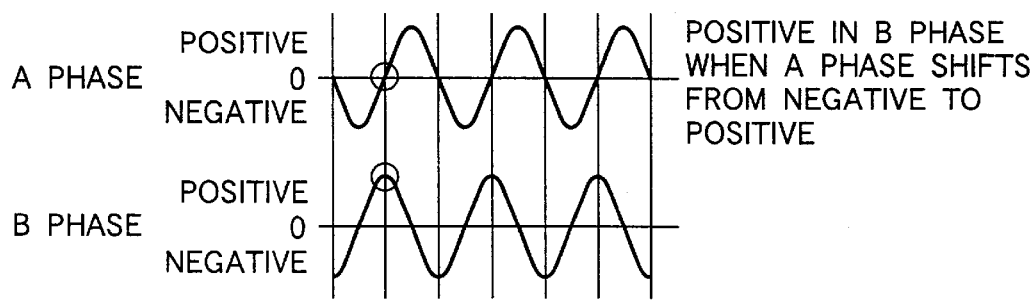
Figure 55C:
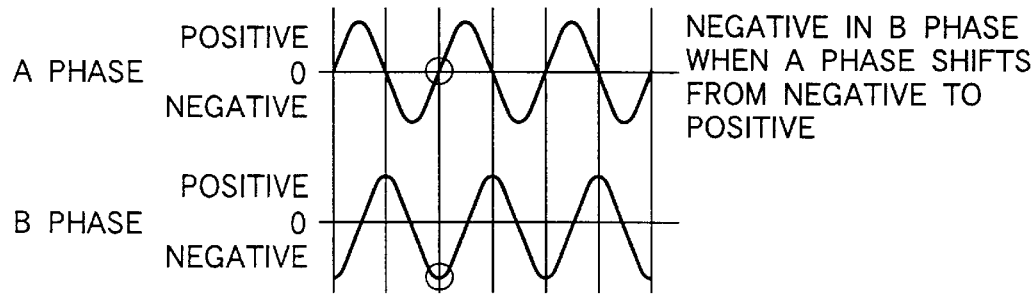

When the determination of rotating direction is required, a conceivable measure is to detect two phases (phase A, phase B) of a rectangular waveform or a sinusoidal waveform detected by use of two sensors, thereby determining a rotating direction from a gain or loss in the signals of two phases. More specifically, as shown in FIG. 55A, two sensor are spaced apart from each other by an amount corresponding to "(an integral multiple of polarization pitch)+one-quarter polarization pitch." As shown in FIGS. 55B and 55C, when one sensor detects 0, the other sensor inevitably detects the maximum or minimum value, thereby enabling determination of rotating direction of the bearing. In other words, a rotating direction is determined on the basis of whether phase B is positive or negative when phase A changes from negative to positive. As a matter of course, when the interval between phases A and B corresponds to one polarization pitch or a half polarization pitch, a rotating direction cannot be determined from information output from the two sensors.

In this case, separating the two sensors by an amount corresponding to "(an integral multiple of a polarization pitch)+one-quarter polarization pitch" is required. However, such separation of sensors encounters technical difficulty and is not suitable for mass-production of a bearing capable of determining a rotating direction.

Figure 51:
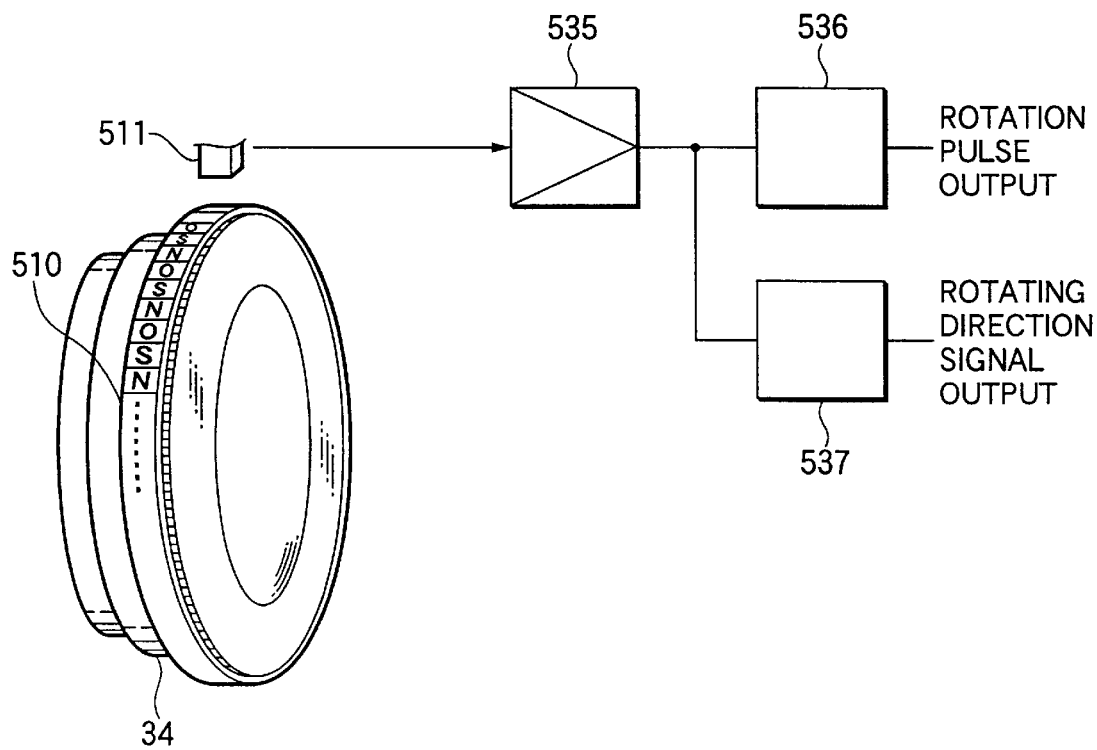
FIG. 51 is a view showing an encoder and a circuit determining the rotating direction with one sensor according to a twenty-sixth embodiment of the present invention.

In consideration of such a drawback, the present embodiment has employed the sensor magnet 510 constituted of a bond magnet. The bond magnet is polarized alternately in a sequence of N pole, S pole, and no pole (at substantially uniform pitches) as shown in FIG. 51, so as to enable only one sensor to determine a rotating direction of a bearing.

As a circuit required for determining a rotating direction, there has been employed a circuit having two separate channels. For example, as shown in FIG. 51, a preamplifier 535 is connected to one hole element 511 serving as a detector. The preamplifier 535 is connected in parallel with two circuits; that is, a waveform shaping circuit 536 for outputting a rotation pulse at each given rotation angle through waveform shaping; and a rotating direction detecting circuit 537 for outputting a rotating direction signal, by means of discrimination of a rotating direction. The rotating direction detecting circuit 537 is further provided with a differentiation function for producing a differential waveform from a signal output from, e.g., the hole element 511, and a discrimination function for determining a rotating direction from the differential waveform.

Figure 52A:
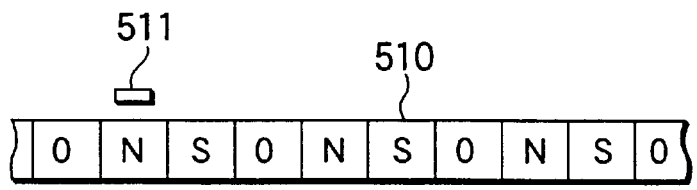
FIGS. 52A to 52D are views for explaining pulse signals detected from the circuit when a shaft rotates in a clockwise direction.
Figure 52B:
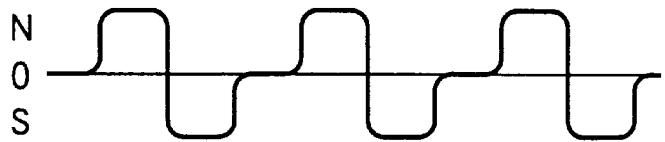

In such a circuit, it is assumed that, for example, a shaft rotates in a positive direction (i.e., in a clockwise direction). In association with rotation of the bearing, the sensor magnet 510 shown in FIG. 52A travels, so that the hole element 511 detects an N pole, an S pole, or no pole. After the detection, a signal which has been amplified to a certain level by means of the preamplifier 535; that is, a voltage signal proportional to a magnetic flux density shown in FIG. 52B, is output from the hole element 511.

At this time, if a pole to be detected is an N pole, a positive output voltage, for example, is output. In contrast, if a pole to be detected is an S pole, a negative output voltage is produced. If no pole is to be detected, an output of 0 is produced.

Figure 52C:
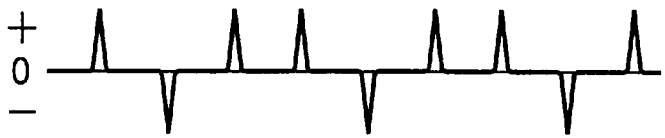

When the signal has been differentiated by means of the differentiation function, there appears a differential waveform, wherein two pulses are output successively in a positive direction, as shown in FIG. 52C, and then one pulse is output in a negative direction.

Figure 53A:
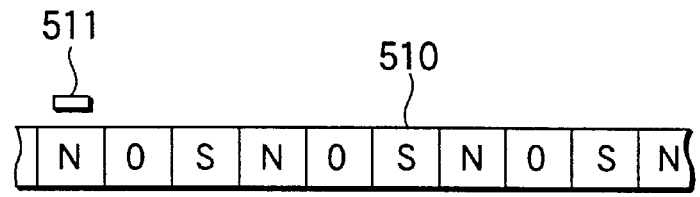
FIGS. 53A to 53D are views for explaining pulse signals detected from the circuit when the shaft rotates in a counterclockwise direction.
Figure 53B:
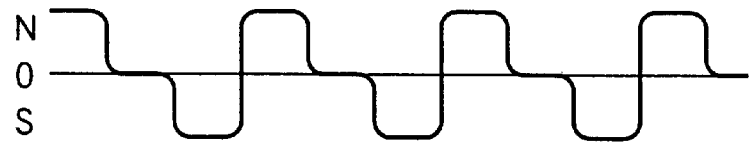
Figure 53C:
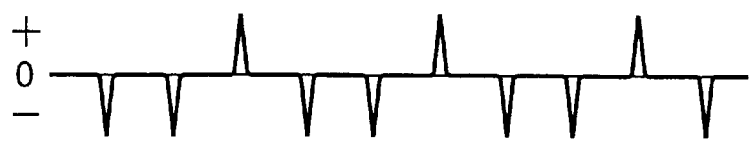

Conversely, if the bearing rotates in an opposite direction, there appears a differential waveform, wherein two pulses are output successively in a negative direction, as shown in FIG. 53C, and then one pulse is output in a positive direction.

As a result, when it is detected that two pulses have been output successively in a positive direction in the differential waveform and that one pulse has been output in a negative direction, the determination function determines that the bearing is rotating clockwise. Conversely, when it is detected that two pulses have been output successively in a negative direction in the differential waveform and that one pulse has been output in a positive direction, the determination function determines that the bearing is rotating counterclockwise.

Figure 52D:
Figure 53D:
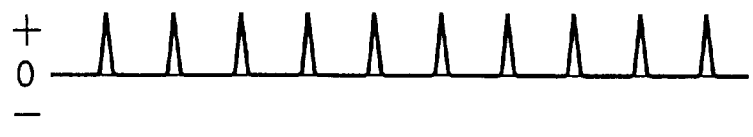

So long as processing is effected by use of a detection function of detecting an absolute value differential waveform in the form of an absolute value, a required rotating pulse is detected in a manner as shown in FIGS. 52D and 53D.

Accordingly, alternately polarizing a magnet into N poles, S poles, and no poles enables a single sensor to readily detect a rotation pulse and to determine a rotating direction.

Figure 56:
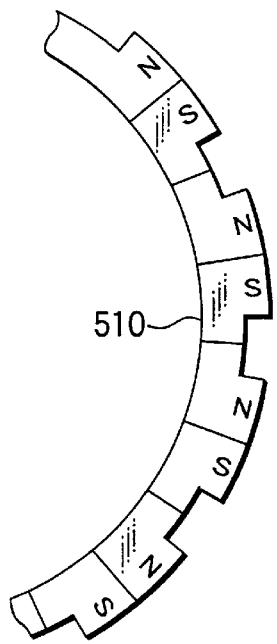
FIG. 56 is a view showing an encoder according to a first modification of the twenty-sixth embodiment of the present invention.
Figure 57:
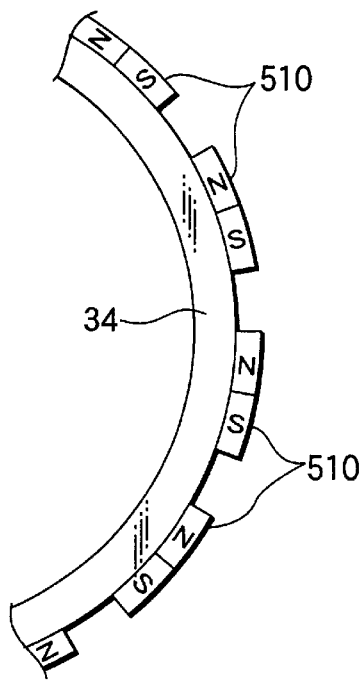
FIG. 57 is a view showing an encoder according to a second modification of the twenty-sixth embodiment of the present invention.

When difficulty is encountered in polarizing an annular magnetic substance into no poles, depressions are formed in locations on the outer periphery of an annular magnet where no poles are to be formed, as shown in FIG. 56. A distance between the sensor and polarized surfaces of the depressions is made sufficiently long such that the polarized surfaces are deemed as being of 0 polarization. Otherwise, the distance between the sensor and the polarized surfaces of the depressions has been made long beforehand such that the sensor detects neither N poles nor S poles; that is, such that a 0 signal is to be detected. As a matter of course, as shown in FIG. 57, at the time of formation of a magnet on the flange section 34, a magnet base material may not formed in positions which are not to be polarized, or the magnet base material may be removed from the positions. Subsequently, the magnet is polarized into N and S poles, thereby constituting N poles, S poles, and no poles.

Figure 58:
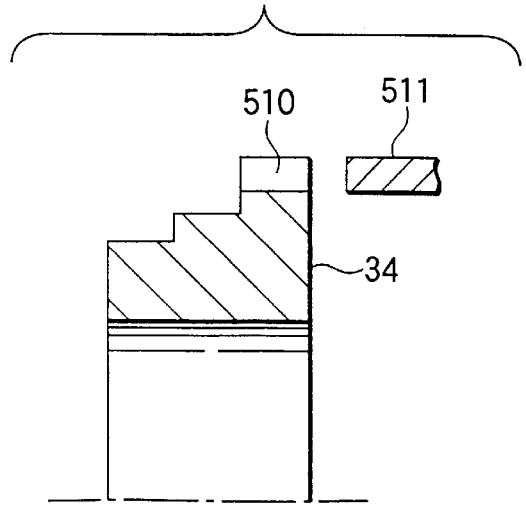
FIG. 58 is a sectional view showing an encoder and a sensor according to a third modification of the twenty-sixth embodiment of the present invention.

The technique of determining a rotating direct ion by means of one sensor through use of N poles, S poles, and no poles can be applied to a rolling bearing capable of detecting a rotation pulse as shown in FIG. 58, wherein a hole element 511 (i.e., a sensor) is positioned opposite the side surface of the sensor magnet 510.

Needless to say, even when the magnet is alternately polarized in a different sequence; namely, a sequence of S poles, N poles, and no poles, a rotating direction can be determined through use of one sensor in the same manner. In addition, the structure of the sensor magnet 510 according to the twenty-sixth embodiment is applicable to an encoder of the second to seventeenth embodiments.

While only certain embodiments of the invention have been specifically described herein, it will apparent that numerous modifications may be made thereto without departing from the spirit and scope of the invention.

What is claimed is:

1. A bearing apparatus with a sensor for a bearing comprising:

a detecting section for detecting an object to be detected;

a circuit component for processing a detection signal output from said detecting section;

a circuit board on which the detecting section and the circuit component are mounted; and a noise shield connected to a reference voltage of the circuit.

* * * * *